(12) United States Patent
Soto et al.

(10) Patent No.: US 10,225,003 B2
(45) Date of Patent: Mar. 5, 2019

(54) SYSTEM AND METHOD FOR PERFORMING IN-SERVICE OPTICAL NETWORK CERTIFICATION

(71) Applicants: Alexander Soto, San Diego, CA (US); Walter Soto, San Clemente, CA (US)

(72) Inventors: Alexander Soto, San Diego, CA (US); Walter Soto, San Clemente, CA (US)

(*) Notice: Subject to any disclaimer, the term of this patent is extended or adjusted under 35 U.S.C. 154(b) by 0 days.

(21) Appl. No.: 16/104,705

(22) Filed: Aug. 17, 2018

(65) Prior Publication Data

US 2019/0007133 A1 Jan. 3, 2019

Related U.S. Application Data

(63) Continuation of application No. 15/470,827, filed on Mar. 27, 2017, now Pat. No. 10,056,975, which is a continuation of application No. 15/060,499, filed on Mar. 3, 2016, now Pat. No. 9,660,722, which is a continuation of application No. 14/006,671, filed as application No. PCT/US2012/030212 on Mar. 22, 2012, now Pat. No. 9,312,953, which is a continuation-in-part of application No. 13/070,454, filed on Mar. 23, 2011, now Pat. No. 8,655,166, which is a continuation-in-part of application No. 12/233,495, filed on Sep. 18, 2008, now abandoned, which is a continuation-in-part of application No. 10/793,546, filed on Mar. 3, 2004, now Pat. No. 7,428,382.

(60) Provisional application No. 60/451,614, filed on Mar. 3, 2003.

(51) Int. Cl.
| | |
|---|---|
| H04B 10/071 | (2013.01) |
| H04B 10/077 | (2013.01) |
| G01M 11/00 | (2006.01) |
| H04J 14/02 | (2006.01) |

(52) U.S. Cl.
CPC ....... *H04B 10/071* (2013.01); *G01M 11/3145* (2013.01); *G01M 11/3172* (2013.01); *H04B 10/0775* (2013.01); *H04J 14/02* (2013.01); *H04J 14/0247* (2013.01); *H04J 14/0252* (2013.01); *H04J 14/0256* (2013.01); *H04J 14/0257* (2013.01); *H04J 14/0267* (2013.01); *H04J 14/0275* (2013.01); *H04J 14/0279* (2013.01); *H04J 14/0282* (2013.01); *H04J 14/0226* (2013.01); *H04J 14/0273* (2013.01)

(58) Field of Classification Search
CPC .................................................. H04B 10/071
See application file for complete search history.

(56) References Cited

U.S. PATENT DOCUMENTS

2007/0116467 A1* 5/2007 Kwon ................ G01M 11/3136
398/72

* cited by examiner

*Primary Examiner* — Daniel G Dobson

(57) ABSTRACT

A system and method for performing an in-service optical time domain reflectometry test, an in-service insertion loss test, and an in-service optical frequency domain reflectometry test using a same wavelength as the network communications for point-to-point or point-to-multipoint optical fiber networks while maintaining continuity of network communications are disclosed.

20 Claims, 31 Drawing Sheets

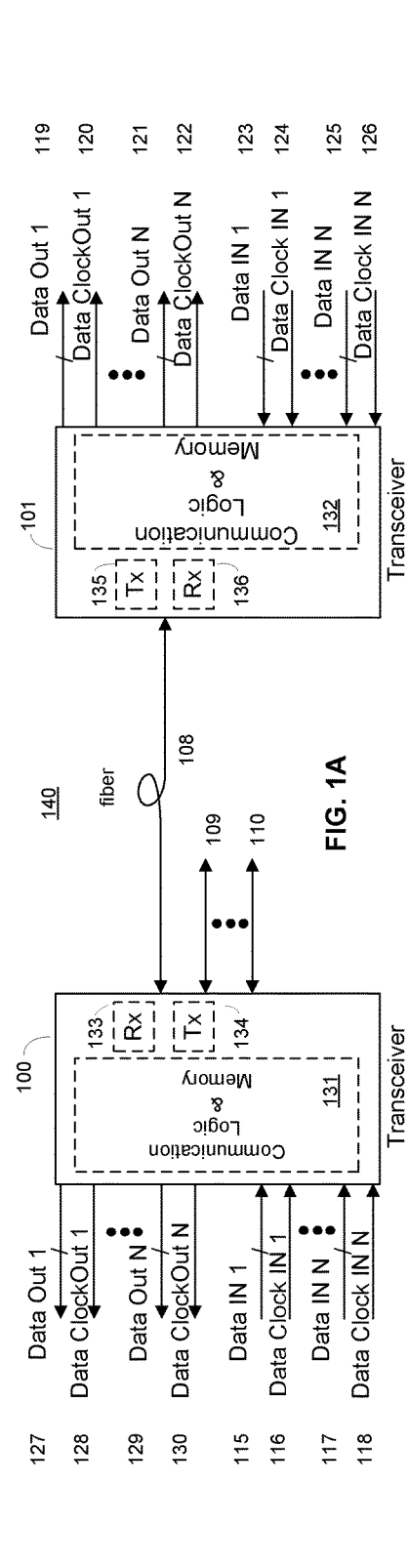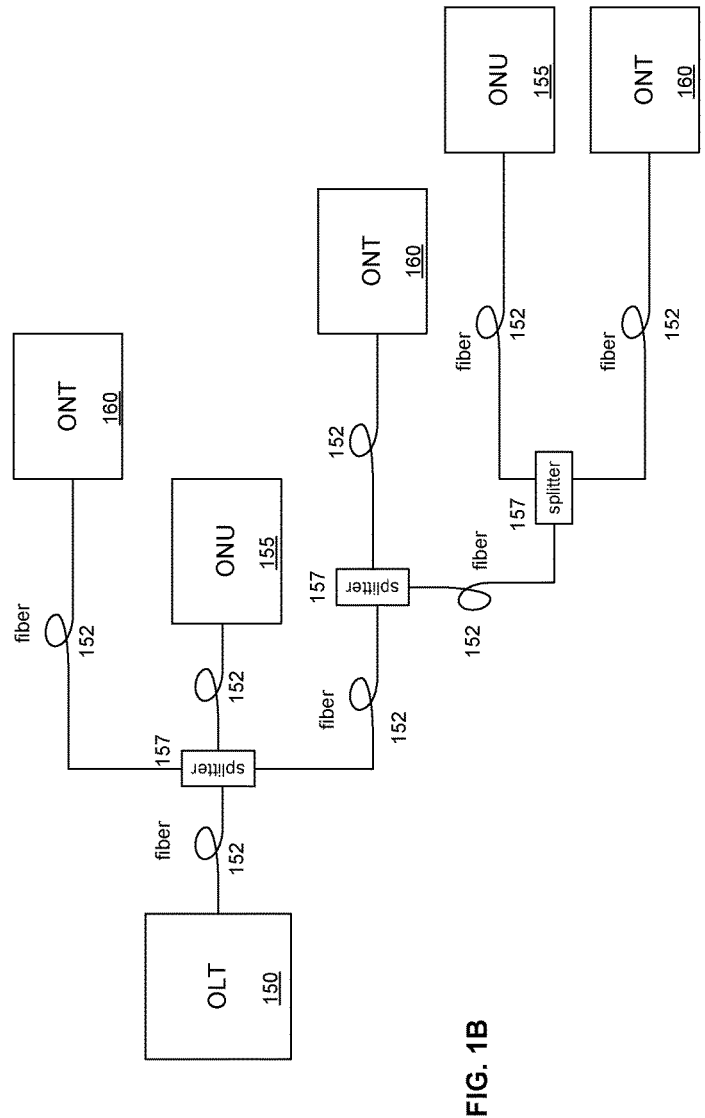
FIG. 1A
FIG. 1B

| PTI 3-bit code | Meaning of PTI subfield within the GEM Header | Change to GPON spec |
|---|---|---|
| 000 | User data fragment, Not the end of a frame | NO |
| 001 | User data fragment, End of a frame | NO |
| 010 | Reserved | NO |
| 011 | Reserved | NO |
| 100 | GEM OAM, Not the end of a frame | NO |
| 101 | GEM OAM, End of a frame | NO |
| 101 | Reserved | NO |
| 111 | Test Method Frame, indicating possible extension of GEM frame via xPLId subfield for downstream GEM frame or xPLIu for upstream GEM frame to accommodate Test Methods. | YES using unspecified reserved 3-bit code |

Assign_Alloc-ID message within downstream PLOAM (PLOAMd) subfield — 692

| Octet | Content | Description | Change to GPON spec |
|---|---|---|---|
| 1 | ONU-ID | Directed message to one ONU/T | NO |
| 2 | 00001010 | Message identification "Assign_Alloc-ID" | NO |
| 3 | ppppppppp | Alloc-ID[11..4] | NO |
| 4 | ppppp0000 | Alloc-ID[3..0] | NO |
| 5 | Alloc-ID type | Indicates for what payload type this Alloc-ID will be used:<br>0: ATM payload<br>1: GEM payload<br>2: DBA payload<br>3: Test Method<br>4-255: Reserved<br>255: De-allocate this Alloc-ID | NO<br>NO<br>NO<br>YES using unspecified Alloc-ID reserved type 3 indicator<br>NO<br>NO |
| 6-12 | Unspecified | | |

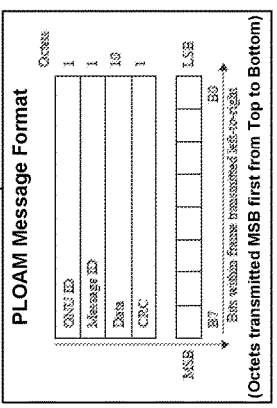

PLOAM Message Format — 690

Test Method PLOAM message within downstream PLOAM (PLOAMd) subfield — 694

| Octet | Content | Description | Change to GPON spec |
|---|---|---|---|
| 1 | ONU-ID | Directed message to one ONU/T | YES using unspecified reserved PLOAM message identification field (00010100) |
| 2 | 00010100 | Message identification "Test Method" | |
| 3 | abcdefgh | abcdefgh = Port-ID[11..4] | |
| 4 | jjk0000 | jjkhmnop = Port-ID[3..0] | |
| 5 | rrxxxttt Test Method Type | Indicates for what Test Method type this Port-ID shall be used:<br>ttt="000" - ISOTDR (In-Service Optical Time Domain Reflectometry performed by ONU/T)<br>ttt="001" - ISOFDR (In-Service Optical Frequency Domain Reflectometry performed by ONU/T)<br>ttt="010" - ISIL (In-Service Insertion Loss performed by OLT)<br>ttt="011" - ISOTDR-ISIL (ISOTDR performed by ONU/T and ISIL performed by OLT)<br>ttt="100" - ISOFDR-ISIL (ISOFDR performed by ONU/T and ISIL performed by OLT)<br>ttt="101" - ISOTDR-ISOFDR-ISIL (ISOTDR and ISOFDR performed by ONU/T, and ISIL performed by OLT)<br>ttt="110" - ISOTDR-ISOFDR-ISIL (ISOTDR and ISOFDR performed by ONU/T, and ISIL performed by OLT)<br>ttt="111" - ISOTDR-ISOFDR-ISIL (ISOTDR and ISOFDR performed by ONU/T, and ISIL performed by OLT)<br>xxx="Unspecified" - Reserved<br>rr="00" - PLOAMu used for reporting Test Method Results<br>rr="01" - OMCI used for reporting Test Method Results<br>rr="11" - GEM used for reporting Test Method Results<br>rr="00" - Reserved | |
| 6 | IS-BurstCounter1 | In-Service Burst Period (IS-Burst) 24-bit counter Byte 1 (MSB) | |
| 7 | IS-BurstCounter2 | In-Service Burst Period (IS-Burst) 24-bit counter Byte 2 | |
| 8 | IS-BurstCounter3 | In-Service Burst Period (IS-Burst) 24-bit counter Byte 3 (LSB) | |
| 9 | DTCounter1 | Delay Time Period (DT) 16-bit counter Byte 1 (MSB) | |
| 10 | DTCounter2 | Delay Time Period (DT) 16-bit counter Byte 2 (LSB) | |
| 11-12 | PLSE Parameters | Parameter values for PLSE such as optical intensity (i.e., optical power), frequency or pattern of light transmissions, and the sampling resolution of test light transmission measurements for this Test Method. | |

| FLAGS 12-bit code [11:0] | Meaning of FLAGS subfield within the Upstream Bandwidth Map (US BW Map) field | Change to GPON spec |
|---|---|---|
| Bit 11 (MSB) | ONU Sends PLSu<br>= 0, ONU shall not send the Power Leveling Sequence upstream (PLSu) information during this allocation.<br>= 1, ONU shall send its PLSu information during this allocation. | NO |
| Bit 10 | ONU Sends PLOAMu<br>= 0, ONU shall not send the Physical Layer Operations Administration Managment upstream (PLOAMu) information during this allocation.<br>= 1, ONU shall send its PLOAMu information during this allocation. | NO |
| Bit 9 | ONU Uses FEC<br>= 0, ONU shall not compute and insert Forward Error Correction (FEC) parity during this allocation.<br>= 1, ONU shall compute and insert FEC parity during this allocation. | NO |
| Bits 8:7 | ONU Sends DBRu (mode)<br>= 00, ONU shall not send the Dynamic Bandwidth Report upstream (DBRu) information during this allocation.<br>= 01, ONU shall send the "mode 0" DBRu two bytes information during this allocation.<br>= 10, ONU shall send the "mode 1" DBRu three bytes information during this allocation.<br>= 11, ONU shall send the "mode 2" DBRu five bytes information during this allocation. | NO |
| Bits 6:2 | Reserved | NO |
| Bits 1:0 | ONU Sends Test Method<br>= 00, ONU shall not send the Test Method upstream<br>= 01, ONU shall send the Test Method upstream where StopTime (SStop) indicates a time that is within the frame in which the allocation began identified by Alloc-ID.<br>= 10, ONU shall send the Test Method upstream where StopTime (SStop) indicates a time that is within the next consequtive frame in which the allocation began.<br>= 11, ONU shall send the Test Method upstream where StopTime (SStop) indicates a time that is within the second next consequtive frame in which the allocation began. | YES<br>using unspecified reserved bits 1:0 |

FIG. 6E

| Test Method PLOAM message within upstream PLOAM (PLOAMu) subfield ||| Change to GPON spec |
|---|---|---|---|
| Octet | Content | Description | |
| 1 | ONU-ID | Indicates the ONU/T sourcing this message | YES using unspecified reserved PLOAM message identification field (00010100) |
| 2 | 00001010 | Message identification "Test Method" | |
| 3 | abcdefgh | abcdefgh = Port-ID[11..4] | |
| 4 | ijkl0000 | ijklmnop = Port-ID[3..0] | |
| 5 | TestResultsByte1 | Test Method Measurement Results Byte 1 (MSB). | |
| 6 | TestResultsByte2 | Test Method Measurement Results Byte 2. | |
| 7 | TestResultsByte3 | Test Method Measurement Results Byte 3. | |
| 8 | TestResultsByte4 | Test Method Measurement Results Byte 4. | |
| 9 | TestResultsByte5 | Test Method Measurement Results Byte 5. | |
| 10 | TestResultsByte6 | Test Method Measurement Results Byte 6. | |
| 11 | TestResultsByte7 | Test Method Measurement Results Byte 7. | |
| 12 | TestResultsByte8 | Test Method Measurement Results Byte 8 (LSB). | |

FIG. 7B

| Code | Ordered Set | Number of Code-Groups | Encoding | Change to IEEE 802.3 P2P Ethernet spec |
|---|---|---|---|---|
| /C/ | Configuration | | Alternating /C1/ and /C2/ | NO |
| /C1/ | Configuration 1 | 4 | /K28.5/D21.4/Config_Reg* | NO |
| /C2/ | Configuration 2 | 4 | /K28.5/D2.2/Config_Reg* | NO |
| /I/ | IDLE | | Correcting /I1/, Preserving /I2/ | NO |
| /I1/ | IDLE 1 | 2 | /K28.5/D5.6/ | NO |
| /I2/ | IDLE 2 | 2 | /K28.5/D5.6/ | NO |
| /L/ | Test Method | 1 | /K28.6/ | YES using valid reserved special code-group |
| | Encapsulation | | | |
| /R/ | Carrier_Extend | 1 | /K23.7/ | NO |
| /S/ | Start_of_Packet | 1 | /K27.7/ | NO |
| /T/ | End_of_packet | 1 | /K29.7/ | NO |
| /V/ | Error_Propagation | 1 | /K30.7/ | NO |

*Two data code-groups representing the Config_Reg value.

FIG. 11A

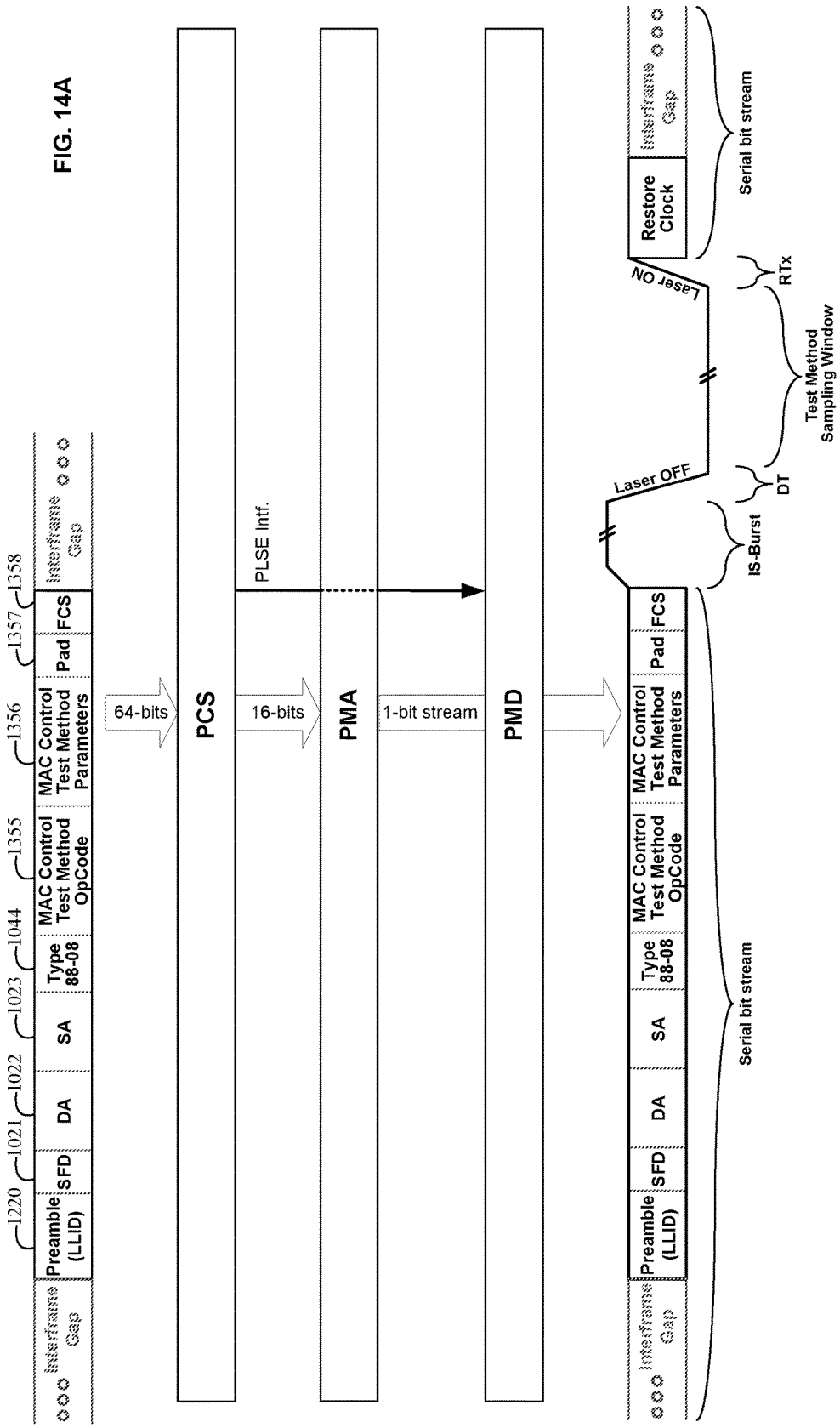

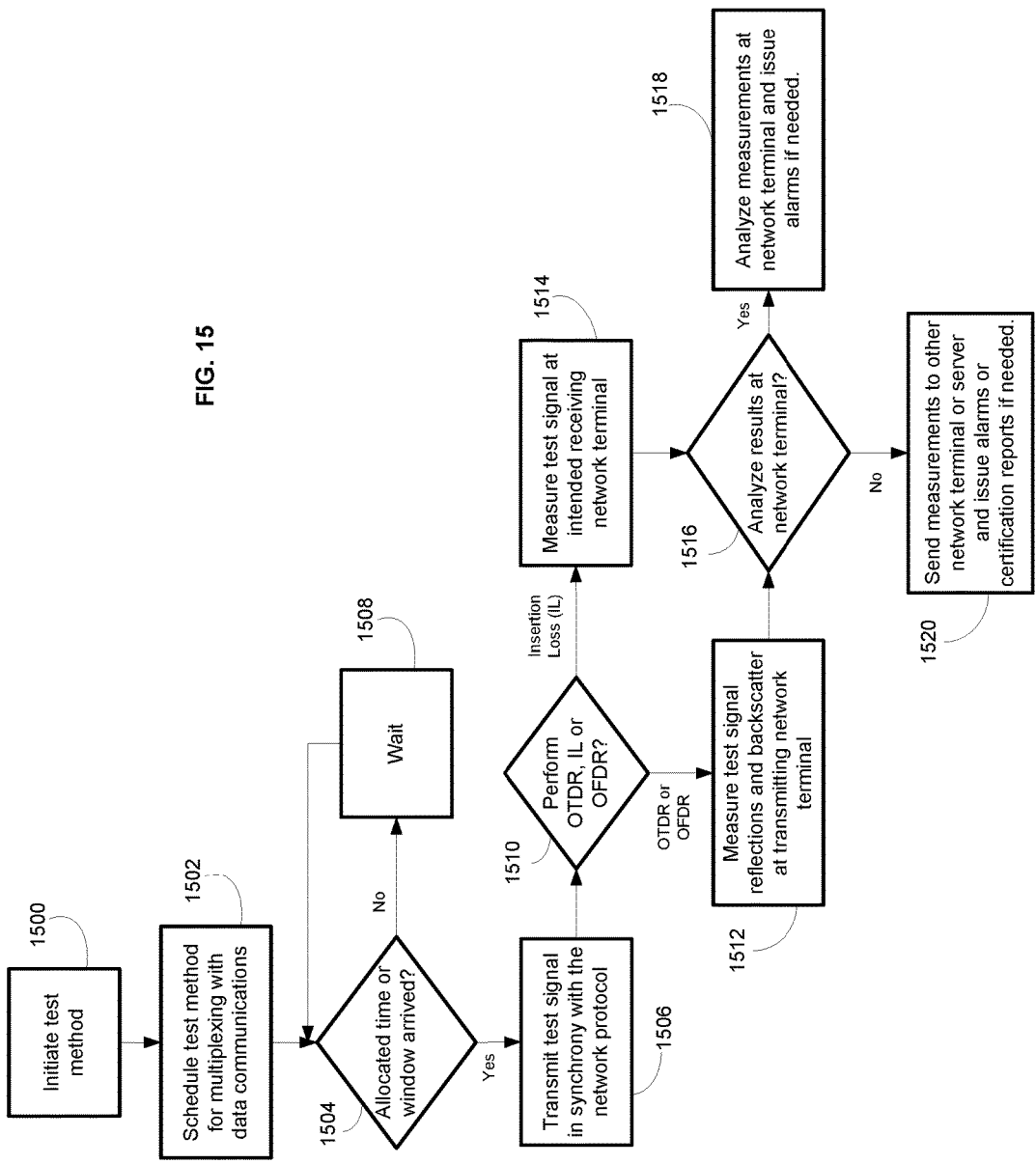

SYSTEM AND METHOD FOR PERFORMING IN-SERVICE OPTICAL NETWORK CERTIFICATION

CROSS-REFERENCES TO RELATED APPLICATIONS

This application is filed under 37 C.F.R. § 1.53(b) as a continuation claiming the benefit under 35 U.S.C § 120 of the pending U.S. patent application Ser. No. 15/470,827, "System and Method for Performing In-Service Fiber Optic Network Certification", which was filed by the same inventors on Mar. 27, 2017 claiming the benefit under 35 U.S.C § 120 of the pending U.S. patent application Ser. No. 15/060,499, "System and Method for Performing In-Service Fiber Optic Network Certification", which was filed by the same inventors on Mar. 3, 2016 claiming the benefit under 35 U.S.C § 120 of U.S. patent application Ser. No. 14/006,671, "System and Method for Performing In-Service Fiber Optic Network Certification", which was filed by the same inventors on Sep. 21, 2013 claiming the benefit under 37 C.F.R. § 1.53(b) of U.S. patent application Ser. No. 13/070,454, "System and Method for Performing In-Service Fiber Optic Network Certification", which was filed by the same inventors on Mar. 23, 2011 claiming the benefit under 37 C.F.R. § 1.53(b) of U.S. patent application Ser. No. 12/233,495, "System and Method for Performing In-Service Fiber Optic Network Certification", which was filed by the same inventors on Sep. 18, 2008 claiming the benefit under 37 C.F.R. § 1.53(b) of U.S. patent application Ser. No. 10/793,546 filed on Mar. 3, 2004 by the same inventors and now issued as U.S. Pat. No. 7,428,382 on Sep. 23, 2008, which claims the benefit under 35 U.S.C. 119(e) of U.S. Provisional Application No. 60/451,614, filed Mar. 3, 2003, and entirely incorporated herein by reference. All of the above-referenced patent applications and patents are hereby incorporated herein by reference in their entirety and made part of the present U.S. Utility Patent Application for all purposes.

FIELD OF THE INVENTION

The invention relates generally to optical fiber communication networks, and more specifically to the network certification, diagnostic testing, and optical measurement of an optical fiber network.

BACKGROUND OF THE INVENTION

Troubleshooting, maintenance, and related administration to support customer's service level agreements (SLA) are a large part of an Optical Fiber Network Operator's operational expenses (OpEx) for optical fiber networks. The labor and material costs for troubleshooting and diagnosing maintenance or service outage problems within an optical fiber network can dominate an Operator's operating budgets and impact customer's SLAs negatively. Operators have deployed redundant networks that have multiple optical fiber links with automatic loss of link detection and switchover capabilities to insure SLAs and other mission critical services are maintained.

Usually when optical fibers are first deployed, highly skilled personnel or technicians with expensive fiber test equipment are assigned the task of ensuring and verifying desired optical fiber plant link budgets are met. This process of fiber plant deployment occurs before service is enabled to customers or during out-of-service periods, which are closely monitored and sometimes restricted due to customer's SLA constraints. All Long Haul, Metro and Access optical fiber networks are similarly deployed in this manner.

Once a customer or subscriber service is enabled, Operators are responsible for the troubleshooting, maintenance and servicing required by the optical fiber links as they degrade over time. This places extra cost burden on the fiber plants to provide field testability. Typically this field testability requires extra splitters at ends of optical fiber links to allow the connection of optical test equipment. Each additional splitter not only means more capital expense (CapEx) is incurred by the Operator but it also takes away precious dBs from the optical link budget. Operators greatly value their fiber plant optical link budgets where reach and other optical link margin related policies are used to differentiate its service offerings at an optical fiber link level. Operators thus use non-network affecting optical test methods like Optical Time Domain Reflectometry (OTDR) using specialized hand-held devices which use maintenance wavelengths, or optical supervision channels, such as 1625 nm wavelength that is separate and independent from all other wavelengths used to carry customer service network data communications. This is a capital and labor intensive method for routine fiber maintenance checks while ensuring service outages do not occur.

Therefore performing optical fiber network certification or a troubleshooting procedure or maintenance procedure without the requirement for manual troubleshooting, additional maintenance splitters, and without the requirement for a separate and dedicated maintenance wavelength is highly desirable to Operators due to realized OpEx, CapEx and optical link budget savings.

BRIEF SUMMARY OF THE INVENTION

The embodiments of the present invention provide for multiplexing an in-service optical time domain reflectometry (ISOTDR), an in-service optical frequency domain reflectometry (ISOFDR), or an in-service insertion loss (ISIL) test session or a combination thereof using the same wavelength as the data communication signals for point-to-point or point-to-multipoint optical fiber networks while in synchrony with physical layer and data link layer protocols used for establishing, maintaining, administering and terminating network data communications. The time involved with the test sessions, given how they are handled in synchrony with the network protocol, are typically on the same time scale as network protocol broadcast messages or network protocol control or administration events and therefore are not considered to impact or interrupt end user service or SLAs.

Referring now to FIG. 15, a flowchart summarizing the process of in-service testing and certification of optical fiber networks in exemplary embodiments of the present invention is shown. Aspects of embodiments of the invention can include one or more of the following features. Initiating a test method 1500, such as an in-service OTDR (ISOTDR), in-service Insertion Loss (ISIL), or in-service OFDR (ISOFDR) test or a combination thereof can be done by an application layer entity such as a Network Certification Service Entity (NCSE) (embedded or external to an optical network terminal or apparatus). The NCSE among other duties provides a Multiplexing Service Entity (MSE) with test method parameters. The MSE interfaces with a network protocol in-use having predetermined time intervals or frames for data communications to schedule, allocate or grant times for frames or messages required to coordinate and multiplex test method events in synchrony with the network protocol 1502. When the scheduled, allocated or granted time or window to perform the test method has arrived 1504 the MSE then causes a Physical Layer Service Entity (PLSE) to transmit a test signal in synchrony with the network protocol 1506 otherwise the MSE waits 1508 for the allocated time or window 1504. If the test method involves an ISOTDR or an ISOFDR test method 1510 then light transmissions cease for a predetermined time after the test signal transmission to facilitated measurements of the optical reflections and backscatter from the transmitted test signal. Measurements of the reflections and backscatter are performed at the same optical network terminal performing the test signal transmission 1512. If the test method is an ISIL test method 1510 then light transmissions need not cease and the test signal can continue to be transmitted for the duration of the test method. IL measurements of the test signal are performed at a desired or intended receiving optical network terminal(s) 1514. Durations for ISIL only test methods can be much shorter in time duration than test methods involving OTDR or OFDR due to the IL only test method does not require time to measure optical reflections or backscatter. In some embodiments, analysis of measurements at the optical network terminal 1516 performing a measurement of a test method can be performed and alarms either visual (e.g., LED indication) or network protocol based can be issued 1518. In embodiments with external servers (e.g., at a Network Operations Center (NOC) or data center or cloud compute farms) the measurements can be transmitted through network control or data channels to the external servers for analysis which can then raise alarms or issue network certification reports 1520. In some embodiments, measurements can be transmitted through network control or data channels to other optical network terminals which can then analyze and issue alarms or certification reports 1520.

In one aspect of an embodiment of the invention the optical fiber network is a point-to-multipoint optical fiber network such as ITU-T G.984 Gigabit PON (G-PON), ITU-T G.987 10 Gigabit PON (XG-PON), IEEE 802.3ah Ethernet PON (EPON), IEEE 802.3av 10 Gigabit Ethernet PON (10G-EPON), WDM-PON, ITU-T G.983 (BPON), and RFoG SCTE IPS910, SCTE 174 2010.

In one aspect of an embodiment of the invention the optical fiber network is a point-to-point optical fiber network such as Active Ethernet IEEE 802.3ah, Gigabit Ethernet IEEE 802.3z, 10-Gigabit Ethernet IEEE 802.3ae, 40-Gigabit Ethernet and 100-Gigabit Ethernet IEEE 802.ba, SONET/SDH as defined by GR-253-CORE from Telcordia and T1.105 from American National Standards Institute, Ethernet over SONET/SDH (EoS), Metro Ethernet Forum (MEF) Metro Ethernet, MPLS based Metro Ethernet, IEEE 802.3 Ethernet and Fibre Channel.

In one aspect of an embodiment of the invention a sequence or pattern for bit clock recovery is transmitted after the predetermined time with no light transmissions.

In one aspect of an embodiment of the invention the test method measurements are analyzed to determine transmitter coupling efficiencies.

In one aspect of an embodiment of the invention the test method measurements are analyzed to detect and locate optical fiber link tampering.

In one aspect of an embodiment of the invention the test method measurements are analyzed to determine microbends or macrobends in one or more optical fiber link.

In one aspect of an embodiment of the invention the test method measurements are analyzed to determine insertion loss between to optical network terminals.

In one aspect of an embodiment of the invention the test method measurements are analyzed to determine optical return loss of a transmitting optical network terminal.

In one aspect of an embodiment of the invention the test method measurements are analyzed to determine reflectance of distal optical network terminals.

In one aspect of an embodiment of the invention the test method measurements are analyzed to determine mean launch power of a transmitting optical network terminal.

In one aspect of an embodiment of the invention the test method measurements are analyzed to determine the location and characteristics of impairments such as optical fiber splices, optical fiber connections, optical splitters, and optical fiber segment loss in one or more optical fiber links.

In one aspect of an embodiment of the invention the test signal includes one or more light transmissions, each comprised of a desired pattern of intensity, frequency, wavelength and duration.

In one aspect of an embodiment of the invention an ISOTDR, ISIL, or ISOFDR test method or some combination thereof are performed when communications between optical network terminals are being underutilized, in lieu of idle packets or idle frames, or silence periods and upon a disruption in communications between optical network terminals.

In one aspect of an embodiment of the invention the optical signals sent over an optical fiber can be continuous mode or burst mode communications.

In one aspect of an embodiment of the invention wavelength division multiplexing (WDM), course wavelength division multiplexing (CWDM), or dense wavelength division multiplexing (DWDM) can be used and a test method performed on any wavelength.

In one aspect of an embodiment of the invention a type field in a frame used for communications is used to indicate a specific test method or inform of a specific test method being performed.

In one aspect of an embodiment of the invention direct digital synthesis to generate a frequency sweep for OFDR test methods can be used.

In one aspect of an embodiment of the invention the payload length indicator (PTI) within GPON encapsulation method (GEM) header is used to indicate an extension of the GEM frame used for test methods.

In one aspect of an embodiment of the invention a unique network traffic address or identifier is used to indicate or be associated with a test method.

In one aspect of an embodiment of the invention an ALLOC-ID is associated with a test method to provide for upstream bandwidth allocation for a test method to be performed.

In one aspect of an embodiment of the invention a Port-ID is used to indicate or be associated with a test method.

In one aspect of an embodiment of the invention an LLID is used to indicate or be associated with a test method.

In one aspect of an embodiment of the invention an operation administration management (OAM) message is used to configure test method parameters of a test method associated with a unique network address identifier at an optical network terminal.

In one aspect of an embodiment of the invention a Physical Layer OAM (PLOAM) message is used to configure the test method associated with an Alloc-ID or Port-ID.

In one aspect of an embodiment of the invention an OAM message is used to configure the test method associated with an LLID.

In one aspect of an embodiment of the invention a PLOAM message is used to configure the test method associated with an LLID.

In one aspect of an embodiment of the invention a plurality of bits in the flag field of an upstream bandwidth map in GPON is used to indicate the reference frame for the stop time of an allocation.

In one aspect of an embodiment of the invention OAM messages are used to convey test method results.

In one aspect of an embodiment of the invention PLOAM messages are used to convey test method results.

In one aspect of an embodiment of the invention OMCI messages are used to convey test method results.

In one aspect of an embodiment of the invention GEM is used to encapsulate and convey test method results.

In one aspect of an embodiment of the invention Ethernet data frames are used to convey test method results.

In one aspect of an embodiment of the invention Ethernet MAC control frames are used to indicate a test method is being performed and convey test method parameters to the PCS layer.

In one aspect of an embodiment of the invention flow control mechanisms and Ethernet MAC control frames are used to create or schedule a PAUSE time period during which a test method is performed.

In one aspect of an embodiment of the invention control code groups are used to inform the PMA layer of a test method being performed.

In one aspect of an embodiment of the invention control code groups are used to indicate timing of segments of a test method being performed to the PMA layer.

In one aspect of an embodiment of the invention the PMA layer can control the PMD layer and control the timing of test methods and receive results of test methods.

In one aspect of an embodiment of the invention the PCS layer can control the PMD layer and control the timing of test methods and receive results of test methods.

In one aspect of an embodiment of the invention Multi-point MAC Control Protocol (MPCP) control frames are used to indicate a test method is being performed and convey test method parameter to the PCS layer.

In one aspect of an embodiment of the invention MPCP control frames are used to create or schedule a PAUSE time period during which a test method is performed.

In one aspect of an embodiment of the invention MPCP sub-layer entity issues Grants to send an OAM message for requesting an Ethernet PAUSE.

In one aspect of an embodiment of the invention MPCP sub-layer entity issues Grants to perform a test method.

In one aspect of an embodiment of the invention a signal used to establish bias voltage across an avalanche photo-diode (APD) is inversely proportional to a signal used to disable the optical transmitter.

BRIEF DESCRIPTION OF THE DRAWINGS

FIG. 1A illustrates optical network terminals and an optical fiber data network in accordance with an embodiment of the present invention;

FIG. 1B illustrates a point-to-multipoint system in accordance with an embodiment of the present invention;

FIG. 6B is an illustration of a table describing the meaning of PTI within the GEM header and incorporating test methods in accordance with an embodiment of the present invention;

FIG. 6D is an illustration of the PLOAM message format and examples for assigning ALLOC-ID and configuring a test method associated with a Port-ID in accordance with an embodiment of the present invention;

FIG. 6E is an illustration of a table describing the meaning of bit values in the Flag field of the Upstream Bandwidth Map (US BW Map) field in accordance with an embodiment of the present invention;

FIG. 7B is an illustration of a table describing the meaning of bit values in upstream PLOAM field in accordance with an embodiment of the present invention;

FIG. 11A is an illustration of a table describing the meaning of control code groups and a test method control code group for Ethernet communications in accordance with an embodiment of the present invention;

FIG. 14A is a block diagram which illustrates a diagrammatic flow of downstream test methods in the Physical layer in accordance with an Ethernet embodiment of the present invention;

FIG. 15 illustrates a state block diagram in accordance with an embodiment of the present invention.

DETAILED DESCRIPTION OF THE INVENTION

Figure 2A:
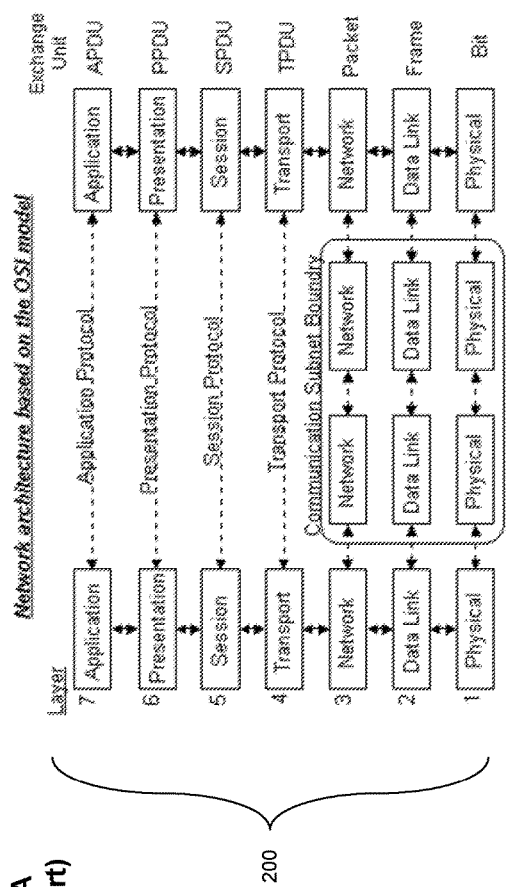
FIG. 2A is a block diagram which illustrates the OSI 7-layer model.

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

The method and system of the present invention can coexist with existing network protocols or be engineered into future network protocols to determine the condition or characteristics of optical fiber links, including optical network terminals and optical components which comprise an optical fiber network. Conventional approaches used to determine the condition of optical fiber links include Optical Time-Domain Reflectometry (OTDR), Optical Loss test (also known as Insertion Loss Test and used as such throughout this disclosure) and Optical Frequency Domain Reflectometry (OFDR). The Telecommunications Industry Association (TIA) has developed many standards covering the OTDR and Insertion Loss test procedures and analysis and these standards (e.g., TIA/EIA-526-7, TIA/EIA-526-14, TIA/EIA TSB-140, TIA/EIA-568.B, etc) are included herein by reference. It will be appreciated by those skilled in the arts that analysis and interpretation of OTDR and Insertion loss data as currently known in the arts can be readily be applied to the results obtained by methods of the current invention.

The OTDR approach or test method involves transmitting a light pulse or a series of light pulses of a desired wavelength, such as a wavelength used for data communications, into one end of an optical fiber under test and then measuring from the same end of the optical fiber the portion of light that is reflected back due to Rayleigh scattering and Fresnel reflection. The intensity of the reflected light is measured and integrated as a function of time and plotted as a function of optical fiber length. OTDR is used for estimating the optical fiber, splitter, and connection losses as well as locating faults, such as breaks in an optical fiber.

In addition to a single optical fiber, OTDR can also be used with multiple optical fibers. For example, when several optical fibers are connected to form an installed fiber plant or optical distribution network (ODN) (e.g., a passive optical network comprised of optical fiber links interconnected with optical splitters, optical combiners, optical filters, and possibly other passive optical components), OTDR can be used to characterize optical fiber and optical connection properties along the entire length of the optical fiber links of the fiber plant. A fiber plant is comprised of optical fiber links which are comprised of optical fiber path or waveguide, connectors, splices, mounting panels, jumper cables, and other passive components.

As described above, in addition to OTDR, Insertion Loss is another method used to determine the condition of optical fiber links. The Insertion Loss method involves transmitting a light pulse or a continuous light signal of known optical power or strength and of a desired wavelength into a first end of the optical fiber under test and then measuring the received optical power or amount of light received at a second end of the optical fiber. The difference between the transmitted optical power and the received optical power is called insertion loss or optical loss. The insertion loss can indicate a fault or failure to meet optical link margin in an optical fiber link if the value is great, indicating the received optical power is too low to ensure accurate signal transmission. Additionally, knowledge of the insertion loss between any combination of transmitters and receivers on an optical fiber link enables the light output power setting on the transmitter to be set at a minimum or optimum setting to ensure accurate signal transmission while saving power and extending the life of the transmitter(s).

OFDR is a method of detecting optical reflections and backscattering in the frequency domain. OFDR uses an optical carrier (e.g., a communication signal wavelength) modulated by a periodic linear frequency sweep as a test signal for transmission on an optical fiber. An inverse Fourier transform of the received response can produce a distance-domain map of the optical fiber and used to assess characteristics of the optical fiber. OFDR is especially useful to measure reflecting elements or components that generate Fresnel reflections such as optical connectors.

Traditionally, OTDR, OFDR, and Insertion Loss Testing are performed when the optical fiber network is "out of service." For example, during initial fiber plant installation and deployment, network technicians use opto-electronic test instruments to perform OTDR, OFDR or Insertion Loss testing after each splice or fiber connection is made. The term "out of service" means the continuity of data communications is interrupted or broken (e.g., interruption of a video stream or a VoIP call). As noted in the Background of the Invention as set forth above, conventional "out of service" maintenance and servicing of optical fiber networks increases overall network costs and decreases network efficiency.

Unlike conventional methods and devices, the present invention uses control of optical transmitters and receivers in synchrony with the network protocol having predetermined time intervals or frames for data communications of an optical fiber network to test and characterize optical fiber links and optical connection properties along the entire length of the optical fiber link(s) while the optical fiber network is "in-service." The term "in-service" means the continuity of data communications is maintained or preserved (e.g., no interruption of a video stream or a VoIP call). Since the invention uses the network protocol having predetermined time intervals or frames for data communications and a plurality of optical transmitters and receivers of a given optical fiber network while the network is operational or in-service to perform an OTDR test, OFDR test or an Insertion Loss test, the systems and methods of the present invention are respectively referred to herein as In-Service Optical Time-Domain Reflectometry (ISOTDR), In-Service Optical Frequency Domain Reflectometry (ISOFDR), and In-Service Insertion Loss (ISIL). As will be shown, in addition to using either an ISOTDR test method, ISOFDR test method or ISIL test method to determine the condition or characteristics of optical fiber links, the ISOTDR, ISOFDR and ISIL test methods can also be combined or performed simultaneously. This combination is referred to herein as ISOTDR-ISIL, ISOFDR-ISIL, and ISOTDR-ISOFDR-ISIL. Generally speaking any and all ISOTDR, ISOFDR, ISIL, ISOTDR-ISIL, ISOFDR-ISIL and ISOTDR-ISOFDR-ISIL test methods are simply referred to throughout the specification as the test methods. It will also be appreciated that the time involved with the test methods, given how they are handled in synchrony with the network protocol in use on the optical fiber network, are typically on the same time scale as network protocol broadcast messages or network protocol control or administration events and therefore are not considered to impact or interrupt end user service or SLAs and maintains the continuity of network communications.

As previously mentioned, the present invention can coexist with existing network protocols having predetermined time intervals or frames for data communications or be designed into future network protocols having predetermined time intervals or frames for data communications, which can be conceptualized using the Open Systems Interconnection (OSI) reference model. The OSI reference model was established by the International Standards Organization (ISO) and is hereby included by reference (ISO/IEC 7498-1). The following description is provided to better understand the flow of data signals through the OSI model.

Referring now to FIG. 2A, wherein like reference numerals designate identical or corresponding parts throughout several views, figures and embodiments and wherein cascading boxes below a part designates a plurality of such parts, the OSI 7-layer model 200 is an abstract model of a networking system divided into layers, numbered 1 through 7. Within each layer, one or more entities implement the functions of a layer. Additionally, each layer provides services to the other layers adjacent to it, thereby forming a modular framework and allowing diverse entities at potentially any layer to communicate with each other. As defined herein, entities are active protocol elements in each layer that are typically implemented by means of software or hardware processes at points, nodes, computers or terminals on the optical network. Entities in the same layer on different computers or optical network terminals are called peer entities. In general, optical network terminals are network apparatus that send and receive signals on an end of an optical fiber link. At each layer of the OSI model 200, there can be more than one entity that can implement different protocols depending on the layer.

Figure 2B:
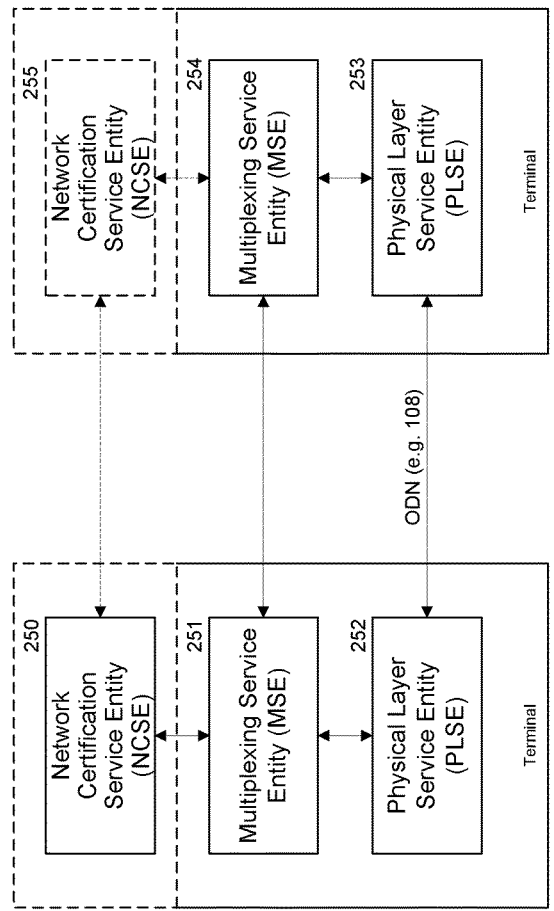
FIG. 2B is a block diagram which illustrates various entities of an optical network system in accordance with an embodiment of the present invention.

In embodiments of the invention, shown in FIG. 2B, a networking system includes the following entities: a network certification service entity (NCSE) 250,255, a multiplexing service entity (MSE) 251,254 and a physical layer service entity (PLSE) 252,253, wherein each of these entities can be implemented in hardware, software or a combination thereof and comprise a plurality of sub-entities. Although the functions associated with each entity and the interactions between entities are described herein with reference to specific communication network protocols further discussed below in reference to FIGS. 4A-7C and FIGS. 9A-14D, it is understood that a variety of communication network protocols can not only be used but are envisioned.

In general, PLSE 252,253 coordinates and performs the functions required by the test methods and resides at the physical layer of the OSI model. The MSE 251,254 is served by the PLSE 252,253 and causes the functions of scheduling, allocating, granting times for frames or messages required to coordinate and multiplex test method events in synchrony with the data communication protocol of the optical fiber network. The MSE 251,254 can reside at the same OSI layer as the PLSE 252,253 or can reside at an OSI layer above the PLSE 252,253 (e.g. data link layer). The NCSE 250,255 is served by the MSE 251,254 and the NCSE is responsible for initiating test methods, establishing values or parameters required by the MSE and PLSE to perform test methods, receiving the results or measurements of the test methods, analyzing received test method results or measurements, and can issue optical fiber network certification reports. The NCSE 250,255 can reside at the same OSI layer as the MSE 251,254 or at an OSI layer above the MSE 251,254 (e.g., application layer).

A Network Management System (NMS) is a combination of hardware and software used to monitor and administer a network. Individual network elements (NEs) in a network (e.g., optical network terminals) are managed by an Element Management System (EMS). In an embodiment of the invention, at least one NCSE 250,255 can be implemented as software running on a server that interfaces with, or is part of, an NMS. In another embodiment, at least one NCSE can be implemented as a combination of hardware and software running on a server that interface with, or is part of an EMS. In yet another embodiment, at least one NCSE can be implemented as a combination of hardware and software residing within one or more capable optical network terminals of the optical fiber network. Exemplary embodiments of capable optical network terminals are optical line terminal (OLT) 150 and optical network unit (ONU) 155, and optical network terminal (ONT) 160 of FIG. 1B discussed further below.

An ONT is a single integrated electronics unit that terminates an optical fiber network and presents native service interfaces to an end user or subscriber. An ONU is an electronics unit that terminates the optical fiber network and may present one or more converged interfaces, such as xDSL or Ethernet, toward the end use or subscriber. An ONU typically requires a separate subscriber unit to provide native user services such as telephony, Ethernet data, or video. In the hybrid fiber coaxial network case, ONUs/ONTs are called nodes, optical nodes or even taps depending on where the fiber network ends and the coaxial cable network begins. In practice, the difference between an ONT and ONU is frequently ignored, and either term is used generically to refer to both classes of equipment and in this specification ONU/ONT and ONU/T terms are used to refer to either an ONU or ONT.

As disclosed above, the NCSE 250,255 is, in general, responsible for initiating test method requests and establishing values or parameters needed by the MSE and PLSE to perform test methods. The NCSE 250,255 can establish MSE parameter values such as test type, network terminal addresses to perform the test, test burst window period, delay period, measurement sampling period and bit clock recovery pattern or sequence. The NCSE 250, 255 can also establishes PLSE parameter values such as optical intensity (i.e., optical power), frequency or pattern of one or more transmissions of light and their durations the sampling resolution of test light transmission measurements for the test methods. These values are referred hereto as test method parameters.

To identify, and thereby characterize, the target optical fiber link 108, the NCSE 250,255 discovers all capable optical network terminal addresses, relative to the network protocol used by the MSE and PLSE, which are capable of performing the test methods. The NCSE 250,255 uses the services of the network protocols 200 to determine the capable optical network terminal addresses. For example, in an embodiment of the invention, before receiving a request to perform test methods at a given network layer address (e.g., IP address) of a capable optical network terminal, an NCSE 250,255 application entity can use the dynamic host configuration protocol (DHCP) application layer protocol for IPv4 networks to retrieve an assigned IP address and other configuration information in lieu of manually configuring NCSE IP address by Service Provider or Network Operator technicians. Similarly, extensions for DHCP for IPv6 (DHCPv6) can be used by NCSE 250,255 application entity to retrieve an assigned IP address. Now that NCSE 250,255 has a network layer address (IP address) the address resolution protocol (ARP) for IPv4 networks can be used, given the received network layer address, to determine the MSE 251,254 data link layer address or media access control (MAC) address of the capable optical network terminal. Similarly the neighbor discovery protocol (NDP) can be used by NCSE 250,255 to determine the MSE 251,254 data link layer address or MAC address of the capable optical network terminal on IPv6 networks. If the NCSE 250, 255 is unable to determine which capable optical network terminals share the same optical fiber link, then the NCSE 250, 255 requests a peer or service entity (e.g., as part of the NMS or EMS) to disclose which capable optical network terminals share the same optical fiber link within the optical fiber network. After the capable optical network terminals are identified, the NCSE 250, 255 is then able to map all capable optical network terminal addresses 256, 257 to every capable end-point on the optical fiber network.

In an alternative embodiment, the NCSE 250,255 can use the services of the network protocols 200 to determine which capable optical network terminals share the same optical fiber link. As previously disclosed, this allows the NCSE 250,255 to map all capable optical network terminal addresses to every capable end-point on the optical fiber network. For example, in an embodiment of the invention, the NCSE 250 can use DHCP, as previously discussed, to retrieve its network IP address and request, via the simple network management protocol (SNMP), a peer OLT Administration entity 404 (FIG. 4A) for the MSE 251 data link layer address in lieu of using the previously mentioned ARP method to determine the capable optical network terminal address that share a common optical fiber link. This embodiment relies on the OLT Administration entity 404 to provide the necessary network layer address to data link layer address translation functions required for the NCSE 250 to establish communications with MSE 251 which intern provides communications with PLSE 252. Once the NCSE 250,255 knows which capable optical network terminals share the same optical fiber link, the NCSE 250,255 then identifies the specific capable optical network terminal address that will be involved in the desired optical fiber link test and initiates the desired test methods.

In yet another alternative embodiment, to initiate the test methods, the NCSE 250,255 can send the IP addresses of the identified capable optical network terminals and method test parameters to the MSE 251,254 via the network protocol services without peer OLT Administration entity providing the necessary network layer address to data link layer address translation functions. This can be done by MSE 251,254 using bootstrap protocol (BOOTP) or DHCP to obtain its network IP address from a configuration server managed by the Service Provider or Network Operator. The NCSE 250,255 network IP address is determined by using DHCP as previously mentioned. After initiating the test methods, the NCSE 250,255 receives test results or measurements data of the test methods from the MSE 251,254. This embodiment relies on the MSE 251, 254 obtaining a network IP address independently from the NCSE 250,255 obtaining the MSE network IP address. The NCSE can discover an MSE network IP address by sending a query request to a domain name system (DNS) server. Alternatively, the MSE can discover the NCSE network IP address by sending a network IP address query request to a DNS server; and once the NCSE network IP address is obtained then the MSE registers itself with the NCSE so that the NCSE knows the MSE network IP address before initiating the desired test method. It will be appreciated that NCSE and MSE can use Object Request Broker (ORB), such as Common Object Request Broker Architecture (CORBA), for communications and interactions. While NCSE and MSE are discussed above in terms of network layer and data link layer addresses and related service entities, ORBs can utilize the same or similar addresses and service entities to perform communications in alternative embodiments.

To analyze and interpret the results of the test methods, the NCSE 250, 255 can initiate a plurality of test methods while varying test method parameters to obtain results or measurements for some or all permutations of capable optical network terminal connections within the optical fiber network. In addition, the NCSE 250,255 can use the results or measurements obtained from peer NCEs 255,250 that have previously performed the test methods on the optical fiber network.

In addition to the above-referenced functions and services, the NCSE 250,255 can provide network certification report services to peer entities or service entities that reside at any OSI layer, such as those shown in FIG. 2A. These network certification report services can include descriptions of the state or condition of individual optical fiber links or characteristics of specific optical fiber link elements (e.g., connectors, splices, etc.) within a given optical fiber network during in-service periods or partial in-service periods. A partial in-service period is defined as the period wherein a specific optical fiber link has failed causing out-of-service periods for that part of the optical fiber network. The NCSE network certification report services cover a variety of network components and characteristics including, but not limited to, conditions of individual optical fiber links, such as the location and loss profile of fiber splices, fiber connectors, optical splitters, fiber macrobends, fiber microbends, insertion loss, reflectance of optical network terminals, optical fiber segment loss, mean launch power of transmitting optical network terminal, transmitter optical coupling efficiency, and optical fiber link tampering. The network certification report services can include OTDR trace data and can conform to Telcordia GR-196 standard format.

In an alternative embodiment of the invention, the NCSE 250, 255 can also determine the effective transceiver optical coupling efficiency of an optical network terminal. The resulting network certification report can thereby be used to aid the process of reconciling and mitigating discrepancies of fault isolation and differences between test method results and non-test method results obtained with separate and dedicated optical fiber test equipment (e.g., hand held test equipment).

In general, it will be appreciated that the NCSE network certification report services can cause peer and service entities to initiate operational, administrative and maintenance events, such as alarms, flags, plots, human resource assignments, service layer agreement (SLA) updates or optical component procurement orders, that are used by Service Providers and Network Operators to manage a given optical fiber network in a financially optimal manner. In addition, the NCSE services provide Service Providers and Network Operators with the ability to minimize the overall capital and operational expenses of an optical fiber network during in-service periods, during periods when service outages are being repaired, and during periods when services are being reestablished.

The NCSE services can, in an embodiment of the invention, also provide Service Providers and Network Operators with the ability to monitor an entire optical fiber network to ensure physical fiber or physical layer security can be maintained at all times. For example, if a malicious user or individual attaches an apparatus to an optical fiber link designed to intercept the optical signals in an effort to unlawfully discover information, then the NCSE services are used to detect the fiber tampering, generate a security alert, and identify the location of the malicious tampering event, all of which can be performed while the optical fiber network continues to be in-service.

In an embodiment of the invention, the NCSE 250, 255 can detect a fiber tampering event has occurred by periodically comparing new test method results with previously stored test method results, assuming the stored method results cover the entire optical fiber network and the optical fiber links tested by the new method results eventually cycle over the entire optical fiber network. If the results of NCSE comparisons show any discrepancies or differences between the previously stored method results, then a tampering event can be declared and the NCSE 250,255 can provide the approximate location of the tampering, based on the analysis of the latest test method results, to requesting entities who can then suspend network services to affected optical network terminals.

As previously disclosed in an embodiment of the invention the MSE 251,254 causes the functions of scheduling, allocating, granting times for frames or messages required for coordinating events that are needed to perform the various test methods. In general, the MSE 251,254 receives an initiated test method request from a NCSE 250,255. If the received test method request is not addressed to the PLSE 252, 253 on the same optical network terminal as the MSE 251,254, then the test method request can be forwarded to the appropriate peer MSE 254,251 with the addressed PLSE via the network protocol or in alternative embodiments the request can be ignored. In this regard, the MSE 251,254 can use the network protocol to translate addresses. However, if the received request pertains to the MSE 251,254 then the MSE 251,254 schedules, in synchrony with the network protocol having predetermined time intervals or frames for data communications, the optimal time given network congestion or idleness to perform the requested test method on the optical fiber network. The MSE 251,254 determines the optimal time via services of the network protocol at or below the layer of the MSE 251,254 and from deductions made by the MSE 251,254 from the test method parameters of the received requested test method. An example, in an embodiment of the invention, of a MSE deduction includes, but is not limited to, the amount of time necessary to accomplish the requested test method taking into account the line rate or communication rate of the optical fiber link(s) involved.

If the requested test method is an ISIL, ISOTDR-ISIL, ISOFDR-ISIL or ISOTDR-ISOFDR-ISIL test method, then the MSE 251,254 also schedules a time, via or in synchrony with the network protocol, to receive the results of the insertion loss measurements. In addition, any peer MSE(s) 254,251 that is also involved with the requested test method is also informed, via and in synchrony with the network protocol, of the scheduled time that the requested test method will be performed. Further, the MSE 251,254 can also send to the PLSE 252,253, on the same optical network terminal as the MSE 251,254, the test method parameters and the capable optical network terminal addresses received from the test method request in time for the now scheduled test method to be performed by the PLSE 252,253 via and in synchrony with the network protocol.

As disclosed above and referring to FIG. 2B, in general a PLSE coordinates the functions required to perform the test methods and exists at the physical layer of the OSI model. The PLSE 252,253 receives from the MSE 251,254 a request to perform a test method together with the associated test method parameters and capable optical network terminal addresses involved in performing the requested test method.

In general, the PLSE 252,253 performs the requested test method by transmitting necessary test signals or test light transmissions, disabling light transmission and, in some instances depending on the test method (e.g., OTDR, OFDR), measuring the reflected test signal or test light transmissions. Further, the PLSE 252,253 can measure the test signal or test light transmissions from another PLSE that shares the optical fiber link, again depending on the test method (e.g. ISIL).

In addition to the OSI model, the present invention will now be described with respect to a high-level overall representation of an optical fiber network. Referring to FIG. 1A, embodiments of high-level overall representation of optical network terminals of an optical fiber network in accordance with the present invention includes a first transceiver 100 in communication with a second transceiver 101 via an optical fiber 108. As shown in FIG. 1A, the first transceiver 100 and the second transceiver 101 include optical transmitter circuitry (Tx) 134, 135 to convert electrical data input signals into modulated light signals for transmission over optical fiber 108. In addition, the first transceiver 100 and the second transceiver 101 also include optical receiver circuitry (Rx) 133, 136 to convert optical signals received via optical fiber 108 into electrical signals and to detect and recover encoded data and clock signals. Furthermore, first transceiver 100 and second transceiver 101 can contain a micro controller, cpu, or other communication logic and memory 131, 132 necessary for network protocol operation. Although the illustrated and described embodiments of the transceivers 100, 101 include a micro controller, embedded cpu, or other communication logic and memory in the same package or device as the optical transmitter circuitry 134, 135 and optical receiver circuitry 133, 136, other embodiments of transceivers can also be used (e.g., as discrete or separate components or some combination thereof).

As shown in FIG. 1A, the first transceiver 100 transmits and receives data signals to or from the second transceiver 101 in the form of modulated optical light data communication signals of known wavelength via optical fiber 108. The transmission mode of the data signals sent over the optical fiber 108 can be continuous, burst or both burst and continuous modes depending on the implementation of an embodiment. Alternatively, in another embodiment both transceivers 100,101 can transmit or receive a same wavelength (e.g., the light signals are polarized and the polarization of light transmitted from one of the transceivers is perpendicular to the polarization of the light transmitted by the other transceiver). In another embodiment a single communication signal wavelength can be used by both transceivers 100, 101 (e.g., the transmissions are in accordance with a time-division multiplexing scheme or similar communication protocol).

In yet another embodiment in accordance with the invention, wavelength-division multiplexing (WDM) can also be used. WDM is herein defined as any technique by which two optical communication signals having different wavelengths can be simultaneously transmitted bi-directionally with one wavelength used in each direction over a single optical fiber. In one embodiment, coarse wavelength-division multiplexing (CWDM) or dense wavelength-division multiplexing (DWDM) can be used. CWDM and DWMD are herein defined as any technique by which two or more optical data communication signals having different wavelengths are simultaneously transmitted. The difference between CWDM and DWDM is CWDM wavelengths are typically spaced 20 nanometers (nm) apart, compared to 0.4 nm spacing for DWDM wavelengths. Both CWDM and DWDM can be used in bi-directional communications. In bi-directional communications, (e.g., if wavelength division multiplexing (WDM) is used), the first transceiver 100 can transmit data signals to the second transceiver 101 utilizing a first communication signal wavelength of modulated light conveyed via optical fiber 108 and, similarly, the second transceiver 101 can transmit data signals via the same optical fiber 108 to the first transceiver 100 utilizing a second communication signal wavelength of modulated light conveyed via the same optical fiber 108. Because only a single optical fiber is used, this type of transmission system is commonly referred to as a bi-directional transmission system. Although the optical fiber network illustrated in FIG. 1A includes a first transceiver 100 in communication with a second transceiver 101 via a single optical fiber 108, other embodiments of optical fiber networks, such as those having a first transceiver in communication with a plurality of transceivers via a plurality of optical fibers (e.g., shown in FIG. 1B), can also be used as well as those having a first and second transceiver in communication over a plurality of optical fiber (e.g. 109, 110). Additionally, while preferred embodiments of the invention to be discussed have a first transmitter and first and second receivers, it will be appreciated that embodiments of the invention can incorporate one or more transmitters on different wavelengths with corresponding receivers for the different wavelengths are possible in keeping within the scope of the invention.

As shown in FIG. 1A, electrical data input signals (Data IN 1) 115, as well as any optional clock signal (Data Clock IN 1) 116, are routed to the transceiver 100 from an external data source (not shown) for processing by the communication logic and memory 131. Communication logic and memory 131,132 processes the data and clock signals in accordance and in synchrony with a network protocol in-use between transceivers. Communication logic and memory 131,132 provide management functions for received and transmitted data signals including queue management (e.g., independent link control) for each respective link, demultiplexing or multiplexing and other functions described further below. The processed signals produced are transmitted by the optical transmitter circuitry 134. The resulting modulated light signals produced from the first transceiver's 100 optical transmitter 134 are then conveyed to the second transceiver 101 via optical fiber 108. The second transceiver 101, in turn, receives the modulated light signals via optical receiver circuitry 136, converts the light signals to electrical signals, processes the electrical signals via the communication logic and memory 132 in accordance and in synchrony with an in-use network protocol and can output or forward the result through electrical data output signals (Data Out 1) 119, as well as any optional clock signals (Data Clock Out 1) 120.

Similarly, the second transceiver 101 receives electrical data input signals (Data IN 1) 123, as well as any optional clock signals (Data Clock IN) 124, from an external data source (not shown) for processing by the communication logic and memory 132 and transmission by optical transmitter circuitry 135. The resulting modulated light signals produced from the second transceiver's 101 optical transmitter 135 are then conveyed to the first transceiver 100 via optical fiber 108. The first transceiver 100, in turn, receives the modulated light signals via optical receiver circuitry 133, converts the light signals to electrical signals, processes the electrical signals via the communication logic and memory 131 in accordance with an in-use network protocol and can output the result through electrical data output signals (Data Out 1) 127, as well as any optional clock signals (Data Clock Out 1) 128.

It will be appreciated that first 100 and second 200 transceivers of the optical fiber data network 140 of the present invention can also include a plurality of electrical input and clock input signals, denoted herein as Data IN N 117/125 and Data Clock IN N 118/126, respectively, and a plurality of electrical output and clock output signals, denoted herein as Data Out N 129/121 and Data Clock Out N 130/122, respectively. The information provided by the plurality of electrical input signals can be used by a given transceiver to transmit information via optical fiber 108 and, likewise, the information received via optical fiber 108 by a given transceiver can be outputted by the plurality of electrical output signals. The plurality of electrical signals denoted above can be combined to form data plane or control plane bus(es) for input and output signals respectively. In some embodiments of the invention, the plurality of electrical data input signals and electrical data output signals are used by logic devices or other devices located outside (not shown) a given transceiver to communicate with the transceiver communication logic and memory 131, 132, transmit circuitry 134,135, and receive circuitry 133, 136.

Since the PLSE as previously discussed, is located at the physical layer in the OSI model and the responsibilities of the PLSE involve optical transmit and receive functions, embodiments of the PLSE include control of transmit and receive circuitry. Referring to the exemplary embodiment of a portion of an optical network terminal of FIG. 3 and in view of FIG. 1A, the communication logic and memory 131,132, the transmit circuitry 134,135 and the receive circuitry 133,136 of the transceivers 100,101 are further illustrated and now discussed. When desired, the communication logic and memory 131,132 transmits outgoing data signals via electrical signals 323 to the laser Driver (Driver) 322 which can be a continuous mode or burst mode laser driver. The Driver 322 drives an optical transmitter such as Laser Diode (LD) 315, which transmits light data signals in response to modulation current or bias current of electrical signals 323. The modulation current typically corresponds to high data values, such as logic 1, and a bias current typically corresponds to low data values, such as logic 0. As such, the LD 315 transmits light in response to the modulation and bias current.

The light emitted from LD 315 travels into optical fiber 108 with the aid of the fiber optic interface 301. The fiber optic interface 301 optically couples the LD 315 and an optical receiver such as PhotoDetector or PhotoDiode (PD) 311 to optical fiber 108. The fiber optic interface 301 can include, but is not limited to, optical filters, beam splitters, and lenses. The fiber optic interface 301, as depicted in this embodiment of the invention, includes lenses 303,302 to aid in the visualization of the optical coupling provided by interface 301.

Figure 3:
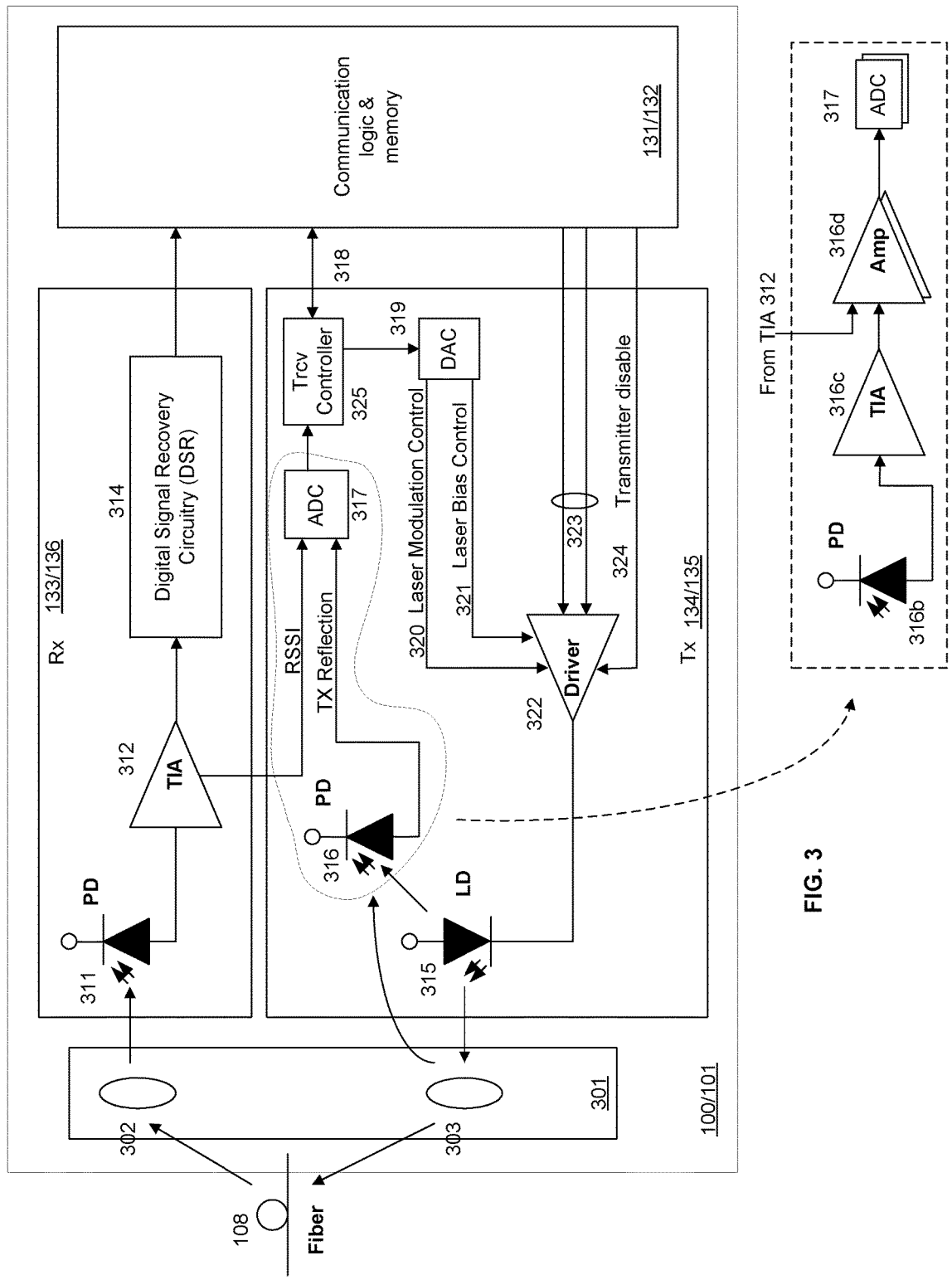
FIG. 3 is a block diagram which illustrates the block level circuitry and components of a portion of an optical network terminal of a optical fiber data network in accordance with an embodiment of the present invention.

Referring now to the transceiver 100,101 of FIG. 3 and in view of FIG. 1A, the transceiver 100,101 receives data signals in the form of light transmissions along optical fiber 108 that travel through the fiber optic interface 301 and are received by PD 311. In response, PD 311 provides a photocurrent to the TransImpedance Amplifier (TIA) 312 that converts the photocurrent into an electrical voltage signal. The electrical voltage signal from TIA 312 is then sent to the Digital Signal Recovery (DSR) circuitry 314 (which includes clock and data recovery (CDR)), which converts the electrical voltage signals into digital signals. The DSR circuitry 314 can further detect digital waveforms within the electrical voltage signal and output a well-defined digital waveform. Finally, the digital waveform is sent as received data signal input to the communication logic and memory 131,132.

In general, light transmissions of the transceiver 100,101 are controlled by controller such as the communication logic and memory 131,132. As shown in FIG. 3, the communication logic and memory 131,132 communicates with the transceiver controller (trcv controller) 325 via a digital Input/Output bus 318. The trcv controller 325 is composed of a combination of hardware and software. The trcv controller 325 controls the laser modulation control signal 320 and bias control signal 321 via a signal conversion performed by two Digital to Analog Converters (DAC) 319 (though only one shown in figure). The laser modulation and bias control signals communicate with the Driver 322 and, thereby, control the upper and lower bounds of the output light intensity of the LD 315. This is accomplished by setting upper bounds on lower bounds on the laser modulation and bias signals provided by the Driver 322 to the LD 315. In an alternative embodiment, Driver 322 uses current flow instead of voltage changes to control laser modulation and bias currents. The light transmissions from the LD 315 can be terminated or enabled via the transmitter disable signal 324, which is an electrical signal sent to the Driver 322 via the communication logic and memory 131,132. Therefore, in view of the combination of electrical signal(s) 323, laser modulation control signal(s) 320, laser bias control signal(s) 321 and the transmitter disable signal(s) 324, the communication logic and memory 131,132 has control over light transmissions of the transceiver 100,101.

With regard to the test methods of the present invention, a transceiver performing the test methods involving OTDR or OFDR such as ISOTDR, ISOFDR, ISOTDR-ISIL, ISOFDR-ISIL, or ISOTDR-ISOFDR-ISIL test methods measures the reflected test signal or test light transmissions via an optical receiver such as the PhotoDetector or Photo-Diode (PD) 316. In general, test signal or test light transmissions from the LD 315 travel into optical fiber 108 and continually produce reflected light back to the LD 315 as the test signal or test light transmissions travel along optical fiber 108 (e.g., due to Rayleigh scattering, Fresnel reflection). The PD 316 is optimally positioned to receive these reflected test signal or test light transmissions or reflections. The PD 316 is typically referred to as a front facet monitor photo diode that performs the function of monitoring the output power of the LD 315. As discussed above, the PD 316 receives the reflected light which it then converts to an analog electric signal and transmits this electric signal to the Analog to Digital Converter (ADC) 317. The ADC 317 further converts the analog signal to a digital signal and transmits the digital signal to the trcv controller 325. Under the direction of the communication logic and memory 131,132, the trcv controller 325 then sends the digital signal, via the digital I/O bus 318, to the communication logic and memory 131,132 as the measured OTDR or OFDR data.

In addition to the above functions, the transceiver 101,100 can also measure test signal or test light transmissions from other optically linked transceivers performing the test method involving Insertion Loss such as the ISIL, ISOTDR-ISIL, ISOFDR-ISIL, or ISOTDR-ISOFDR-ISIL test methods. These test signal or test light transmissions from the test methods are measured by the PD 311 and are converted to photocurrent that is then sent to the TIA 312. The internal circuitry of TIA 312 mirrors the average photocurrent and converts this average to a proportional voltage that is often referred to as Receive Sense Sensitivity Indicator (RSSI), which is sent to the ADC 317. The ADC 317 converts the RSSI signal to digital data that is then sent to the trcv controller 325. Under the management of the communication logic and memory 132,131, the trcv controller 325 then sends the digital data via the digital I/O bus 318 to the communication logic and memory 132,131 as measured ISIL data.

The accuracy of the measurements in accordance with the test methods is significant to the ultimate usefulness of the results of these test methods. It will be appreciated that alternative measurement circuitry can greatly increase the accuracy of the measurements. An exemplary embodiment of an alternative measurement circuitry is now discussed with reference to FIG. 3. An alternative circuitry involves replacing the PD 316 with: a more sensitive PhotoDetector or PhotoDiode (PD) 316b (e.g., avalanche photodiode (APD)), a TransImpedance Amplifier (TIA) 316c and a linear Amplifier (Amp) 316d. The replacement PD 316b performs the same functions as the original PD 316 such as providing photocurrent to the TIA 316c. The TIA 316c converts the photocurrent to an electrical voltage signal that is then sent to the Amp 316d. The Amp 316d, which can receive RSSI signals from the TIA 312 as well, provides increased resolution of these electrical voltage signals to the ADC 317. The rest of the process continues as previously discussed. In this regard, the ADC 317 converts the electrical voltage signals to digital data that is then sent to the trcv controller 325. Under the direction of the communication logic and memory 131,132, the trcv controller 325 sends the digital data to the communication logic and memory 131, 132, via the digital I/O bus 318, as either measured OTDR or OFDR data or measured ISIL data, depending upon the measurement source (e.g., PD 316b, PD 311, respectively).

The transceivers 100,101 shown in FIG. 1A and FIG. 3 are an example of an embodiment of PLSEs that can be utilized in accordance with discussions above. In this regard, a test method request can be received via the (Data IN 1) 115,123 signals or alternatively via some set of (Data IN N) 117,125 signals by the communication logic and memory 131,132. The communication logic and memory 131,132, being composed of a combination of hardware and software processes, performs the coordination of functions required for the execution of the received test method.

After the transceiver 100,101 receives the requested test method and the scheduled time period or frame to perform the test method has arrived, the communication logic and memory 131,132 can transmit information or a notification message, in a format consistent and in synchrony with the network protocol, to notify other linked transceivers 101,100 that the requested test method is being performed. The notification message can also be used to notify the appropriate capable optical network terminals of their obligation to measure the requested test method being performed. The notification message is transmitted by the communication logic and memory 131,132 in accordance and in synchrony with the network protocol in-use. Then the communication logic and memory 131,132 uses its control over the LD 315, as previously disclosed, to transmit the test signal or test light transmissions as prescribed by the test method parameters of the requested test method.

Following the test signal or test light transmissions, the communication logic and memory 131,132 disables further light transmissions from the transceiver via signal 324. If the requested test method involves OTDR or OFDR measurements such as an ISOTDR, ISOFDR, ISOTDR-ISIL, ISOFDR-ISIL or ISOTDR-ISOFDR-ISIL test method, then the communication logic and memory 131,132 communicates with the trcv controller 325 to receive measured OTDR or OFDR data in the manner discussed above. The communication logic and memory 131,132 then records the measurements as prescribed by the test method parameters in memory. If the requested test method involves Insertion Loss measurement such as an ISIL test method, then the communication logic and memory 131,132 performs no recording of measurements and waits until the end of the duration of the measurement performed by other linked transceivers. The communication logic and memory 131, 132 knows the duration of the ISIL test method from the test method parameters.

Once the measurement duration has passed, the communication logic and memory 131,132 can transmit a bit clock recovery sequence or pattern in accordance and in synchrony with the network protocol in-use. If the transceiver transmits data signals in continuous mode communication, then the bit clock recovery sequence or pattern is beneficial to restore bit level synchronization with optically linked transceivers. The bit clock recovery sequence or pattern is designed to ensure timing recovery by the DSR 314. If, however, the transceiver transmits data signals in burst mode communication, then the transceiver can transmit a restore clock sequence or, alternatively, allow the DSR of linked transceivers to obtain bit level synchronization with the transmissions that are part of the network protocol such as preamble bits from another burst mode transmission. The communication logic and memory 131,132 can convey the stored measurements or results of the test method back to the MSE that it servers, as per the responsibility of the PLSE via the network protocol(s) in-use.

If the transceiver 101,100 receives a notification that an ISOTDR or ISOFDR test method is being performed by a linked transceiver, then the communication logic and memory 132,131 can ignore any received light transmissions or optical data signals for the remaining duration of the test method. The duration of the test method can be conveyed in the notification message or can be conveyed by the MSE that this transceiver serves, as per the responsibility of the PLSE, via services of the network protocol. If the test method being performed by the linked transceiver involves Insertion Loss measurements such as an ISIL, ISOTDR-ISIL, ISOFDR-ISIL or ISOTDR-ISOFDR-ISIL test method, then the transceiver is required to measure the test signal or test light transmissions as part of the test method. In this regard, the communication logic and memory 132,131 communicates to the trcv controller 325 to receive measured ISIL data in the manner discussed above. The communication logic and memory records and stores the measurements in memory, as prescribed by the test method parameters and for the duration prescribed by the test method parameters. The pertinent information from the test method parameters can be conveyed to the transceiver 101,100 via a notification message or by the MSE that this transceiver serves, as per the responsibility of the PLSE, via services of the network protocol. After the measurement period and once the DSR 314 of the transceiver has achieved bit synchronization, the communication logic and memory 131,132 continues receiving optical data signals from optical fiber input as part of the network protocol in-use. The communication logic and memory 132,131 conveys the stored measurements or results of the test method back to the MSE that it servers, as per the responsibility of the PLSE, via the network protocol(s) in-use.

It will be appreciated that for WDM, CWDM or DWDM employed in an embodiment of a optical fiber network in accordance with the present invention and having a transceiver performing test methods of the invention as described above, the receive data path of the transceiver is not affected by the test method being performed due to the differences in transmit and receive communication wavelengths employed by the network. Likewise, the transmit path of transceivers linked via optical fiber to a transceiver performing a test method are not affected by the test method being performed due to the same differences in transmit and receive communication wavelengths employed by the network. Thus, it will be appreciated that in keeping with the in-service nature of the test methods of the invention a transceiver performing a test method of the invention can continue to receive, and linked transceivers can continue to transmit, network communications in accordance with the network protocol in-use. Furthermore, it will be appreciated that a second transceiver linked via optical fiber to a first transceiver performing a first test method can, in lieu of network communications, perform a second test method of the invention that can overlap partially or completely in time with the first transceiver performing the first test method of the invention due to the use of different wavelengths used for communication in the different directions between the two transceivers.

In addition to the previously described optical fiber data network of FIG. 1A, alternative network configurations are also possible and envisioned. For example, FIG. 1B illustrates an embodiment of a passive optical network (PON), wherein the first transceiver 100 and the second transceiver 101 of FIG. 1A correspond to the optical line terminator (OLT) 150 and the optical networking unit (ONU) 155, and/or optical networking terminal (ONT) 160, of FIG. 1B, respectively. PON(s) can be configured in either a point-to-point network architecture, wherein one OLT 150 is connected to one ONT 160 or ONU 155, or a point-to-multipoint network architecture, wherein one OLT 150 is connected to a plurality of ONT(s) 160 and/or ONU(s) 155. In one embodiment of a point-to-multipoint optical fiber data network, as shown in FIG. 1B, the OLT 150 is in communication with multiple ONTs/ONUs 160, 155 via a plurality of optical fibers 152. In this regard, optical fiber 152 extending externally from the OLT 150 is combined with optical fibers 152 extending externally from the ONTs/ONUs 160, 155 by one or more passive optical splitters 157. Alternative network configurations, including alternative embodiments of point-to-multipoint networks are also possible.

An embodiment of a PON network in accordance with an embodiment of the present invention will now be discussed. As disclosed herein, PONs are a high bandwidth point-to-multipoint optical fiber network, which rely on light-waves for information transfer. Depending on where the PON client side of the optical fiber terminates, the system can be described as, but not limit to, fiber-to-the-curb (FTTC), fiber-to-the-node (FTTN), fiber-to-the-cell-site (FTTCell) (e.g., cell tower), fiber-to-the-desk (FTTD), fiber-to-the-building (FTTB), fiber-to-the-premise (FTTP), or fiber-to-the-home (FTTH). There exists a master-slave relationship between a PON's OLT and ONT or ONU, respectively, due to the nature of point-to-multipoint systems. In this regard, the OLT is the master of the PON, which is the main reason why the OLT usually resides in the Service Provider or Network Operator central office or comparable remote head-end terminal. The central office manages the PON via network operations management entities such as Network Operations Center (NOC) entities. The NOC entities exist at the OSI application layer along with other management entities, such as but not limited to NMS, EMS, operations support systems (OSS), and business support systems (BSS) entities, that are used by Service Providers and Network Operators to operate, administer and manage the PON. Some common NOC management entity functions known to Service Providers and Network Operators are Subscriber SLA Management, Network Physical Layer Security Management, Fiber Plant Operations Management and Network Procurement Management. All these entities and related network management functions can have a business or technical need to access the test method results of the present invention. To access these results the entities can make requests to a peer application layer NCSE entity.

Figure 4A:
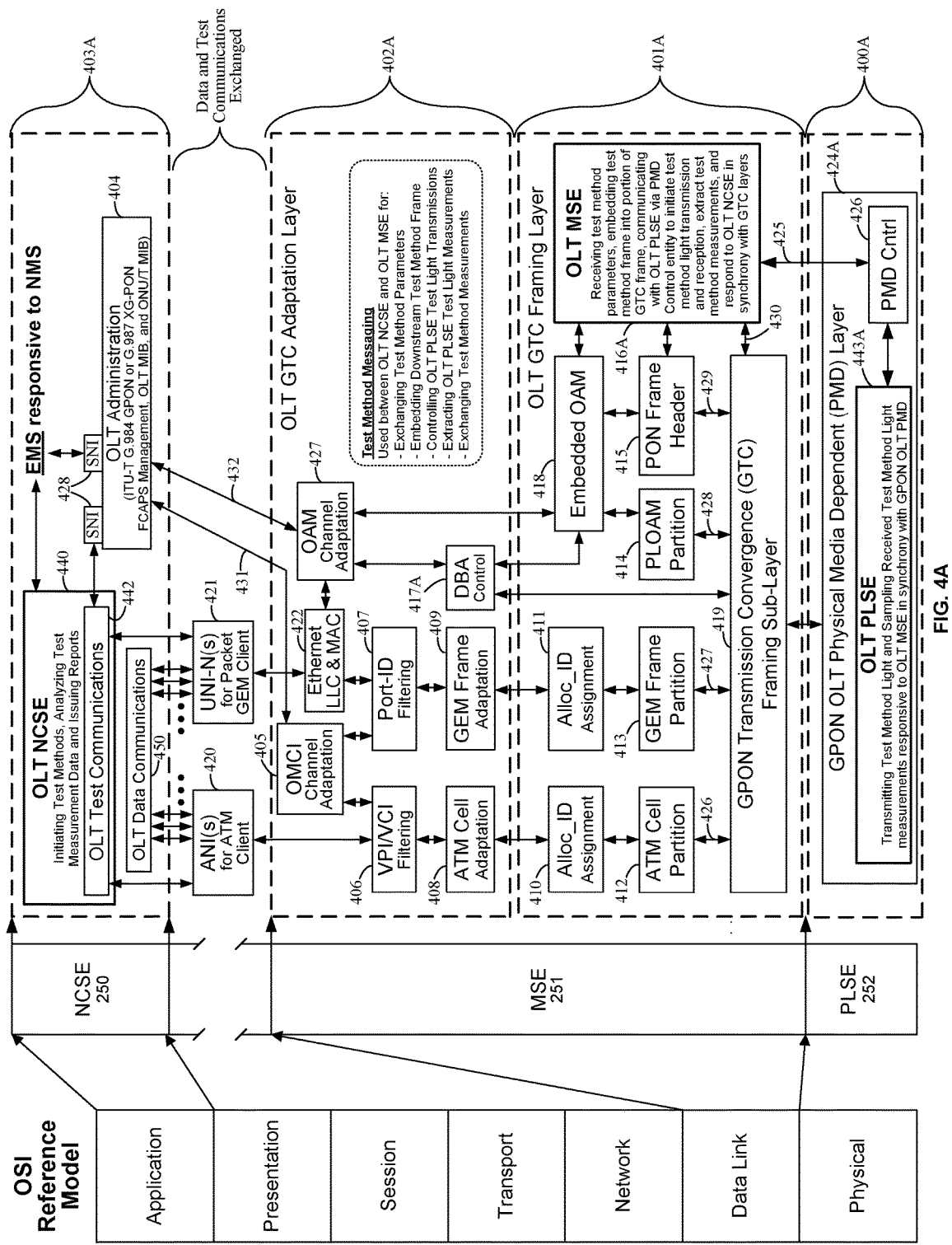
FIG. 4A is a block diagram which illustrates an OSI reference model and related entities of a point-to-multipoint ITU-T GPON or XG-PON Head-end OLT system in accordance with an embodiment of the present invention.
Figure 4B:
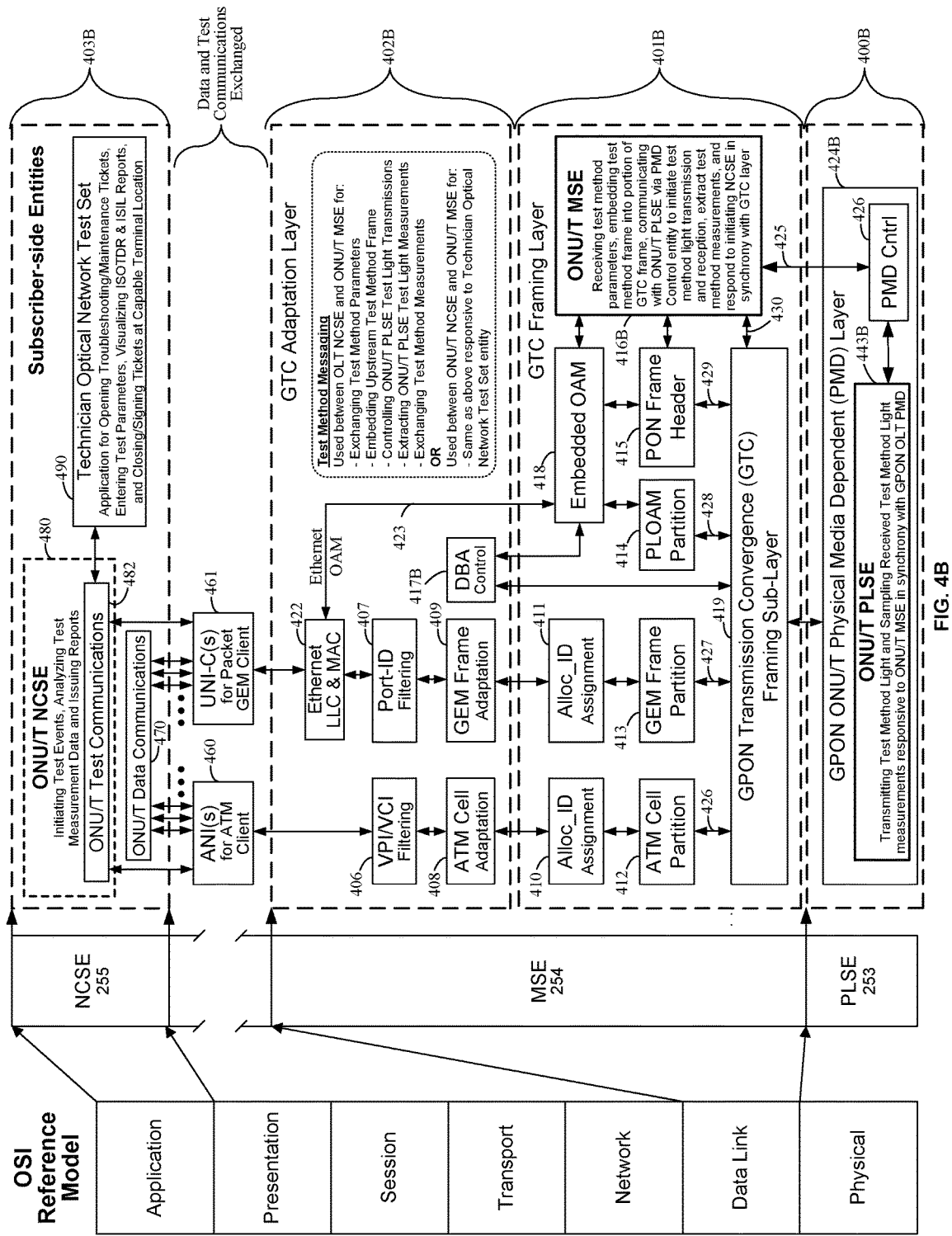
FIG. 4B is a block diagram which illustrates an OSI reference model and related entities of a point-to-multipoint ITU-T GPON or XG-PON Client ONU/T system in accordance with an embodiment of the present invention.

As mentioned previously, NCSEs exchange service requests and test method results or measurements with MSEs via the network protocol in-use. In an embodiment of the invention, the network protocol used by the MSE and PLSE is based on or is similar to the International Telecommunication Union's (ITU) G.984 Gigabit PON (GPON) and G.987 10 Gigabit PON (XG-PON) protocol series, included herein by reference, as shown in FIG. 4A and FIG. 4B, which is patterned after the OSI model. Alternative exemplary point-to-multipoint PON protocol in embodiments include but not limited to (all included here by reference): IEEE 802.3ah Ethernet PON (EPON), IEEE 802.3av 10 Gigabit Ethernet PON (10G-EPON), WDM-PON, ITU-T G.983 (BPON), Data over Cable Service Interface Specification (DOCSIS) PON (D-PON/DPON) and RFoG SCTE IPS910, SCTE 174 2010 as well as any future addendum, annex, normative revision or new version of these protocols for feature, capability or speed enhancements. Alternative exemplary point-to-point optical network protocols in embodiments envisioned include but not limited to: Active Ethernet IEEE 802.3ah, Gigabit Ethernet IEEE 802.3z, 10-Gigabit Ethernet IEEE 802.3ae, 40-Gigabit Ethernet and 100-Gigabit Ethernet IEEE 802.ba, SONET/SDH as defined by GR-253-CORE from Telcordia and T1.105 from American National Standards Institute, Ethernet over SONET/SDH (EoS), Metro Ethernet Forum (MEF) Metro Ethernet, and MPLS based Metro Ethernet as well as any future addendum, annex, normative revision or new version of these protocols for feature, capability or speed enhancements including NG-PON-2. Exemplary protocols in embodiments used to communicate between an NCSE and an MSE include, but not limited to, network layer protocols such as: IPv4, IPv6, ICMP, OCMPv6, IGMP, and IPsec; and transport layer protocols such as: TCP, UDP, DCCP, SCTP, RSVP, and ECN; and application layer protocols such as BGP, DHCP, DNS, FTP, GTP, HTTP, IMAP, IRC, LDAP, RIP, RTP, RTSP, SIP, SMTP, SNMP, SOAP, SSH, Telnet, TLS/SSL, and XMPP.

Referring now to FIG. 4A which illustrates an OSI reference model and related entities for an OLT embodiment and referring to FIG. 4B which illustrates an OSI reference model and related entities for an ONU/T embodiment, both based on the GPON protocol and the passing of information between the OSI physical and application layers in exemplary embodiments of the invention. Between these layers, the PLSE 252, 253 resides at the physical layer, the MSE 251, 254 resides at the data link layer, and the NCSE 250, 255 resides at the application layer in this embodiment. As mentioned previously, the interaction between NCSE, MSE and PLSE entities results in a flow of information concerning the test methods across the network protocol layers.

Referring now to FIG. 4A, OSI Application layer 403A includes Service Provider or Network Operator application entities that provide a NOC with operational, administration and management control over the GPON network and the test methods of present invention. Peer application entities that are under a Service Provider or Network Operator control include OLT Administration entity 404, OLT NCSE 440 and OLT Data Communication entity 450 which are all responsive to an EMS entity and the EMS entity is responsive to an NMS entity. OLT Administration entity 404 performs GPON administration functions outlined by protocol-independent Management Information Base (MIB) and Fault, Configuration, Accounting, Performance-Monitoring and Security (FCAPS) service functions for an OLT which are defined and administered by the Service Provider or Network Operator. OLT Administration entity 404 also performs FCAPS service functions for all client ONU/Ts via an administration protocol (e.g., SNMP) used by the Service Provider or Network Operator to interface 431 with a GPON OLT GTC Adaptation Layer ONT management and configuration interface (OMCI) channel adaptation entity 405 for exchanging OMCI messages (e.g., ITU-T G.988 standard, included herein by reference). OLT Administration entity 404 also provides operations, administration, and management, (OAM) service functions over an administration protocol (e.g., SNMP, Telnet, SSH) used by the Service Provider or Network Operator to interface 432 with a GPON OLT GTC OAM channel adaptation entity 427. OLT NCSE entity 440 is responsive to NMS, EMS and OLT Administration peer entity 404 through service node interface (SNI) 428, SNI as outlined by the GPON standard. OLT NCSE entity 440 processes requests received through SNI 428 to establish test method parameters, initiate test method events, receive test method measurements and results, analyze received the test method measurements and results, and issue test method reports and optical fiber network certification reports. OLT Data Communication entity 450 represents data traffic (i.e., data not related to test methods, for example user application layer data communications).

Referring now to GTC Adaptation Layer 402A and GTC Framing Layer 401A which comprise the OSI Data Link layer in this embodiment. GTC Adaptation Layer 402A includes: OMCI Channel Adaptation entity 405 which processes MIB messages from OLT Administration entity 404; VPI/VCI Filtering entity 406 which performs filtering of Virtual Path Identifiers (VPI) and Virtual Circuit Identifiers (VCI) ATM virtual circuit for ATM service flows of data and test method communications exchanged via ATM Client Access Network Interface entity (ANI) 420 per the GPON standard; Port-ID Filtering entity 407 which performs filtering of Packet Port-IDs for GEM service flows of data and test method communications via Packet GEM Client User Network Interface-Network side entity (UNI-N) 421; ATM Cell Adaptation entity 408 which adapts ATM service flows for encapsulation to the GTC frame per the GPON standard; GEM Packet Adaptation entity 409 which adapts GEM service flows for encapsulation to the GTC frame per the GPON standard; DBA Control entity 417A which performs Dynamic Bandwidth Assignment of upstream Allocation Identifiers (Alloc-ID) used to uniquely identify Transmission Containers (T-CONTs) that multiplex ATM service flows and GEM service flows per the GPON standard; Ethernet Logical Link Control (LLC) and Media Access Control (MAC) entity 422 which performs protocol multiplexing, flow control, error detection, error control and protocol framing for GEM service flows per GPON standard, and OAM Channel Adaptation entity 427 which conveys GTC frame information such as security exchange, DBA, link BER monitoring per the GPON standard and conveys test method information. GTC Framing Layer 401A is responsible creating the GTC frame and includes: ATM service flow Alloc-ID Assignment entity 410 which performs internal GPON routing functions based on Alloc-ID for ATM service flows per the GPON standard; GEM service flow Alloc-ID Assignment entity 411 which performs internal GPON routing functions based on Alloc-ID for GEM service flows per the GPON standard; ATM Cell Partition entity 412 which embeds a portion of the ATM service flow into the GTC frame per the GPON standard; GEM Packet Partition entity 413 which embeds a portion of the GEM service flow into the GTC frame per the GPON standard; Physical Layer OAM (PLOAM) Partition entity 414 which embeds a PLOAM message channel into the GTC frame per the GPON standard; PON Frame Header entity 415 which creates and decodes GTC header fields responsive to the Embedded OAM entity 418 per the GPON standard; OLT MSE entity 416A which embeds the test method frame into the GTC frame, as an extension of the GTC frame, responsive to NCSE; Embedded OAM entity 418 processes field-formatted information in the header of the GTC frame designed to provide a low latency path for time urgent control information such as bandwidth granting, key switching, Dynamic Bandwidth Assignment signaling, and test method frame processing; and GTC Framing sub-layer entity 419 which multiplexes and de-multiplexes portions of the GTC frame responsive to partition entities (e.g., ATM, GEM & PLOAM), PON Header entity 415 and OLT MSE 416A entity to create and manage GTC frame.

The OLT NSCE 440 sends OAM messages to the OLT MSE entity 416A, in the embodiment of FIG. 4A, through OAM Channel Adaptation entity 427 and Embedded OAM entity 418. OLT MSE 416A receives test method parameters from the OAM messages and operates, essentially, as an extension of PON Frame Header entity 415. After receiving test method parameters OLT MSE 416A embeds into a portion of a GTC frame a test method frame (discussed further below in relation to FIG. 6A). OLT MSE 416A provides the GTC Framing sub-layer 419 the length of the test method frame (e.g., sum of the burst time, delay time and test sampling window) and the restore clock pattern (if used). OLT MSE 416A communicates with and configures the OLT PLSE 443A via PMD Control entity 426 to control the transmissions for OTDR and OFDR test methods which enables test signal sequences or patterns to be transmitted by the OLT and test signal measurements to be extracted for OTDR, OFDR or IL tests depending on the test method.

Referring now to OSI Physical layer 400A which includes OLT Physical Media Dependent (PMD) entity 424A which includes OLT PLSE 443A and PMD control entity 426. OLT PMD entity 424A performs physical layer line coding functions such as physical layer frame synchronization (e.g. scrambling polynomial), Forward Error Correction (FEC) for bit error detection or recovery, electrical-to-optical and optical-to-electrical conversion for the transmission and reception of optical communication signals. The OLT PLSE 443A is responsible for controlling the OLT transceiver to perform test light transmission, recording of test light for ISIL measurements and recording of reflected test light for OTDR and OFDR measurements. The OLT PLSE 443A manages the behavior and performance of OLT PMD entity 424A during test method events in response to OLT MSE 416A.

Referring now to FIG. 4B and optional (discuss further below) Application layer 403B includes ONU/T NCSE entity 480, Technician Optical Network Test Set entity 490, and ONU/T Data Communications 470. ONU/T NCSE entity 480 is a peer entity of the OLT NCSE entity 440 with similar capabilities to initiate test methods and is responsive to Technician Optical Network Test Set entity 490. ONU/T NCSE entity 480 provides client side access to test methods via an application layer protocol (e.g., SNMP) used by network technicians to administer test methods using Technician Optical Network Test Set entity 490. Technician Optical Network Test Set entity 490 is an application entity that performs exemplary functions as opening trouble tickets or maintenance tickets, entering test parameters, visualizing test measurements or reports, and closing or signing-off tickets. In some embodiments Technician Optical Network Test Set entity 490 can be included in a hand held device separate from the ONU/T or in alternative embodiments embedded with an ONU/T. In yet another alternative, yet similar, embodiment, technicians can gain access to OLT NCSE entity 440 or ONU/T NCSE entity 480 via communication methods such as cellular 3G, 4G or LTE wireless network, in conjunction with using the Service Provider or Network Operator OSS and BSS platform services which allows the technician access to the appropriate NMS or EMS communications for initiating test methods. These embodiments are beneficial to technicians and optical fiber plant operations and administrations management to glean the most amount of information about the state of the optical fiber link while in remote locations outside NOC and Service Provider or Network operator facilities. However, it will be appreciated that ONU/T NCSE entity 480 and Technician Optical Network test entity 490 are optional in terms of performing test methods and need not be in all embodiments, only embodiments where initiating test methods or obtaining test method results directly from an ONU/T client or remotely from an OLT is desired. ONU/T Data Communication entity 470 represents normal data traffic (i.e., data not related to test methods, for example user application layer data communications).

Referring now to GTC Adaptation Layer 402B and GTC Framing Layer 401B which comprise similar entities that performs similar functions as previously describe in relation to GTC Adaptation Layer 402A and GTC Framing Layer 401A. ONU/T MSE entity 416B is a peer entity of OLT MSE entity 416A and performs similar functions to OLT MSE entity 416A as previously discussed. ONU/T MSE entity 416B responds to OLT NCSE 440 and depending on the embodiment may also respond to ONU/T NCSE entity 480 by receiving OAM messages through Embedded OAM entity 418. It will be appreciated that OAM messages from OLT NCSE 440 to ONU/T MSE entity 416B are transferred via OMCI Channel Adaptation entity 405 and received by ONU/T Physical Media Dependent (PMD) layer entity 424B and pass through either PLOAM Partition 414 or PON Frame Header entity 415 to Embedded OAM entity 418 of the ONU/T. It will also be appreciated that ONU/T MSE entity 416B passes the length of the test method (e.g., sum of the burst time, delay time and test sampling window) to DBA Control entity 417B which sends bandwidth requests and status of queues upstream to DBA Control entity 417A and DBA Control entity 417A allocates or schedules bandwidth with a unique identifier (e.g., ALLOC-ID) to perform the upstream test method and sends the allocation information (e.g., upstream bandwidth map) to the ONU/T per the GPON protocol. It will be appreciated that in some embodiments DBA Control entity 417A can maintain quality of service for ATM and GEM service flows concurrent with test method events.

Referring now to OSI Physical layer 400B which performs similar but complementary functions to OSI Physical layer 400A and includes ONU/T PMD layer entity 424B which in turn includes ONU/T PLSE 443B and PMD control entity 426. It will be appreciated that while ONU/T PMD layer entity 424B and ONU/T PLSE 443B perform similar but complementary functions to OLT PMD layer entity 424A and OLT PLSE 443A, respectively, as previously discussed, ONU/T clients transmit and receive on different wavelengths to the OLT and ONU/T clients perform burst mode transmission. The OLT PLSE 443A and ONU/T PLSE 443B control the GPON PMD optical transceiver responsive to respective MSEs 416A,416B and in synchrony with the GTC Framing sub-layer entity 419, thereby ensuring test methods can occur while maintaining the continuity of network data communication and services across the PON.

It will be appreciated that alternative embodiments of FIG. 4A and FIG. 4B employing ITU-T G.987 XG-PON protocol are not only possible but envisioned. It will be appreciated that alternative embodiments of FIG. 4A and FIG. 4B that arrange or combine entities and functions differently than shown or discussed are possible.

In some embodiments, test methods may cause receivers of optical terminals on the PON to lose frame synchronization. For example, a test method in the downstream that spans more than one GPON frame. In some embodiments this can require circuitry within the physical layer to ensure proper management and synchronization of the bit clocks are maintained to prevent false loss of clock events, which may cause false frame-synchronization error events on the PON. A description of an embodiment of the physical circuitry is discussed in further detail below in reference to FIG. 5. In alternative embodiments false frame synchronization error events triggered by test methods can simply be ignored safely when an OLT or ONU/T has knowledge a test method is occurring or had occurred. In yet another alternative embodiment additional frame synchronization bits or clock bits can follow the test methods event.

Figure 5:
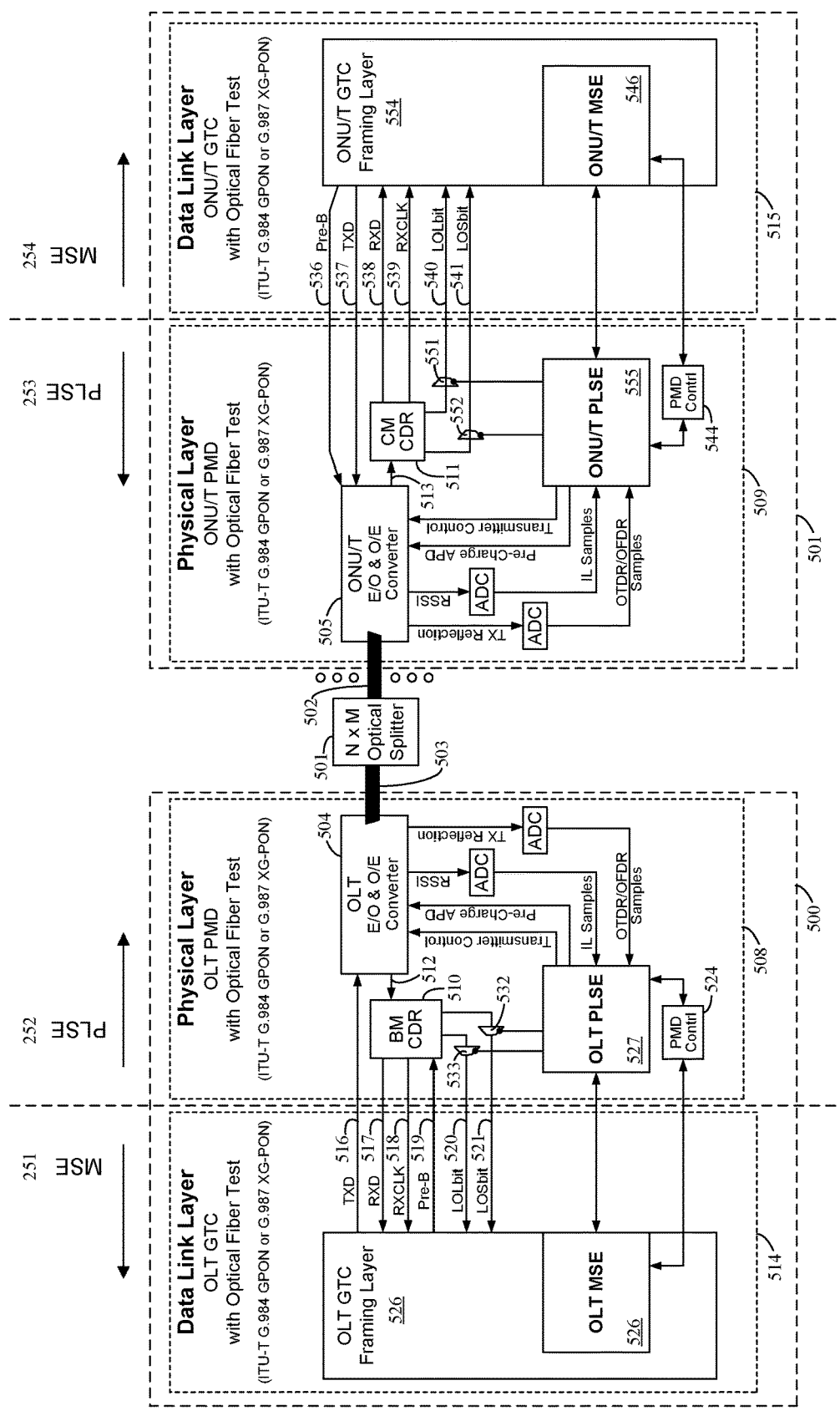
FIG. 5 is a block diagram which illustrates the block level circuitry and physical and data link layers of an OLT and ONU/T of an ITU-T GPON or XG-PON optical fiber data network in accordance with an embodiment of the present invention.

A functional block diagram of the physical block level circuitry and physical and data link layer for exemplary ITU-T GPON PON or G.987 XG-PON OLT 500 and ONU/T 501 embodiments are disclosed with reference to FIG. 5. Physical Layer 508,509 consists of the optical transceivers 504,505 along with clock and data recovery (CDR) functionality 510,511. Non-correlated electrical receive energy from the optical transceivers 504,505, created by GPON and XG-PON scrambling polynomial frame synchronization process to limit consecutive identical digits, is used as inputs to the CDR 512,513. The OLT receive path 512 is a burst mode type consequently a burst mode (BM) CDR 510 is used; whereas the ONU/T receive path 513 is a continuous mode type and consequently a continuous mode (CM) CDR 511 is used. In some embodiments, an early indication that a burst is pending can be sent or generated to facilitate and simplify BM CDR 510 bias control circuitry by the OLT GTC Adaptation and Frame Processing block 535 referenced as a Pre-Burst (Pre-B) Indicator signal 519.

As shown in FIG. 5, the DATA Link Layer 514,515 functions to process incoming receive data (RXD) 517,538, which is synchronized with the receiver clock (RXCLK) 518,539 by the BM CDR 510 or CM CDR 511 respectively, and to process outgoing transmit data (TXD) 516,537. Both OLT and ONU/Ts MSE blocks 526,546 are responsive to an OLT NCSE (not shown) as well as MIB management functions via OAM and OMCI information exchange for initiating test methods as previously discussed. The OLT GTC Framing process 535 performs all the downstream and upstream byte and bit level formatting of information as well as generating the Pre-Burst (Pre-B) 519 signal. This downstream and upstream byte or bit level formatting is shown in FIG. 6 and FIG. 7 and discussed in further detail below. The OLT PLSE block 527 is responsive to the OLT MSE block 526 and manages several event indicators, such as managing the PMD control block 524, and masks or gates 533,532 the Loss of Bit Lock ($LOL_{bit}$) 520 and Loss of Bit Signal ($LOS_{bit}$) 521.

Additionally, in embodiments of the invention utilizing an APD, a PLSE can generate a pre-charge APD signal that generates an APD bias voltage for an APD, in optical transceiver used for OTDR and OFDR measurements (i.e., reflections of the test signal) to more quickly establish the gain or sensitivity of the APD and to save power. Furthermore in embodiments of the invention utilizing an APD, the pre-charge APD signal can be inversely related to the transmitter disable or transmitter laser off (TX Laser Off) signal which turns off the transmitter (e.g. laser diode) during test methods (e.g., during measurement period or sampling window of a test method). For example, when the transmitter is turning off, the APD is turning on, and while the output of the transmitter fades out the bias voltage across the APD is being established. By using the transmitter disable signal for the pre-charge APD signal, the maximum sensitivity of an APD based receive-reflection circuitry can be achieved in the shortest time. Fast reflection measurement acquisition times can be achieved in these embodiments, which can reduce the Delay Time (DT) period 627 of a test method frame. This can improve OTDR and OFDR performance of embodiments by increasing the near field distance from the transmitter where reflection of transmitted test signals can be measured with reasonable accuracy. Additionally, receive sensitivity measurements of −48 dB or better from reflected test signal(s) can be achieved with these embodiments, which extends the reach or distance of where measurements can be taken with reasonable accuracy. In alternative embodiments, the bias voltage of the APD is always maintained after startup of the optical transceiver. It will be appreciated that in some embodiments the APD bias voltage may be compensated to account for temperature and the manufacturing process used to manufacture the APD in order to achieve a constant gain or receive sensitivity.

To minimize the impact to OLT services provided across a GPON and XG-PON, in some embodiments, it is beneficial for OLT MSE and PLSE to gate 532,533 BM CDR state indicator signals (i.e., $LOL_{bit}$ 520 and $LOS_{bit}$ 521) so that bit error management or frame synchronization routines are not falsely triggered during test method events. By ensuring proper masking of these BM CDR state indicator bits 520,521, a test method can occur while maintaining synchrony and continuity of network communications and services deployed across a GPON or XG-PON. By properly coordinating events in accordance and in synchrony with the network protocol in-use the OLT MSE block 526 can ensure a test method is performed while network data communications, or services are processed by the OLT GTC Adaptation and Framing Processing block 535 ensuring continuity of data communications is maintained. Event management is important to enabling test methods using the same transceivers 504,505 used for the network data communication. Proper event management in accordance and in synchrony with the network protocol having predetermined time intervals or frames for data communications is discussed further below.

Referring to FIG. 5, on the ONU or ONT client or multipoint subscriber side of a PON system, similar event coordination by the ONU/T MSE block 546 is required to perform test methods. The ONU/T Physical Layer and Data Link Layer sub-systems shown in FIG. 5 include a similar set of functions found on the OLT to perform test methods.

The ONU/T MSE block 546 coordinates events between the ONU/T GTC Adaptation and Framing Processing block 554, the ONU/T PLSE block 555 and the PMD control 544. The ONU/T GTC Adaptation and Frame Processing block 554 performs similar functions as the OLT Framing Processing block 535. The main difference is on the client or multipoint side, burst and continuous mode of operations are reversed. In this regard, the ONU/T's transmit path (TXD) 537 behaves in a burst mode fashion with a Pre-Burst (Pre-B) indicator signal 536 controlling the behavior of the Upstream burst. The ONU/T's receive path is characterized by the receive data stream (RXD) 538 and recovered receive clock (RXCLK) 539. Some embodiments may perform pre-charging of an APD in transceiver 505 as previously discussed. In addition as previously discussed, inputs from the ONU/T's CDR bit states 540,541 may trigger false resynchronization events during test methods. The $LOL_{bit}$ 540 and $LOS_{bit}$ 541 indicators and gating mechanism 551, 552 are under the control of the ONU/T PLSE block 555, similar to the OLT's PLSE block 527. The source clock signal from the ONU/T CM CDR 511 generates the Loss of bit Lock (LOLbit) 540 and Loss of bit Signal (LOSbit) 541 signals and the ONU/T PLSE block 555 controls the LOLbit gate 551 and LOSbit gate 552 for the LOLbit 540 and LOSbit 541 signals. In summary, by coordinating the masking or gating of the ONU/T CM CDR 511 state indicators 540 and 541, the ONU/T PLSE block 555 can perform test methods while maintaining synchrony and continuity of GTC frame synchronization required to maintain network data communications or services, as discussed further below. It will be appreciated that in alternative embodiments the masking or gating of loss of lock (LOL), loss of signal (LOS), or similar signal need not be done in hardware and any alarms, error management routines or false synchronization events triggered by those signals can be handled in software.

Figure 6A:
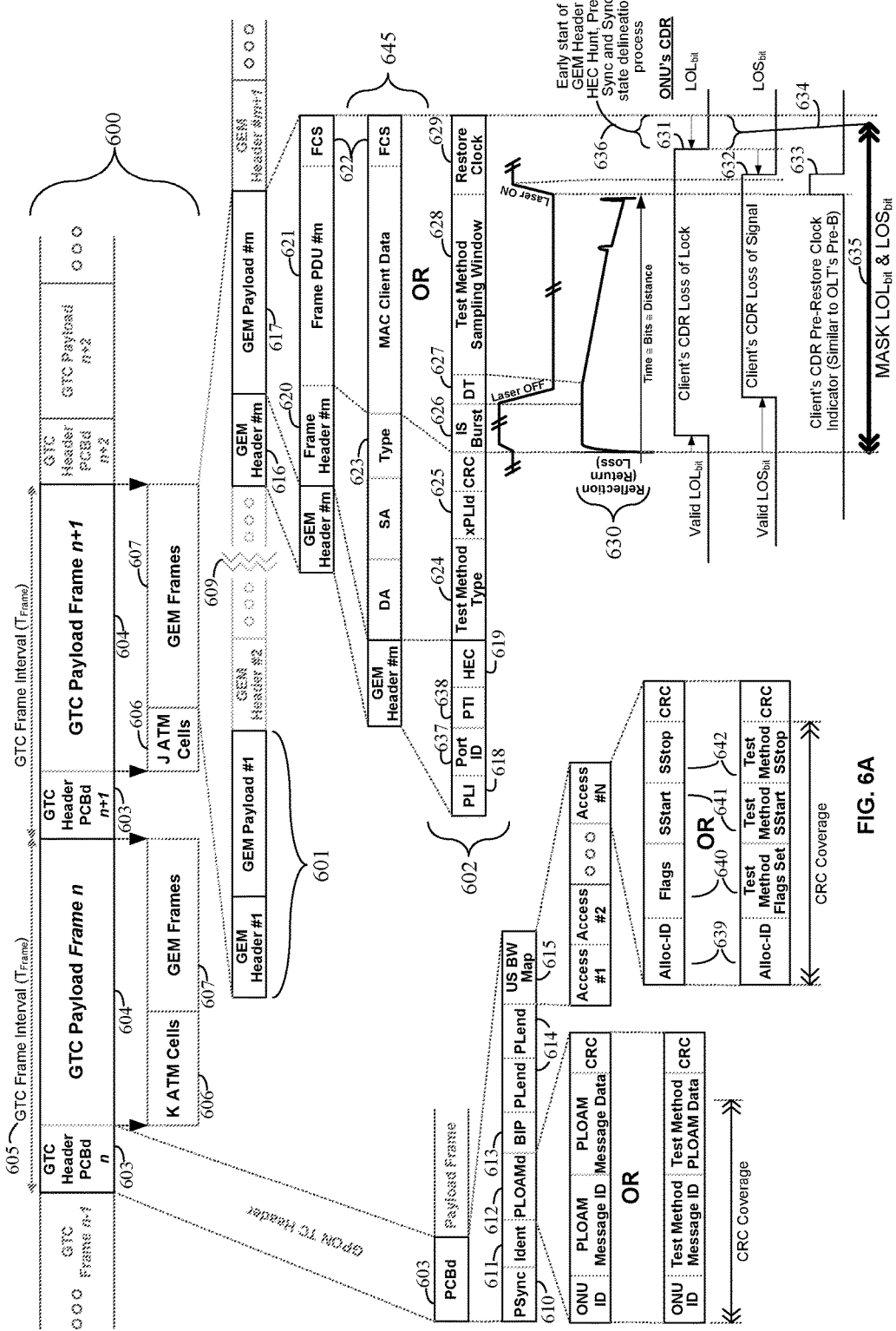
FIG. 6A is a block diagram which illustrates a diagrammatic flow of the downstream communications in an ITU-T G.984 GPON and ITU-T G.987 XG-PON networks incorporating test methods in accordance with an embodiment of the present invention.

FIG. 6A illustrates an exemplary embodiment of a diagrammatic representation of the downstream network protocol having predetermined time intervals or frames for data communications (e.g., PON GTC Frame Interval 605) which includes the multiplexing and framing of information in a point-to-multipoint GPON PON system. The term downstream is meant to indicate information that originates at the OLT and terminates at an ONU/T. In general, the downstream GPON Transmission Convergence (GTC) frames 600 include a series of consecutive GTC header sections 603 plus payload frame sections 604. The GTC downstream header is referred to as the Physical Control Block Downstream (PCBd) 603 and can include Physical Synchronization (PSync) field 610, which is a fixed 32-bit pattern used by an ONU/T to synchronize to the beginning of the GTC frame; GTC Frame Identification field (Ident) 611, which includes a 30-bit superframe counter; Physical Layer OAM downstream (PLOAMd) 612, which is used to send PLOAM message to an ONU/T; Bit Interleaved Parity (BIP) field 613, which is used by an ONU/T to determine the downstream Bit Error Rate (BER); Payload Length downstream (PLend) field 614, which is transmitted twice for robust error detection and includes a two 12-bit field used to convey the length of the upstream bandwidth map and length of the ATM partition; and the Upstream Bandwidth Map (US BW Map) 615 fields, which contains a scalar array of 8-byte allocation structures used by an ONU/T to determine when it can transmit. In alternative embodiments, some fields can be omitted, extra fields added and/or the field order altered.

Either ATM cells or GPON Encapsulation Method (GEM) packets can be included in the Payload Frame section 604 section. Each GTC downstream frame have a fixed frame interval 605 however the number (e.g., K) of ATM cells 606 or the number (e.g., J) of frame fragments over GEM 607 can vary. Within a GEM frame 607 of the GTC Payload Frame 604, a consecutive series 609 of GEM header 616 and GEM payload 617 segments are aligned to fill an entire GTC frame segment 607. Typically, GEM frame 607 is sent before the start of the next PON frame, which is a reason why the start of a GTC header or PCBd 603 begins with a PSync 610. Repeating the PSync 610 in a predictable manner (e.g., having a recurring GTC frame interval of eight kilohertz) ensures proper GTC frame lock is maintained.

In general, test methods adhere to and support a predictable GTC PON frame alignment method. By taking advantage of the last GEM payload before the beginning of the following PCBd 603, a test method can be performed in a manner that maintains the continuity of the PON frame and network communications or services wherein the GEM payload 602 (comprising several time intervals or subframes 624-629) serves as a test interval to perform a test method in continuous mode or downstream communications. In some embodiments, to schedule and to insure proper identification of a pending test method, a special test method type field 624 is used to inform all ONU/Ts of the pending test method. Normally this Type field 623 is used to identify the type of Payload Data Unit (PDU) 621. Once the ONU/T receives a test method indication, then the ONU/T masks Loss of Bit Lock (LOL$_{bit}$) 631 and Loss of Bit Signal (LOS$_{bit}$) 632 to prevent false resynchronization events. Additionally in some embodiments to ensure proper synchronization is maintained, the ONU/T's CDR can be given a pre-restore bit clock pulse indicator 633 that allows the CDR circuitry to normalize bias circuitry and establish a faster bit clock time and data lock time. Furthermore, the ONU/T's CDR require a good clock source in the data stream to restore the bit clock and in some embodiments providing a series of alternating Os and is within a Restore Clock 629 field or an alternative bit sequence or pattern can ensure the bit clock and data recovery is achieved. The unmasking of the LOL$_{bit}$ 631 and LOS$_{bit}$ 632 can be triggered after the ONU/T's CDR 634 establishes lock on Restore Clock 629 or similar reference data. Once both ONU/T CDR state indicator bits (i.e., LOL$_{bit}$ 631 and LOS$_{bit}$ 632) have established phase and signal lock, then the PON framing processing block can begin the GTC frame synchronization hunt or search which marks the earliest time this HUNT state 636 (e.g., early start of GEM header HEC hunt, Pre-Sync and Sync state delineation process) can be performed in some embodiments.

The sampling and recording of measurements of a test method can occur during or after the configured In-Service (IS) Burst 626 (which represents a period for the test signal transmission) and Delay Time (DT) 627 (which represents the of period time between the transmitter turning off and having no light being emitted from the transmitter) have passed from the perspective of an optical transmitter or while it occurs from the perspective of an optical receiver. DT 627 is optional in test methods and need not appear in all embodiments of the invention. By varying desired intensity and frequency characteristics (frequency discussed further below) of the IS Burst 626 optical transmission test signal various optical fiber link diagnostics techniques can be performed such as, but not limited to, optical time domain reflectometry (OTDR), insertion loss, and optical frequency domain reflectometry (OFDR). Regardless of the optical fiber plant diagnostics technique used, multiple test method results or measurements from multiple tests can be used to perform statistical analysis or create an averaged representation of all impairments across the optical fiber network.

It will be appreciated that the duration or interval of a test method can last longer than a single GTC frame interval (e.g., duration of three GTC frame intervals of 125 µs is possible for a 20 km fiber link). However, in downstream communications in both GPON and XG-PON protocols, the ONU/T clients expect to see downstream frame synchronization fields (e.g., PSync 610) at every GTC frame interval (i.e., every 125 µs). A method to schedule and extend test methods beyond a predetermined fixed frame interval of a communication protocol is now disclosed wherein bit fields in the header are used to indicate the duration (e.g., how many frames) of a test method. For example in GPON and XG-PON using GEM, the payload length indicator (PLI) field 618 in the GEM Header 616 indicates the length, in bytes, of the succeeding GEM Payload fragment 617 and is used to delineate and find the next header in the stream and to contributes to the determination of the end of the GTC frame interval. The payload typed indicator (PTI) field 638 is used to indicate the content type of the GEM Payload fragment 617 (e.g., user data, OAM) and indicates if it is the last fragment of the content type. The PTI field 638 values are shown in the table of FIG. 6B, the PTI field 638 is a 3-bit field indicator with reserved values. In an embodiment of the invention, a reserved PTI field 638 code value (e.g., 111) is used to indicate that a test method will begin in the succeeding GEM payload fragment 617 and to check the GEM frame fragment header 620 for test method type field 624 and for an extension of the PLI field (xPLId) 625 which can be used to indicate the length of the test method (e.g., length in bytes). Use of the test method type field 624 provides identification of the test method type (e.g., ISOTDR, ISOFDR, ISIL, ISOTDR-ISIL, ISOFDR-ISIL, and ISOTDR-ISOFDR-ISIL) and the xPLId 625 provides the duration of the test method (e.g., PLI plus xPLId fields provide a measure in bytes to the first byte of the succeeding GEM frame after the test method).

Figure 6C:
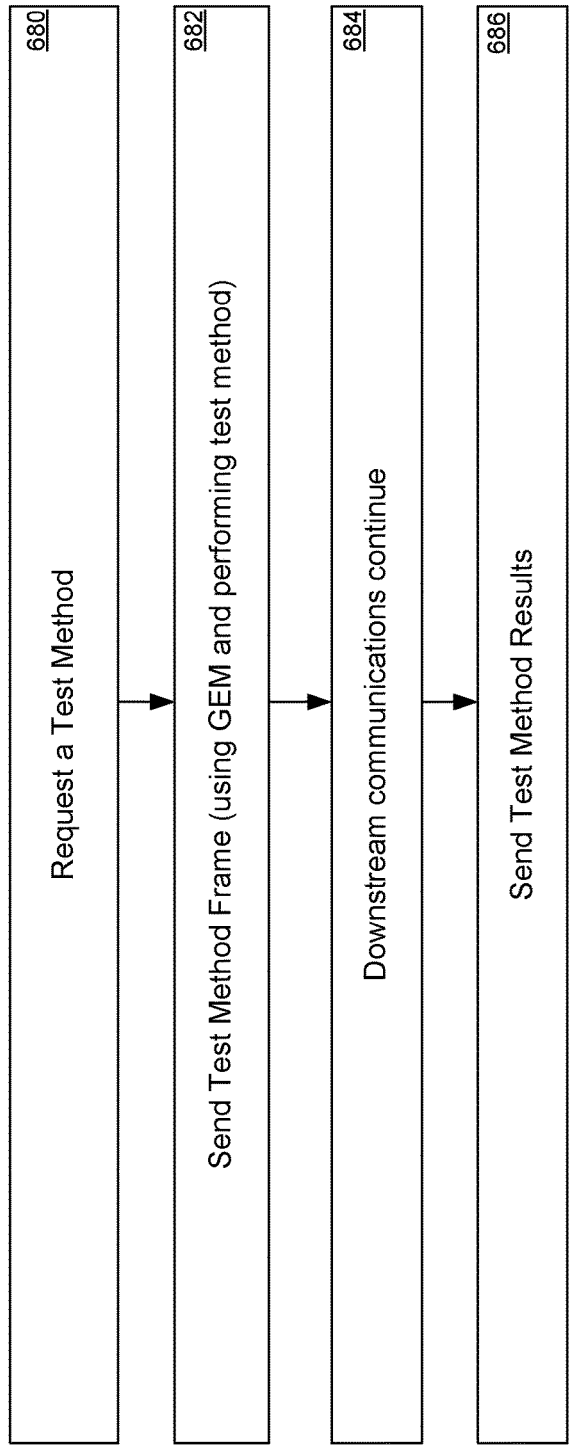
FIG. 6C is a flow chart summarizing a method of incorporating test methods in downstream communications of ITU-T G.984 GPON and ITU-T G.987 XG-PON networks in accordance with an embodiment of the present invention.

Referring now to FIG. 6C, an exemplary method of incorporating in-service diagnostic or test methods in the downstream communications of ITU G.984 GPON or ITU G.987 XG-PON protocols in view of previous discussions and in view of FIGS. 4A-6B is summarized. Starting with requesting a downstream test method 680, by a peer application entity (e.g., EMS, NMS), to be performed between the OLT and an ONU/T the OLT NCSE (e.g., OLT NCSE 440) initiates a downstream test method responsive to the request. The OLT NCSE then processes the request to establish test method parameters (e.g., ONU/T address, test type, test signal frequency or pattern, sampling rate) and initiates the test method by sending, for example, an OAM message through OAM Channel Adaptation entity 427 and Embedded OAM entity 418 to OLT MSE (e.g., OLT MSE 416A). The OLT MSE, responsive to the message received from the NCSE, then causes the generation of a test method frame 682 (i.e., as represented by 602 of FIG. 6A) by the GTC Framing sub-layer entity 419 including the test method type field 624, xPLId fields 625 and Port-ID (which can be used to identify an ONU/T to perform insertion loss measurement depending on the test method) and signaling the OLT PLSE (e.g., OLT PLSE 443A) to manage the OLT transceiver for test signal transmission and recording of test signal measurements (for test involving OTDR or OFDR). After the test method event, ONU/Ts search for GEM headers or PSyncs and downstream communications continues 684 having maintained synchrony and continuity of downstream communication flows through the test method event. Test method results are sent 686 either through OAM messages (from OLT MSE) or through PLOAM (from ONU/T MSE) to the OLT NCSE.

It will be appreciated that test methods can be given unique traffic identifiers, such as an Alloc-ID 639 and Port-ID 637. An exemplary method of associating an Alloc-ID with test methods in embodiments of the invention is using PLOAM. Referring now to FIG. 6D which illustrates the format of PLOAM messages 690 in GPON and XG-PON protocols. PLOAM messages 690 comprise: an ONU ID field used to address a specific ONU/T and used to broadcast to all ONU/Ts, a Message ID field used to indicate the type of message, a data field for the payload of the message and a CRC field covering the previous fields. A PLOAM message for assigning an Alloc-ID to test methods 692 comprises of: addressing the PLOAM message to an ONU/T, using the message type identifier for assigning Alloc-IDs (e.g., 00001010 as per GPON and XG-PON protocol specification), the unique Alloc-ID to be associated with the test methods and a payload type field using a reserved payload type value (e.g., 0x3) to indicate that the payload is associated with test methods. Alternatively, a unique Alloc-ID can be given to each type of test method as well as a unique Alloc-ID to send test method results. Once an Alloc-ID is associated with a test method another PLOAM message can be used to configure the test method and associate the test method with a Port-ID. For example, a PLOAM message for configuring test methods based on Port-IDs 694 comprises of: an address for the ONU/T, test method message type indicator, the Port-ID associated with test method and the test method configuration payload. The test method configuration payload field can comprise of bit field indicators to indicate the type of test (e.g., ISOTDR, ISOFDR, ISIL, ISOTDR-ISIL, ISOFDR-ISIL, and ISOTDR-ISOFDR-ISIL), the method to use to report the results (e.g., through PLOAMu, OMCI, or GEM), the length of the test signal burst, length of the delay time period, and other test method parameters (e.g., test signal frequency or pattern, sampling rate and resolution) as previously mentioned.

Test methods scheduled to be performed in the upstream can be allocated or granted a specific window of time to perform the test method. A method to perform the allocation is to send the allocation as part of the normal upstream allocations in the US BW Map 615. The US BW allocation structure comprises of: the Alloc-ID 639 associated with the allocation, a flag field 640, and start 641 and stop time 642 fields which indicate the start and stop time of the allocation in bytes relative to the beginning of the upstream frame. Referring now to FIG. 6E, an exemplary embodiment of an US BW map allocation for a test method is illustrated that uses reserved bits in the US BW flag field 640 to convey whether the stop time 642 of the allocation is relative to the beginning of the upstream frame in which the test method began or whether the stop time 642 of the allocation is relative to the beginning of the next upstream frame or relative to the next consecutive upstream frame. Alternative embodiments can use more reserved bits to extend the stop time to be relative to the beginning of even more subsequent upstream frames.

Figure 7A:
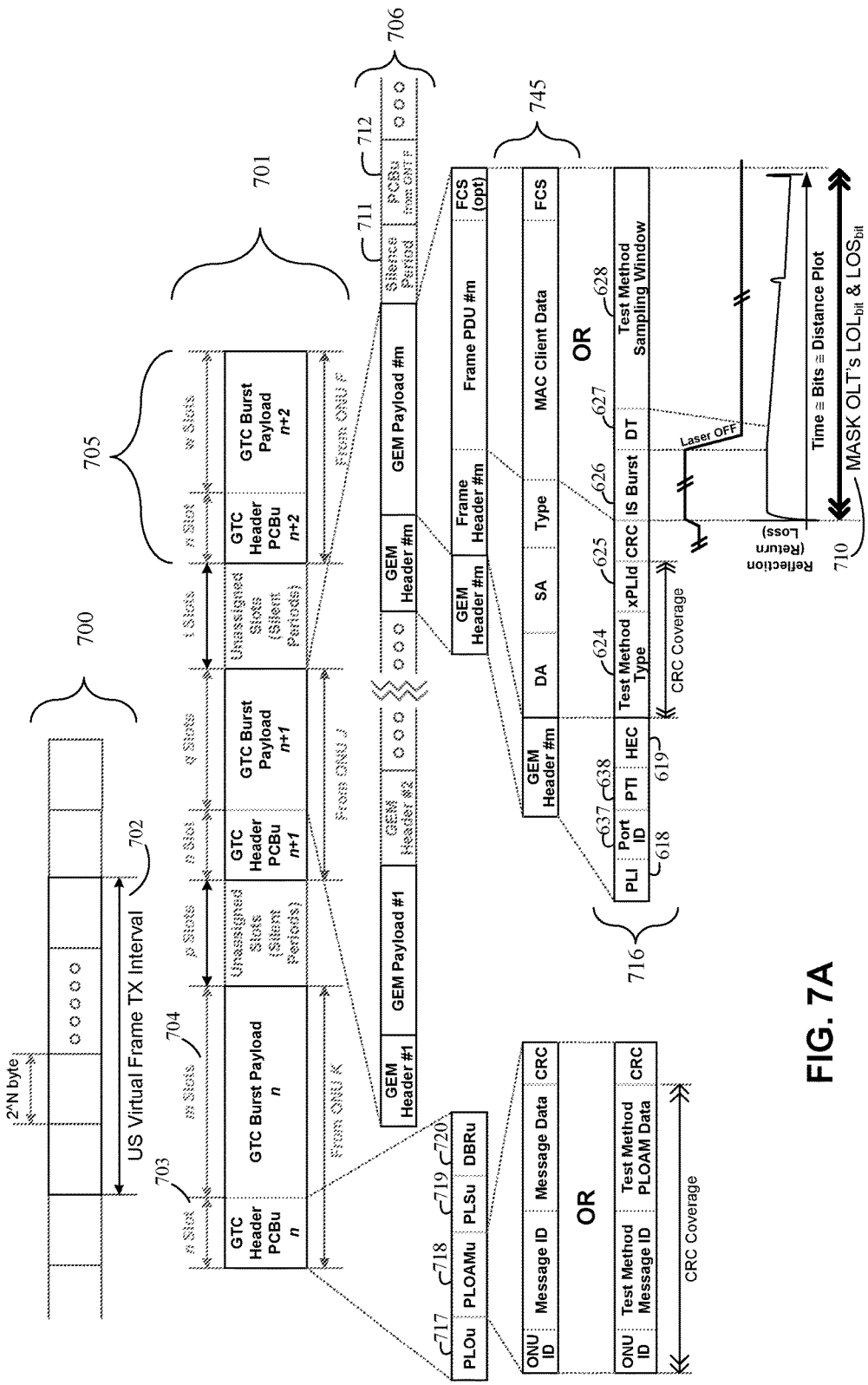
FIG. 7A is a block diagram which illustrates a diagrammatic flow the upstream communications in a ITU-T G.984 GPON and ITU-T G.987 XG-PON networks incorporating test methods in accordance with an embodiment of the present invention.
Figure 7C:
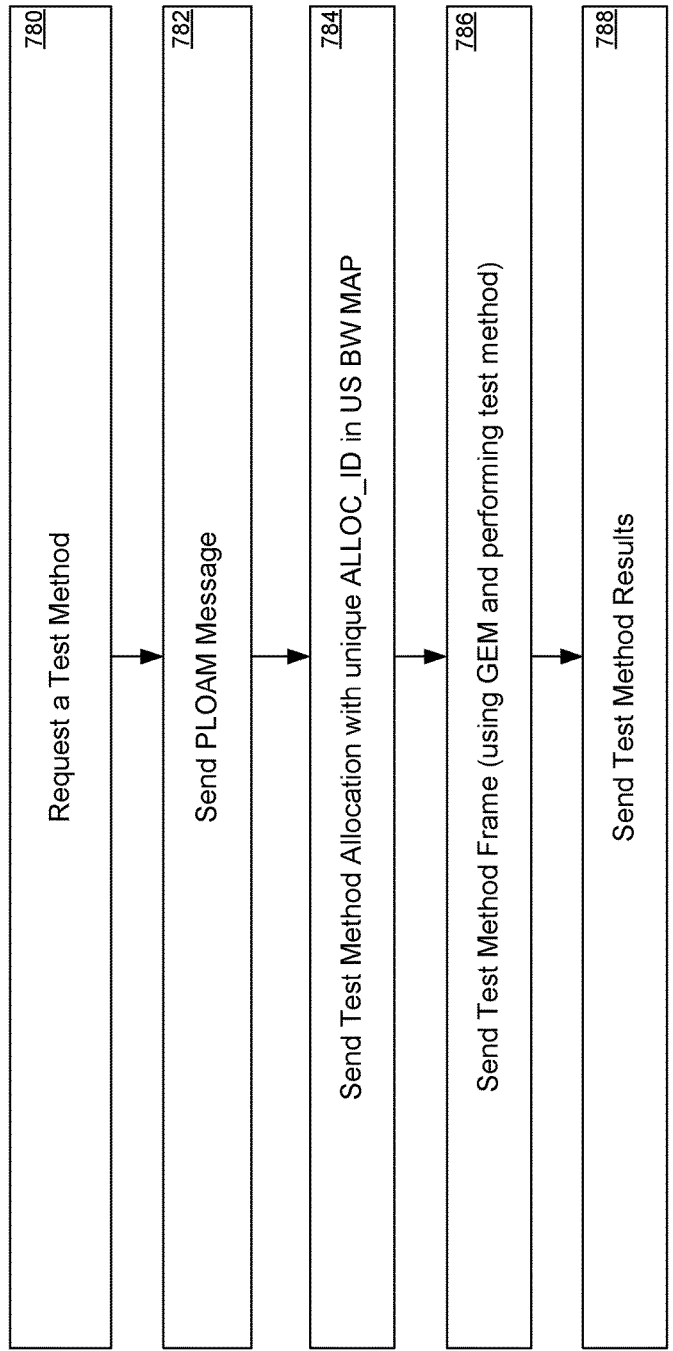
FIG. 7C is a flow chart summarizing a method of incorporating test methods in upstream communications of ITU-T G.984 GPON and ITU-T G.987 XG-PON networks in an embodiment of the present invention.

Referring now to FIG. 7A which illustrates an embodiment of a diagrammatic representation of the upstream network protocol having predetermined time intervals or frames for data communications (e.g., US Virtual Frame TX Interval 702) which includes the multiplexing and framing of information in a point-to-multipoint GPON PON system. The term upstream is meant to indicate information that originates at the ONU/T and terminates at an OLT. Since the upstream is shared by all ONU/Ts, the upstream is usually divided into slots 700, with each ONU/T sending information over OLT assigned slots in an upstream GTC frame 705. An upstream frame interval 702 can include information from a plurality of ONU/Ts. Since each ONU/T only sends data for a period of time, it is said to burst data and is differentiated from the downstream continuous mode.

The GTC downstream header is referred to as the Physical Control Block Upstream (PCBu) 703 and can include fields of data that convey the following: Physical Layer Overhead Upstream (PLOu) 717, Physical Layer OAM upstream (PLOAMu) 718, Power Leveling Sequence upstream (PLSu) 719, and Dynamic Bandwidth Reporting upstream (DBAu) 720. PLOu 717 includes: preamble and delimiter used for synchronization and identification to the GTC upstream frame; Bit Interleave parity used by the OLT to determine upstream BER; ONU-ID used to identify the transmitting ONU/T, and Indication field (Ind) used to support real-time ONU status to the OLT. The PLOAMu 718 is used to send PLOAM messages to the OLT. The PLSu 719 can be used to adjust the ONU/T power levels and thereby reduce the optical power dynamic range seen by OLT 722. DBAu 720 provides a way for an ONU to send a DBA report on any and all of its T-CONTs in a single transmission. Some fields can be omitted, extra fields added or the field order altered. Either ATM cells or GEM Packets can be included in the GTC Burst Payload 704. Each PON GTC upstream frame can include a fixed or variable frame interval 705 and the number of ATM cells or GEM packets can vary as well. Within the GTC Burst Payload 704, a consecutive series of GEM packet header and GEM packet payload segments 706 are aligned to fill the entire GTC Burst Payload segment 704.

Test methods adhere to and support the framing methods in accordance and in synchrony with the upstream network protocol. For example, by taking advantage of the last GEM payload of the GTC Burst Payload 716, a test method can be performed wherein a GEM payload or frame 716 serves as a predetermined time interval to perform a test method in burst mode or upstream communications. To insure proper identification of a pending test method, a test method type field 624 can be used to identify the test method being performed. Once the OLT receives a test method notification, then the OLT can mask the Loss of Bit Lock ($LOL_{bit}$) and Loss of Bit Signal ($LOS_{bit}$) 710 to prevent false resynchronization events. The unmasking of $LOL_{bit}$ and $LOS_{bit}$ can be triggered after the ONU/T has finished transmitting during the Silence period 711 and before another burst transmission by another ONU/T. The silence period is one or more unassigned slots and allows time for the burst mode CDR bias circuitry to reset for the next PCBu. Clock recovery is obtained in the normal PON process with the next PCBu 712.

The recording of measurements of a test method occurs after the configured IS Burst 626 and Delay Time (DT) 627 have passed from the perspective of an optical transmitter or while it occurs from the perspective of an optical receiver, similar to the downstream case (again DT 627 is optional). By varying desired intensity and frequency characteristics (frequency discussed further below) of the IS Burst 626 optical transmission signal various optical fiber plant diagnostics techniques can be performed such as, but not limited to, OTDR, Insertion Loss and OFDR. Regardless of the optical fiber plant diagnostics technique used, multiple test method results or measurements from multiple tests can be used to create an averaged representation of all impairments across the optical fiber network. It will be appreciated that this average can also be correlated with test method measurements from more than one wavelength (such as the combination of downstream and upstream measurements or results) on the optical fiber network to further improve representation of all impairments and their location or distance from the optical network terminals.

It will be appreciated that test method results can be sent through PLOAM, OMCI or GEM, as previously mentioned. Referring now to FIG. 7B, which illustrates an embodiment of a PLOAM message being used to convey test method results. The PLOAM message comprises, as previously discussed, the ONU-ID field to identify the ONU-ID originating the test method results, a message type indicator indicating the PLOAM is associated with test methods, a Port-ID associated with the test method, and the PLOAM payload field can be filed with test method results. Additional PLOAM messages can be sent to convey test method results that span more than a single PLOAM payload field can. OMCI messages are similar to PLOAM messages. GEM can be used for example by encapsulating Ethernet frames containing test method results in the payload with GEM as represented by figure elements 645 and 745 in FIG. 6A and FIG. 7A, respectively Referring now to FIG. 7C, an exemplary method of incorporating in-service diagnostic or test methods in the upstream communications of ITU G.984 GPON or ITU G.987 XG-PON protocols in view of previous discussions and in view of FIGS. 4A-7B is summarized. Starting with requesting an upstream test method 780, by a peer application entity (e.g., EMS, NMS), to be performed between an ONU/T and the OLT the OLT NCSE (e.g., OLT NCSE 440) initiates a downstream test method responsive to the request. The OLT NCSE then processes the request to establish test method parameters (e.g., ONU/T address, test type, test signal frequency or pattern, sampling rate) and initiates the test method by sending, for example, an PLOAM message through OAM Channel Adaptation entity 427, Embedded OAM entity 418 and PLOAM partition entity 414 to ONU/T MSE (e.g., ONU/T MSE 416B). The PLOAM message configures the ONU/T to perform the test method (e.g., type of test method, length of test signal burst, length of delay time period, test signal frequency or pattern). The OLT NCSE then sends an OAM message to the DBA control entity 417A which schedules and generates an allocation in the US BW map for the ONU/T to perform the test method. The test method allocation is then sent to the ONU/T 784. The ONU/T MSE, responsive to the PLOAM and allocation messages received from the OLT, then causes the generation of a test method frame 786 (i.e., as represented by 706 of FIG. 7A) at the allocated time including the test method type field 624, xPLId fields 625 and Port-ID (which identifies the ONU/T performing the test method) and signaling the ONU/T PLSE (e.g., ONU/T PLSE 443B) to manage the ONU/T transceiver for test signal transmission and recording of test signal measurements (for test involving OTDR or OFDR). After the test method event, upstream communications continues having maintained synchrony and continuity of upstream communication flows through the test method event. Test method results are sent 788 either through OAM messages (from OLT MSE) or through PLOAM, OMCI or GEM (from ONU/T MSE) to the OLT NCSE as previously discussed. It will be appreciated in an alternative embodiment, Port-IDs for each test method type can be assigned and pre-configured and therefore eliminate the need of sending a PLOAM message 782 for configuring the ONU/T to perform the test method.

In alternate embodiments in accordance with the present invention of point-to-point WDM, CWDM, or DWDM optical fiber networks employing the test methods both downstream and upstream data communications can operate in a continuous mode. This implies that point-to-point systems supporting test methods behave in a similar manner to the downstream direction of point-to-multipoint systems. Additionally, if the point-to-point line codes use control symbol characters to escape from network data communications transfer operations, then a new control symbol character can be used to multiplex a test method into the network data communications of a point-to-point system thereby enabling test methods to be performed in accordance and in synchrony with the point-to-point network protocol in-use. A similar test method packet 602 can be used in both directions for a point-to-point link. In general, the control symbol character is similar in function to a downstream packet header, as described herein for point-to-multipoint systems. In addition, all the processing of events described herein for the downstream direction of point-to-multipoint systems are also needed in point-to-point systems.

In some embodiments results from test methods can be stored remotely, with respect to the optical network terminals (e.g., an external server), and administered by a Service Provider or a Network Operator. In addition, the ONU/T's test method results can be stored locally in the ONU/T equipment for comparison use by maintenance personnel in either point-to-point or point-to-multipoint systems. In addition it will be appreciated that Service Providers or Network Operators can use test method reports to optimally dispatch maintenance personnel and equipment. The financial benefits to Service Providers or Network Operators attributed to the test methods as described herein can be substantial.

Figure 8:
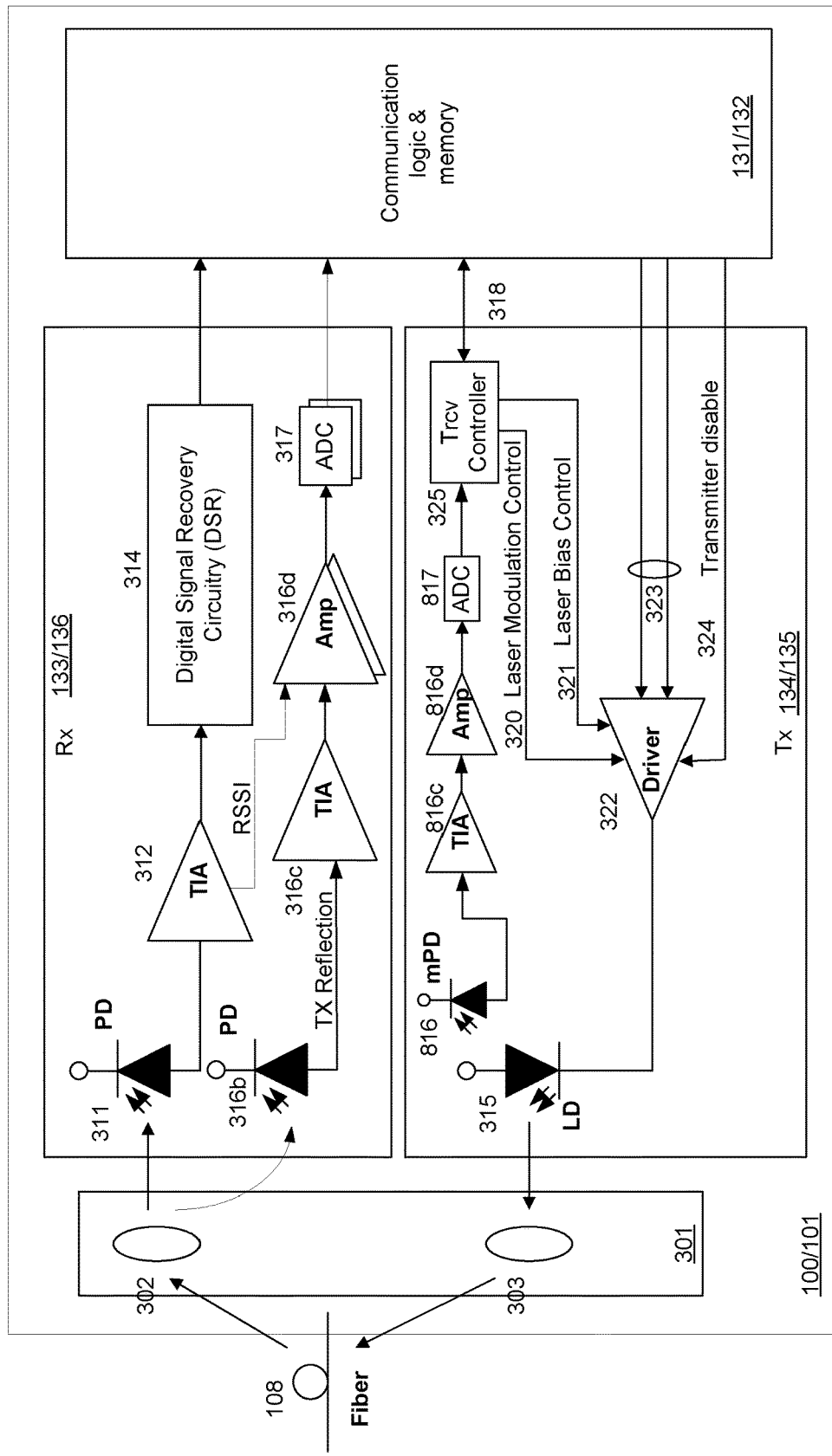
FIG. 8 is a block diagram which illustrates the block level circuitry or components of a portion of an optical network terminal of an optical fiber data network in accordance with an embodiment of the present invention.

Referring now to the exemplary embodiment of an optical network terminal of FIG. 8 in view of FIG. 3, whereas FIG. 3 illustrated PD 316b, TIA 316c, Amp 316d, ADC 317 as part of optical transmitter Tx 134/135, FIG. 8 illustrates an alternative embodiment of the invention with PD 316b, TIA 316c, Amp 316d, ADC 317 as part of optical receiver Rx 133/136 subsystem. Depending upon the implementation of fiber optic interface 301, FIG. 8 can provide a more accurate measurement of light backscattered from the front facet of the transceiver. Tx 135/135 can still have a monitor photodiode mPD 816 and associated TIA 816c, Amp 816d and ADC 817 to monitor and control the output power of LD 315 over various operating conditions and over time. It will be appreciated that while photodiodes 316, 316b and 816 have been shown with associated amplifiers, in an alternative embodiment photodiodes 316, 316b and 816 can produce a signal that needs no further amplification. Additionally, it will be appreciated that while signals from photodiode PD 311 have been shown to share Amp 316d and ADC 317, in an alternative embodiment this need not be the case and signals from PD 311 can have their own amplifier and analog-to-digital converter. Furthermore in some embodiments, amplification or analog-to-digital conversion of signals from PD 311 or PD 316, 316b can be implemented by DSR 314.

It will be appreciated that the photodiode PD 316b in FIG. 8 can measure the optical return loss of the optical transmitter Tx 134/135. Optical return loss (ORL) is a ratio ($P_r/P_t$) representing the optical power reflected ($P_r$) from a transmitted optical wave ($P_t$). As previously mentioned PD 316b is capable of measuring reflected light ($P_r$) received from optical fiber 108 and optical interface 301. Additionally, mPD 816 in FIG. 8 as a monitor photodiode can measure the transmitted optical output ($P_t$) of LD 315. Thus ORL can be calculated from measured $P_r$ and $P_t$ values and in addition to the results of an insertion loss test, the required increase or decrease in transmitted optical power by LD 315 to achieve a desired received optical power at an optical receiver across optical fiber 108 can be determined.

It will be appreciated that the transceivers of FIG. 3 and FIG. 8 can perform OTDR measurements from the optical backscatter when burst mode network communications are used, such as the upstream communications from a ONTs or ONUs 160, 155 on a PON (FIG. 1B). In burst mode communications there are silence periods 711 in between data signal bursts, see FIG. 7. These silence periods can be used as sampling windows to measure optical reflections from either a desired OTDR signal transmitted by transceiver 100 or 101 during the silence period or by using the trail end of network data signal communications transmitted by transceiver 100 or 101 prior to the silence period. Measurements can be processed and sent to an NCSE or a peer NCSE as per the test methods of the invention previously discussed.

It will be appreciated that embodiments of the invention can perform an OFDR test, as previously discussed. Referring now to FIG. 3 and FIG. 8, during OFDR test methods DAC 319 and Driver 322 can generate an appropriate modulation current which in turn produces an optical carrier with a linear periodic frequency sweep from LD 315 and measurements of the received response can be performed by PD 316 or PD 316b. Given the data rates for data communications in the gigabits per second are envisioned, an optical carrier signal on a communication wavelength in the gigahertz can be produced yielding spatial resolutions in the centimeters. In addition, alternative embodiments of FIG. 3 and FIG. 8 can employ direct digital synthesis (DDS) for improved high frequency optical carrier signal generation are envisioned (not shown in figures). DAC 319 with the addition of a numerically-controlled oscillator (NCO) can be used to create a DDS, though alternative methods well known in the art (including a software based NCO) can also be employed to create a DDS.

Additionally, processing of the received OFDR response can occur at the network terminal performing the OFDR or the received response measurements can be transmitted via the network protocol in-use (e.g., as payload data) to an external location (e.g., a network server) for processing (i.e., inverse Fourier transform). Furthermore, measured results from any test method disclosed can be transmitted via the network protocol in-use (e.g., as payload data) to an external location (e.g., a network server) for processing and archiving.

It will be further appreciated that while the test methods of the invention can scale to provide in-service test services for Service Providers and Network Operators to manage their entire optical fiber plants from a single NOC or multiple distributed NOCs, the invention can also scale to any large or small optical fiber network without a NOC. For example, in one embodiment for an optical fiber network without a NOC and wherein the NCSE (embedded within an optical network terminal or apparatus) is configured to perform embedded OTDR, OFDR, or Insertion Loss tests at some predefined interval(s), or at a communication disruption event, or during silence periods in burst mode communications, or additionally in lieu of idle packets in continuous mode communications as exemplary conditions for initiating a test method. The optical network terminal or apparatus can then perform the test method via embedded MSE and PLSE as previously discussed. An example of an optical fiber network without a NOC is an optical local area network (LAN).

Figure 9A:
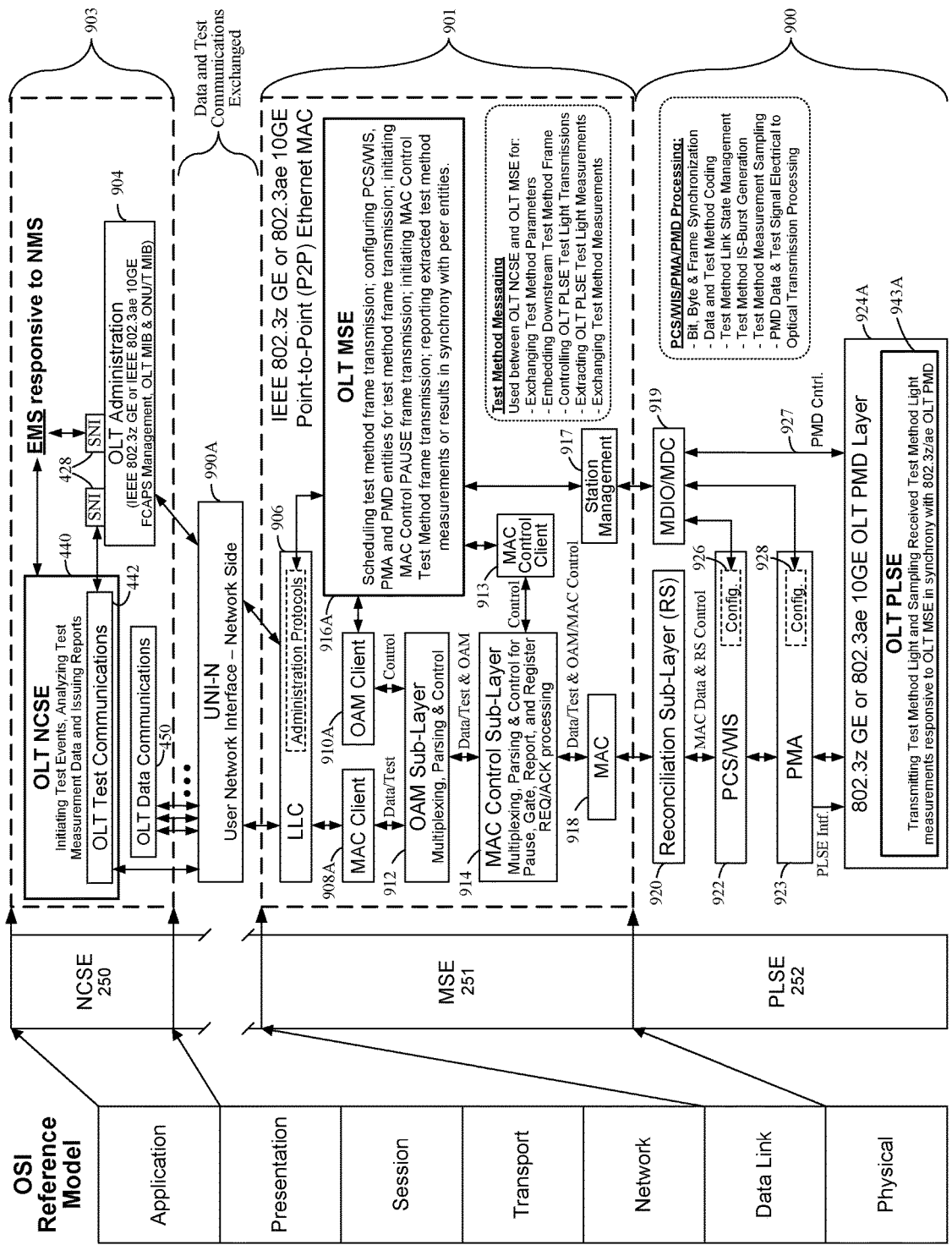
FIG. 9A is a block diagram which illustrates an OSI reference model and related entities of a point-to-point IEEE GE or 10GE active Ethernet Head-end OLT system in accordance with an embodiment of the present invention.
Figure 9B:
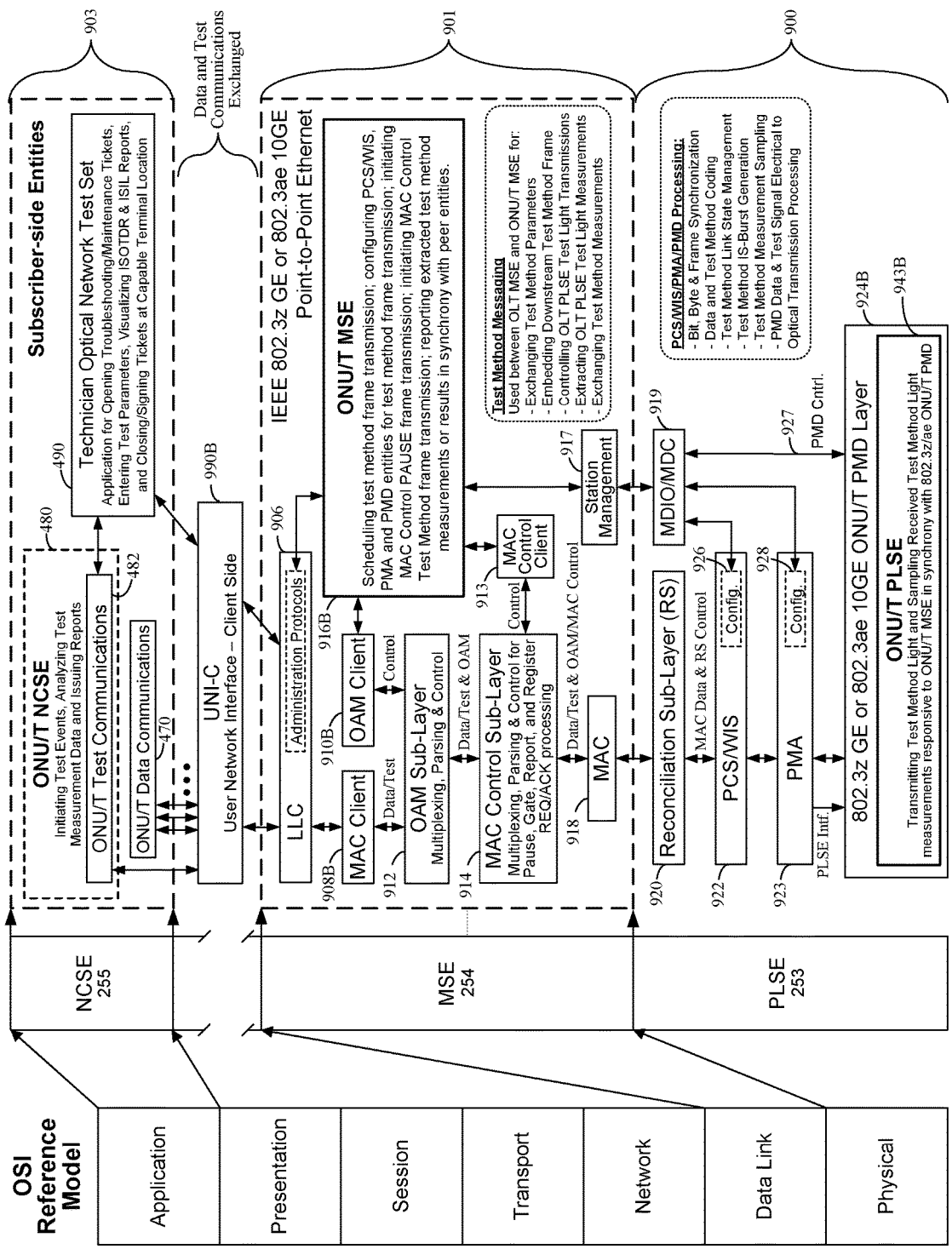
FIG. 9B is a block diagram which illustrates an OSI reference model and related entities of a point-to-point IEEE GE or 10GE active Ethernet Client ONU/T system in accordance with an embodiment of the present invention.

Referring now to FIG. 9A and FIG. 9B, in view of FIG. 4A and FIG. 4B, exemplary embodiments of an OSI reference model and related entities for an OLT and ONU/T, respectively, of the invention for IEEE 802.3 Point-to-Point Ethernet optical fiber networks such as those based on IEEE 802.3z GE protocol, IEEE 802.3ae 10GE protocol, or IEEE 802.3ah active Ethernet protocol or for SONET ring networks are shown. FIG. 9A and FIG. 9B illustrates how the IEEE 802.3 protocol series can pass both data and test method information between the OSI physical layer and application layer entities. Between these layers, the PLSE 252,253 resides at the physical layer, the MSE 251,254 resides at the data link layer, and the NCSE 250,255 resides at the application layer in this embodiment. As previously mentioned, the interaction between NCSE, MSE and PLSE entities results in a flow of information concerning the test methods performed on the ODN across the IEEE 802.3 network protocol layers.

IEEE 802.3 Physical Layer 900 is comprised of Reconciliation Sub-layer (RS) entity 920, Physical Coding Sub-layer (PCS) entity 922 with optional Wide area network (WAN) Interface Sub-layer (WIS) entity, Physical Medium Attachment (PMA) sub-layer entity 923, OLT Physical Media Dependent (PMD) sub-layer entity 924A comprising OLT PLSE 443A, and ONU/T PMD sub-layer entity 924B comprising ONU/T PLSE 443B. It will be appreciated that OLT PMD 924A can be identical to ONU/T PMD 924B in embodiments using dual fibers between the OLT and an ONU/T.

The OSI application layer 903 in this embodiment is similar to FIG. 4A, however OLT Administration 904 does not use OMCI messages and communicates to Logical Link Control (LLC) entity 906 through OSI network layer entity known as user network interface-network side (UNI-N) 990A using network protocols such as Multiprotocol Label Switching (MPLS), for example, which can handle a plurality of network administration protocols between OLT Administration 904 and LLC 906. The OLT data communications entity 450 and OLT NCSE 440 can also communicate with LLC entity 906 using MPLS. The OLT NCSE 440 in some alternative embodiments can communicate with LLC 906 using SNMP (e.g., when they reside in an EMS, NMS or edge router).

In the OSI Data Link Layer or Ethernet MAC 901, packet switched network layer communications, comprising of information exchanged between the OSI application layer and the data link layer, are mapped to frames of IEEE 802.3 data link layer communications by the LLC entity 906. The LLC entity 906 multiplexes protocols transmitted to the OSI data link layer and decoding them while providing flow control and error control for the packet-to-frame protocol conversion between the packets based OSI network layer and IEEE 802.3 frame based OSI data link layer. LLC entity 906 processes communications between OLT Data Communications 450 (comprising Ethernet OLT data) and OLT MAC client 908A, and LLC entity 906 processes communications between OLT NCSE 442 (e.g., test method measurement data) and OLT MAC client 908A. Additionally LLC entity 906 processes communications between OLT Administration entity 904 and OLT MSE 916A comprising of Ethernet OAM frames, SNMP frames for FCAPS management, OLT MIB and ONU/T MIB. OAM sub-layer entity 912 multiplexes and parses frames from MAC Client entity 908A and OAM Client entity 910A and parses frames from MAC control sub-layer 914. OAM Client control frames consist of OLT Administration entity 904 OAM messages which include OLT MSE 916A OAM messages for embedding test parameters, allocating test measurement windows and extracting test measurements or test results in synchrony with OAM Client traffic. Additionally, OAM Sub-layer 912 exchanges frames with the MAC Control Sub-layer 914 comprising of ONU/T data and test method communications, and comprising of other OAM sub-layer specific frames used by the OAM sub-layer entity 912 for processing link performance monitoring, alarm and status monitoring, loopback, OAM receive and transmission rule setting, or discovery of other OAM processing capable network terminals capabilities. Once received frames are parsed they are either processed by the OAM sub-layer 912 or passed to the appropriate entity. These multiplexing, parsing and control functions of the OAM sub-layer 912 can be used by the OLT MSE 916A to discover the capabilities and addresses of other network terminals capable of performing test methods in response to OLT Administration entity 904 which is in communications with its peer OLT NCSE 440 through SNI 428. OAM frame processing can also provide an OLT with an in synchrony mechanism for OLT NCSE 440 to discover the capabilities and addresses of network terminals capable of performing test methods using services of the OLT Administration entity 904. Once OLT MSE 916A is discovered and known to OLT NCSE 440, a test method can be performed by the OLT. To perform a test method involving insertion loss test, the OLT Administration entity 904 (responsive to OLT NCSE 440) can request the OLT MSE 916A to discover peer ONU/T MSE 916B through the use of OAM sub-layer 912 processing communicated via the OAM client entity 910A. Once peer ONU/T MSE 916B shares its capabilities with OLT MSE 916A, the OLT MSE 916A responds to OLT Administration entity 904 resulting in a servicing of the request from OLT NCSE 440 for discovering ONU/T terminal capable of performing test methods. Now that two MSE 251,254 (that share the same ODN) are known to OLT NCSE 440, test methods involving insertion loss can be performed by the OLT. Also now that two MSE 251,254 (that share the same ODN) are known to OLT NCSE 440, test methods can be initiated and performed by the ONU/T. Furthermore, now both OLT and ONU/T network terminals can be managed by OLT NCSE 440 for test methods via OLT Administration entity 904 services through SNI 428.

The MAC control sub-layer entity 914 is responsible for multiplexing, parsing and performing control functions for Ethernet PAUSE, Gate, Report, and Register REQ or ACK control frame processing for real-time control and manipulation of IEEE 802.3 data link layer. MAC Control Sub-layer entity 914 can also support new functions such as encapsulating test method frames for performing and multiplexing test methods along with test communication frames for reporting test method measurements or results. Test method frame encapsulation and other Ethernet frame related information is discussed further in FIG. 10. Upon receiving frames from OAM Sub-layer entity 912 (e.g., OAM frames, data communications or test method communications), receiving frames from the MAC control client 913 (e.g., MAC control frame parameters), and receiving frame from MAC entity 918 (e.g., OAM frames, data communications, test method communications, MAC control frames), the MAC Control sub-layer entity 914 parses the incoming frames to determine whether it is destined for a specific function within the MAC Control sub-layer entity 914 itself (e.g., MAC Control frame) such as processing PAUSE frames, Gate frames, Report frames, Register REQ or ACK frames and test method frames or whether it is destined for one of the forementioned entities. The MAC entity 918 processes communications between MAC Control sub-layer entity 914 and the Reconciliation sub-layer (RS) entity 920 discarding malformed frames.

Figure 10:
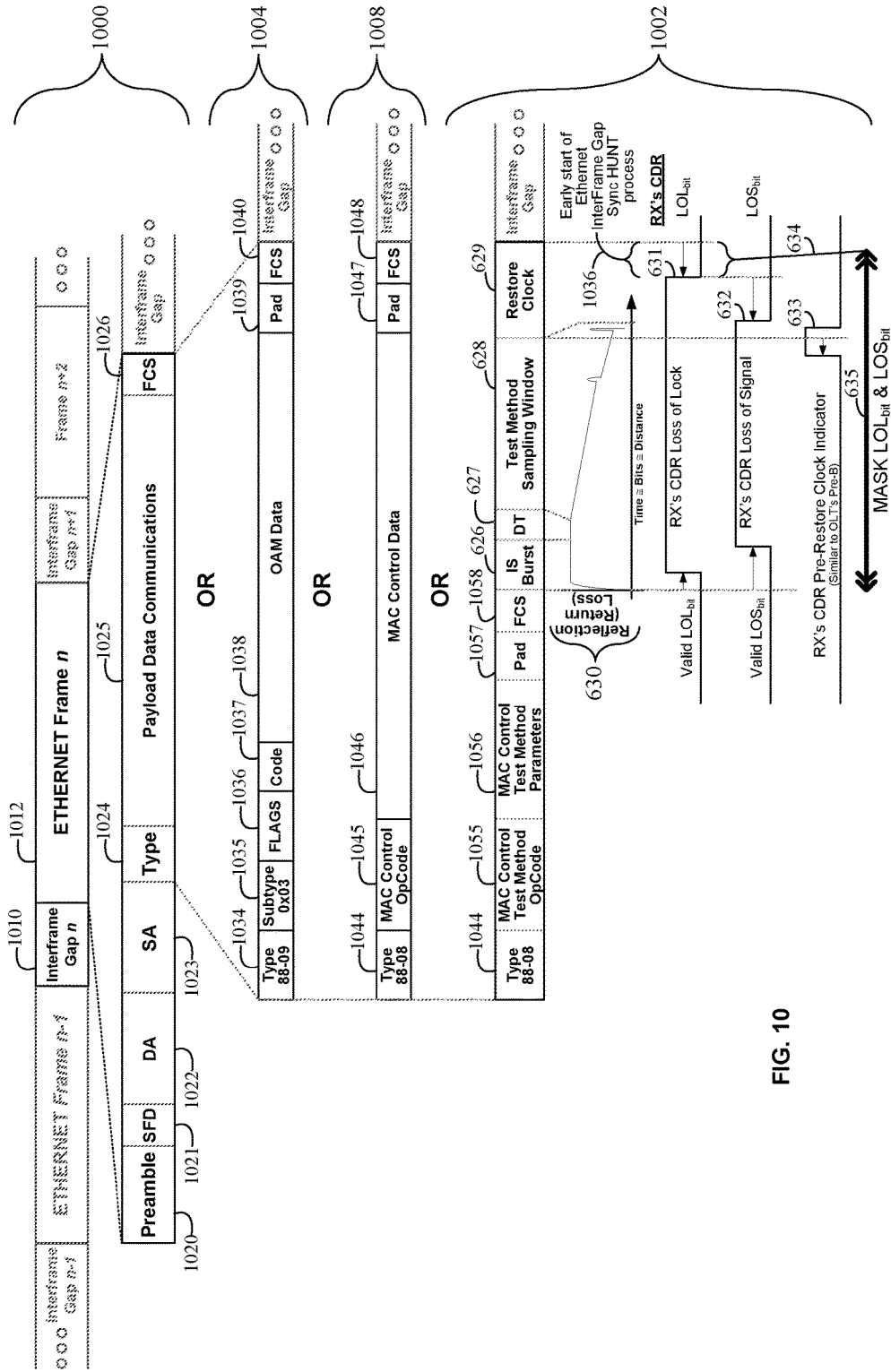
FIG. 10 is a block diagram which illustrates a diagrammatic flow of the communications in a point-to-point IEEE GE or 10GE active Ethernet system incorporating test methods in accordance with an embodiment of the present invention.

The 802.3 Physical Layer 900 is comprised of RS entity 920 that is responsible for signal mapping between the MAC and PHY signal service domains (e.g. accommodations or adaptations of serial or parallel 1 Gigabit (GMII) or 10 Gigabit Media Independent Interfaces (XGMII)). This reconciliation layer ensures that the Ethernet frames shown in FIG. 10 are adapted for PCS/WIS processing. The reconciliation sub-layer entity 920 interfaces with the PCS/WIS entity 922 which is responsible for the frame synchronization polynomial processing and other physical line coding symbol processing and error event handing. The PMA entity 923 provides a medium-independent means for the PCS/WIS 922 to support the use of a range of physical media. The PMA entity 923 performs the following functions: mapping of transmit and receive data streams between the PCS or WIS and PMA via the PMA service interface; serialization (and de-serialization) of bits for transmission (reception) on the underlying serial PMD; recovery of clock from the received data stream; mapping of transmit and receive bits between the PMA and PMD via the PMD service interface; and optionally provides data loopback at the PMA service interface.

The test method process will now be described for this embodiment for downstream test methods (upstream test method process is similar with OLT MSE and OLT PLSE substituted for ONU/T MSE and ONU/T PLSE, respectively), the OLT NCSE 440 initiates a test method session and provides test method parameters to OLT MSE 916A (e.g., using OAM message, SNMP FCAPS message). The OLT MSE 916A acknowledges the test method request and begins the process of performing the requested test method. The OLT MSE 916A can send a request (e.g., an Ethernet OAM message) to peer ONU/T MSE 916B requesting that it send a MAC Control PAUSE frame which is processed by the MAC control sub-layer entity 914. A PAUSE frame is an IEEE 802.3x flow control mechanism which includes the period of pause time being requested, in the form of a two byte unsigned integer which represents the duration of the pause. The units of measure for each bit of the pause time are called "quanta", where each quanta unit is equal to 512 bit times. ONU/T MSE 916B can respond to peer OLT MSE 916A request for PAUSE frame generation by issuing a MAC control PAUSE frame through its ONU/T MAC control client entity 913. Once the OLT MAC Control Sub-layer entity 914 has received the MAC control PAUSE frame requested by OLT MSE 916A, all received frames are buffered within the MAC Control Sub-Layer entity 914 until the PAUSE time period (e.g. 802.3 PAUSE opcode pause-_time request_operand) that accommodates the test method has expired. This use of MAC control PAUSE frames enables the OLT MSE 916A to schedule test methods in synchrony with the IEEE 802.3 Data Link layer while maintaining continuity of data communications.

Once the MAC Control Sub-layer entity 914 has entered a PAUSE active state and a test method is pending, the MAC Control Sub-layer entity 914 can inform peer entity OLT MSE 916A that PAUSE state is active and can begin to transmit test method frames with test method parameters (provided by the OLT MSE 916A). The test method frame passes through MAC entity 918 and RS entity 920 to PCS/WIS entity 922. The PCS/WIS entity 922 performs 8b/10b conversion of the test method frame to control code groups. The PCS/WIS entity 922 responsive to test method parameters generates unique test method control code groups (e.g., "/L/" or "/K28.6/") for the length of the test method covering the time reserved for IS-Burst 626, DT 627, Test Method Sampling Window 628 and Restore clock 629. The PMA entity 923 responsive to receiving the unique test method control group codes notifies the OLT PLSE 943A of the start of the IS-Burst 626 through PLSE interface. Additionally, it will be appreciated that during a test method the PCS/WIS entity 922 can ignore or mask false PCS/WIS error events (e.g. LOS).

In alternative embodiments of the invention, the PCS/WIS entity 922 encode and decode states can include multiple test method code group extensions to incorporate the test method events. For example, the test method IS-Burst period 626, DT 627, and test measurement window period 628 can each be delineated by their own unique test method control code group by the PCS/WIS entity 922 and the PMA 923 can pass the timing of these delineation by control code group extensions to the PLSE through the PLSE interface. In yet another alternative embodiment, it will be appreciated that the PMA entity can transmit one or more test method control code groups to notify the receiving peer PMA entity of the impending start of the IS-Burst period and subsequent transition of the test signal. The receiving peer PMA entity can use this notification to ignore or mask false LOS signal.

Referring now to FIG. 10 in view of FIG. 9A and FIG. 9B, an exemplary block diagram illustrating a diagrammatic flow of the communications of an embodiment of the invention for IEEE 802.3 P2P Ethernet optical fiber networks such as those based on IEEE 802.3z GE or IEEE 802.3ae 10GE is shown. For IEEE 802.3 P2P Ethernet frames, the downstream and upstream frame formats are the same, FIG. 10 represents both downstream and upstream frames. Ethernet frame 1000 represents standard Ethernet data frame. Ethernet frame 1004 further details and represents an Ethernet OAM frame and Ethernet frame 1008 further details and represents an Ethernet MAC Control frame. Ethernet frame 1002 is an embodiment of an Ethernet frame representation of a test method frame. In this embodiment, the Ethernet frame type for MAC Control frame 1044 is used with a unique MAC Control Test Opcode 1055 that distinguishes test frames from other MAC control frames. In alternate embodiments, a unique Ethernet frame type can be used instead of MAC Control frame type 88-08 1044 with similar frame field elements as shown in test method frame 1002.

In the embodiment of test method frame 1002 shown in FIG. 10, the test method frame 1002 field elements are generated and processed by data link layer and physical link layer as previous discussed in FIG. 9A and FIG. 9B for IEEE 802.3 P2P Ethernet networks. The MAC Control Test Method OpCode 1055 can be used to uniquely identify the type of test method being performed and test method parameters can be included within the MAC Control Test Method Parameters field 1056. As previously discussed test method parameters can included, but not limited to, test method type, length of test burst window period, length of delay period, measurement sampling rate, bit clock recovery pattern or sequence to be used, and duration of the restore clock. Additionally test method parameters can include information or bit indicators to select test method options such as optical intensity (i.e., optical power), frequency or pattern of one or more transmissions of light and their durations as well as the sampling resolution of test light transmission measurements for the test method. Pad field 1057 follows MAC Control Test Method Parameter 1056 field and is used to insert or pad bits in the test method frame to align to an Ethernet nibble structure in preparation for Frame Check Sequence (FCS) field 1058. FCS is a checksum for MAC control frames and is the last four octets of the MAC control frame portion of the test method frame 1002. IS Burst 626, DT 627, Test Method Sampling Window 628 and Restore Clock 629 follows to complete test method frame 1002 in this embodiment. Again, Restore Clock 629 is an optional field and need not occur in all embodiments of the invention. In alternative embodiments, the test method frame can end with Test Method Sampling Window 628 and the idle control group symbols of the interframe gap (IFD) 1010 can be used for clock or bit level synchronization Following test method frame 1002 an End of Packet Delimiter (EPD), as defined in IEEE 802.3 clause 24.2.2.1, is transmitted by PCS/WIS entity 922 following the de-assertion of transmit enable which corresponds to the last data nibble composing the FCS field 1058 from the MAC entity 918. EPD is transmitted during the period considered by Ethernet MAC to be the interframe gap (IFG) 1010. On reception of non-test method frames, EPD is interpreted by the PCS/WIS 922 as terminating IEEE 802.3 service data unit (SDU). It will be appreciated that in order to preserve the ability of IEEE 802.3 MAC to properly delimit the FCS at the end of the frame (that is, to avoid incorrect alignment errors in the MAC) the internal MAC entity 918 signal receiving (and through RS entity 920 per Clause 22) is de-asserted immediately following the last code-bit in the stream that maps to the FCS 1058 (e.g., "/T/R/" codes). Note that the condition IEEE 802.3 "link_status" variable is "NOT OK" during stream reception (that is, when "receiving" variable is "TRUE") causes an immediate transition to the LINK FAILED state and supersedes any other Receive process operations. However this transition into LINK FAILED state is delayed for test method frames 1002 to accommodate the remaining bit times or symbol periods required to complete the remaining test method fields such as IS Burst 626, DT 627, ISOTDR and ISOTDR-ISIL Sampling Window 628 and restore clock 629 described previously. For example, on reception of a test method frame FCS field 1058, EPD is transmitted after the last bit time or symbol period of the restore clock field 629 or in alternative embodiments after the test method sampling window has passed. It will be appreciated that by delaying transmission of EPD the PMD clock recovery phase-lock-loop circuitry is allowed to recover phase and bit lock, thus preserving the ability of IEEE 802.3 MAC to properly delimit the test frame 1002 restore clock field 629 or in alternative embodiments interframe gaps. In some embodiments of the invention, alternate schemes for transitioning into EPD can be performed based on masking LOL and LOS signal states of the CDR as previously discussed in FIG. 6A. Regardless of what transition scheme used for test method frames 1002 to transmit EPD, the receiving terminal can retain IEEE 802.3 interframe gap (IFG) 1010 processing. In summary, FIG. 10 test method frame 1002 fields shown represent an exemplary embodiment that is in synchrony with IEEE 802.3 P2P Ethernet protocol framing.

Referring now to FIG. 11A which illustrates a table containing a subset of the PCS control group codes used in IEEE 802.3 Ethernet. As previously mentioned a unique PCS control group code can be used to inform the PMA layer of the test method being performed. For example, the control code "/L/" using the control group coding "/K28.6/" can be used to identify to the PMA layer 923 when to perform a test method. The PMA layer 923 upon receiving the "/L/" code then knows when to begin the test method. Prior to receiving the "/L" code the PMA is configured through station management 925 to perform the test method. Test method configuration includes, as previously discussed, test method parameters such as the length of the test signal burst, length of the delay time period, and other test method parameters (e.g., test signal frequency or pattern, sampling rate and resolution).

Figure 11B:
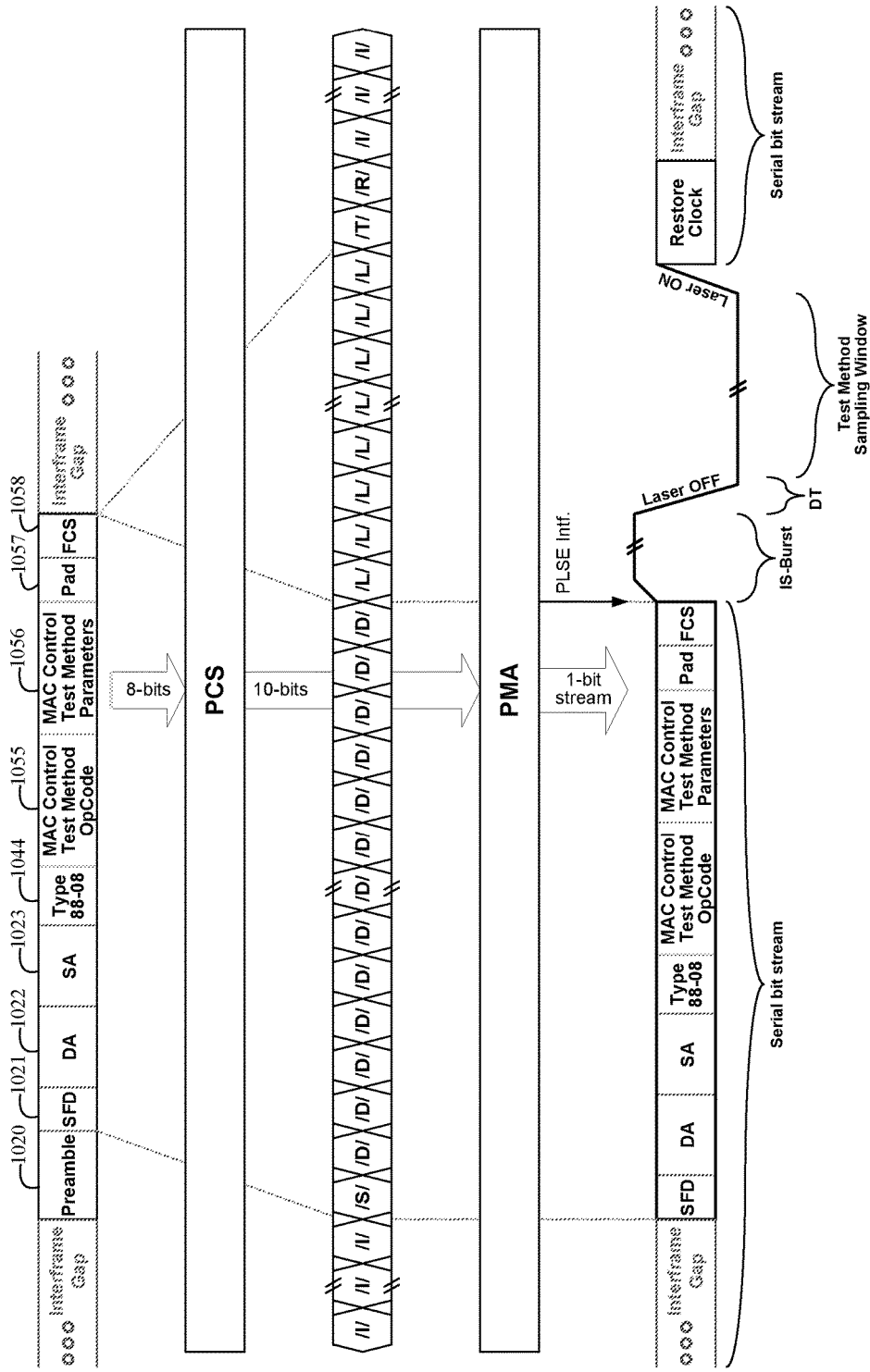
FIG. 11B is a block diagram which illustrates a diagrammatic flow of test methods in the Physical layer in accordance with an Ethernet embodiment of the present invention.

Referring now to FIG. 11B in view of FIG. 9A-11A, an illustration of the communication flow between PCS, PMA and PMD layers in relation to performing a test method is summarized. Starting with a test method frame 1002 received by the PCS 922 in an active PAUSE time period, the PCS 922 performs 8b/10b encoding on the test method frame 1002 and then generates unique test method control code groups (e.g. "/L" codes) for the length of the test method responsive to the type 88-08 field 1044, MAC control test method opcode 1055 and MAC control test method parameters 1056 which informs the PCS 922 of the length of the test method. The PMA 923 serializes the 8b/10b encoding and responsive to receiving unique test method control code groups (e.g., "/L" codes) and signals though PLSE interface entities in the PMD layer (e.g., PLSE) to perform the test method. The PMD entities (e.g. PLSE) can be preconfigured to perform the test method through station management programmed via PMD control 927.

Figure 11C:
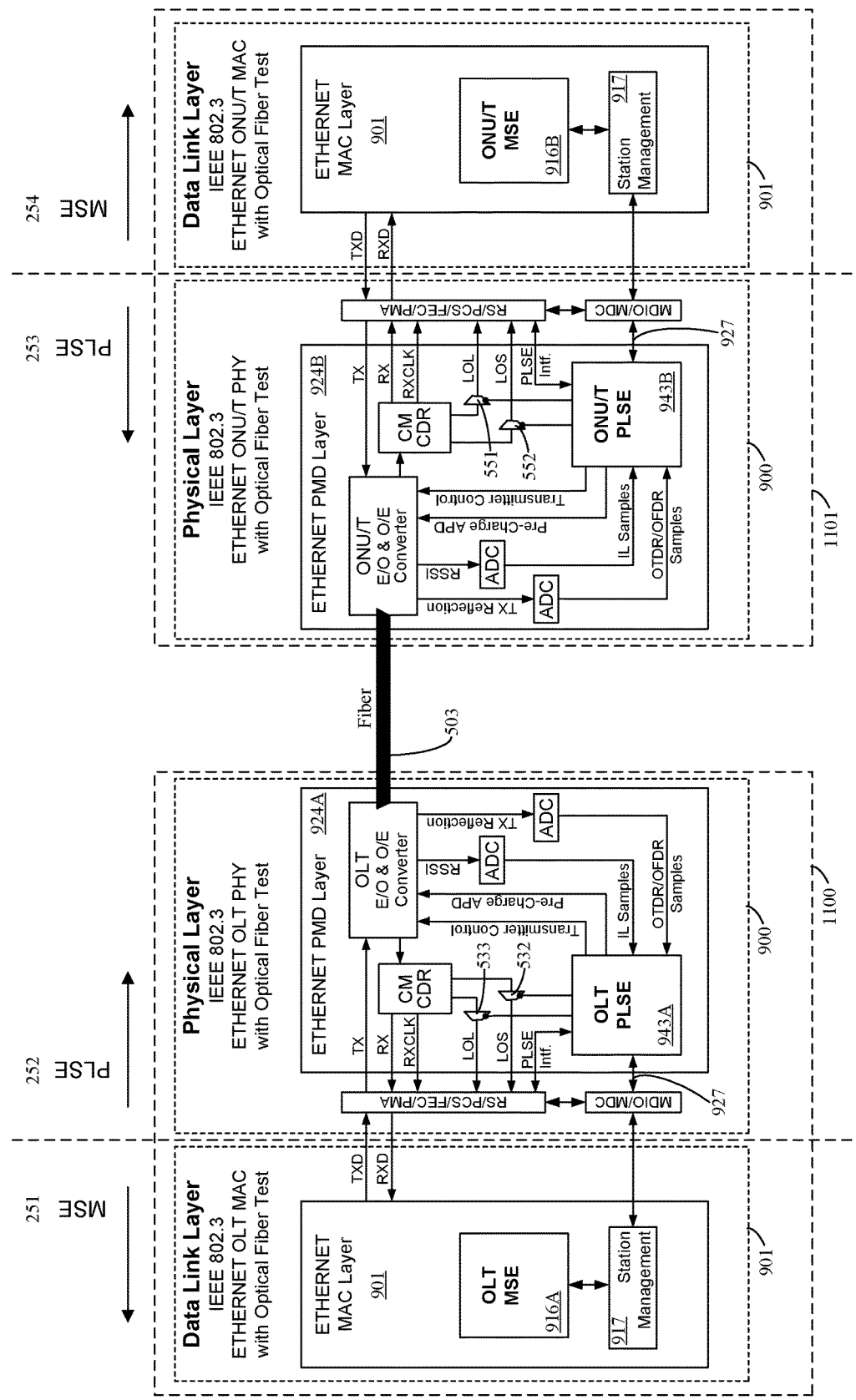
FIG. 11C is a block diagram which illustrates the block level circuitry and physical and data link layers of an OLT and ONU/T of a point-to-point IEEE GE or 10GE active Ethernet optical fiber data network in accordance with an embodiment of the present invention.

Referring now to FIG. 11C, which illustrates the block level circuitry and physical and data link layers of an OLT 1100 and an ONU/T 1101 embodiment of an IEEE 802.3 P2P active Ethernet network in view of FIGS. 3, 5, 8, and 9A-11D. Ethernet MACs functioning as an OLT and ONU/T comprise an OLT MSE and ONU/T MSE, respectively, as previously discussed. The OLT MSE and ONU/T MSE communicate through station management to PCS and PMA layers, respectively. The PMA communicates to the OLT PLSE and ONU/T PLSE through a PLSE interface. The OLT PLSE and ONU/T PLSE, responsive to the timing provided by the PMA in some embodiments or responsive to test method configuration through station management in other embodiments, can mask LOS and LOL signals, control transmitter output including disabling or turning off the transmitter, pre-charging an APD, storing IL sample measurements (e.g., RSSI values), and storing OTDR and OFDR sample measurements as well as sending sample measurements back to the Ethernet MACs through PMA via the PMD control bus or via the PLSE interface. It will be appreciated that OLT PLSE and ONU/T PLSE can be embodied by state machine circuitry and logic as part of a System-on-a-Chip (SOC) or a microcontroller and software. It will also be appreciated that embodiments of OLT PLSE and ONU/T PLSE can comprise registers to store test method configuration (e.g., as configure through station management) as well as counters used to provide timing or bit counting of test method sections (e.g., IS Burst 626, DT 627, sampling window 628 and restore clock 629) to perform test methods.

Figure 11D:
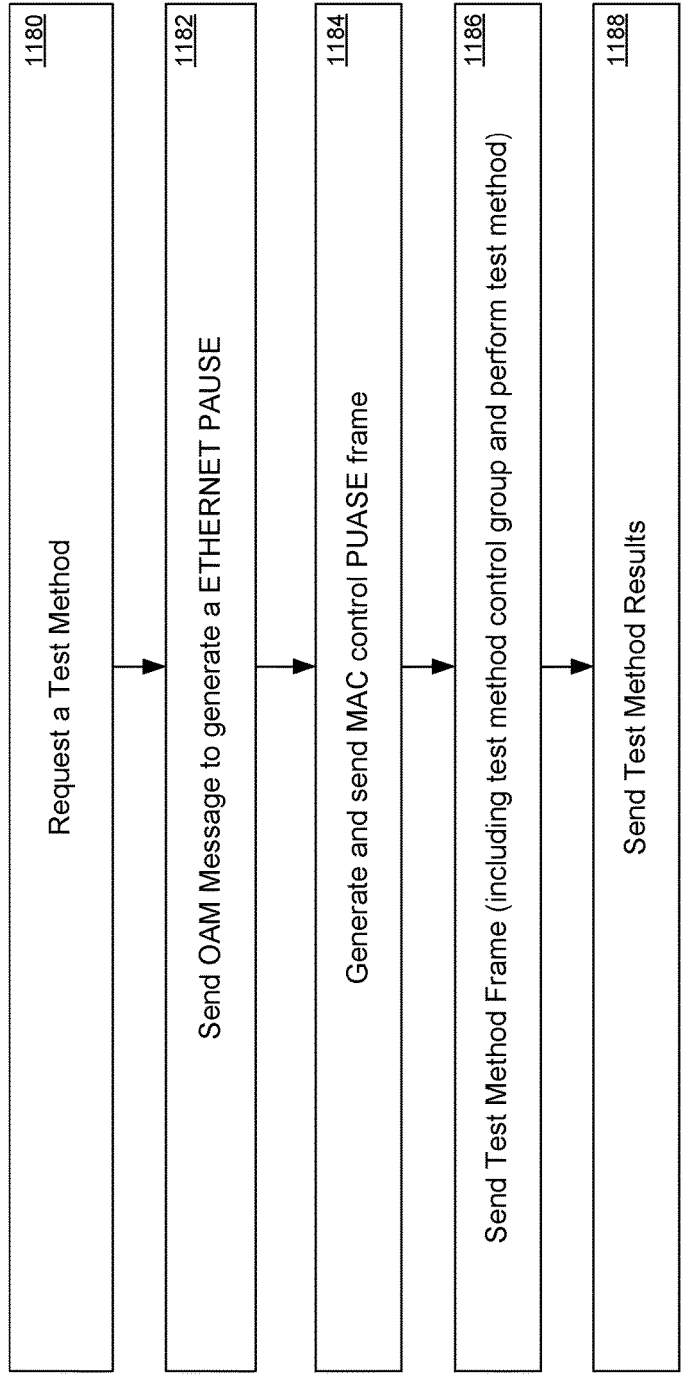
FIG. 11D is a flow chart summarizing a method of incorporating test methods in communications of IEEE 802.3 point-to-point (P2P) Ethernet networks in accordance with an embodiment of the present invention.

Referring now to FIG. 11D, an exemplary embodiment of a method for incorporating in-service diagnostic or test methods in the communications of IEEE 802.3 P2P active Ethernet networks in view of previous discussions and in view of FIGS. 9A-11C is summarized. Starting with requesting a test method 1180, by a peer application entity (e.g., EMS, NMS), to be performed between an OLT and the ONU/T the OLT NCSE (e.g., OLT NCSE 440) initiates a test method responsive to the request. The OLT NCSE then processes the request to establish test method parameters (e.g., ONU/T address, test type, test signal frequency or pattern, sampling rate, and other parameters as previously discussed) and initiates the test method by sending, for example, an OAM message 1182 to OLT MSE (e.g., OLT MSE 916A) or ONU/T MSE (e.g., ONU/T MSE 916B). The OLT MSE configures the OLT PMD or the ONU/T MSE configures the ONU/T PMD to perform the test method (e.g., type of test method, length of test signal burst, length of delay time period, test signal frequency or pattern, clock recovery pattern) by configuring the OLT PMD 924A or ONU/T PMD 924B though station management 917 (e.g., through MDIO, I$^2$C or equivalent). The OLT MSE 916A or ONU/T MSE 916B requests their peer MSE to issue a MAC control PAUSE frame using OAM messages. The peer MSE then, responsive to the request, schedules a test method by sending a PAUSE frame request message to its peer MAC control sub-layer entity 914 though its peer MAC client control entity 913. The peer MAC control sub-layer entity 914 then generates and sends in synchrony with Ethernet communications MAC control PAUSE frame 1184 which establishes a PAUSE time period on reception of the MAC control PAUSE frame by OLT MSE's 916A or OLT MSE's 916B MAC control sub-layer entity 914. The test method frame 1002 is then generated in synchrony with Ethernet communications by the MAC control sub-layer entity 914 with contribution from the OLT MSE 916A or ONU/T MSE 916B and sent through the RS layer 920 to the PCS layer 922. The PCS 922 responsive to receiving the type 88-08 field 1044, MAC control test method opcode 1055 and MAC control test method parameters 1056 generates test method control group codes (e.g., "/L") which inform the PMA 923 when to begin the IS Burst 626 portion of the test method 1186. After the test method event, the PAUSE period ends and communications continue having maintained synchrony and continuity of communication flows through the test method event. Test method results are sent 1188 through Ethernet payloads to the OLT NCSE as previously discussed.

It will be appreciated that embodiments of the invention using IEEE 802.3ah EPON are similar to FIG. 9A-11D with the exception of utilizing Multipoint MAC Control Protocol (MPCP) control frames instead of MAC control frames. MPCP control frames 1308 are used to issue MPCP control PAUSE frames (i.e., establish PAUSE time periods) which are scheduled by an MSE to perform test methods. It will also be appreciated that while a single control group code "/L" was described along with test method configuration management through station management, alternative embodiments can utilize additional control group codes between the PCS and PMA layers to delineate segments of the test method frame (e.g., IS Burst 626, DT 627, Sampling Window 628, Restore clock 629).

Figure 12A:
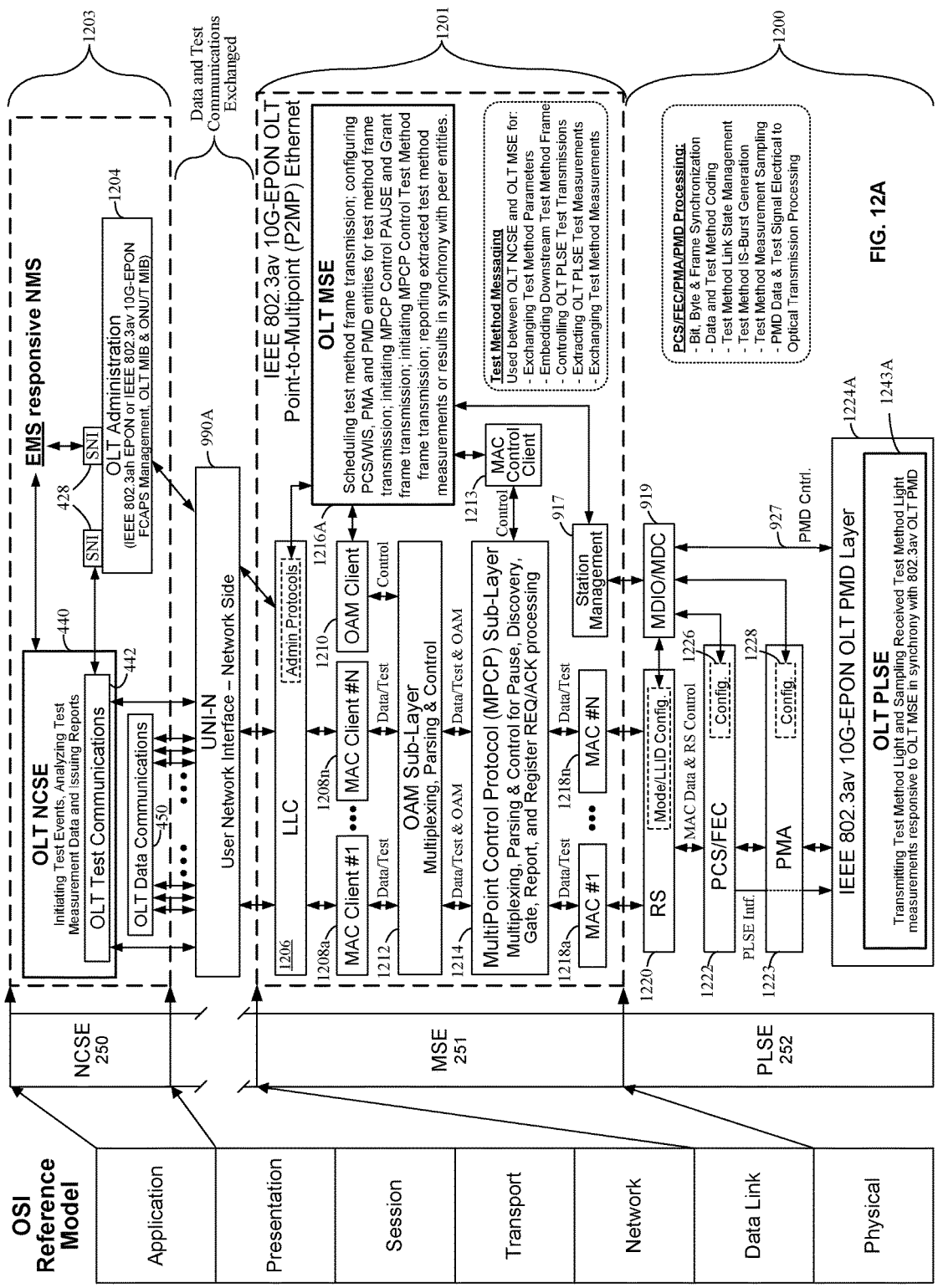
FIG. 12A is a block diagram which illustrates an OSI reference model and related entities of a point-to-multipoint IEEE 10G-EPON Ethernet Head-end OLT system in accordance with an embodiment of the present invention.
Figure 12B:
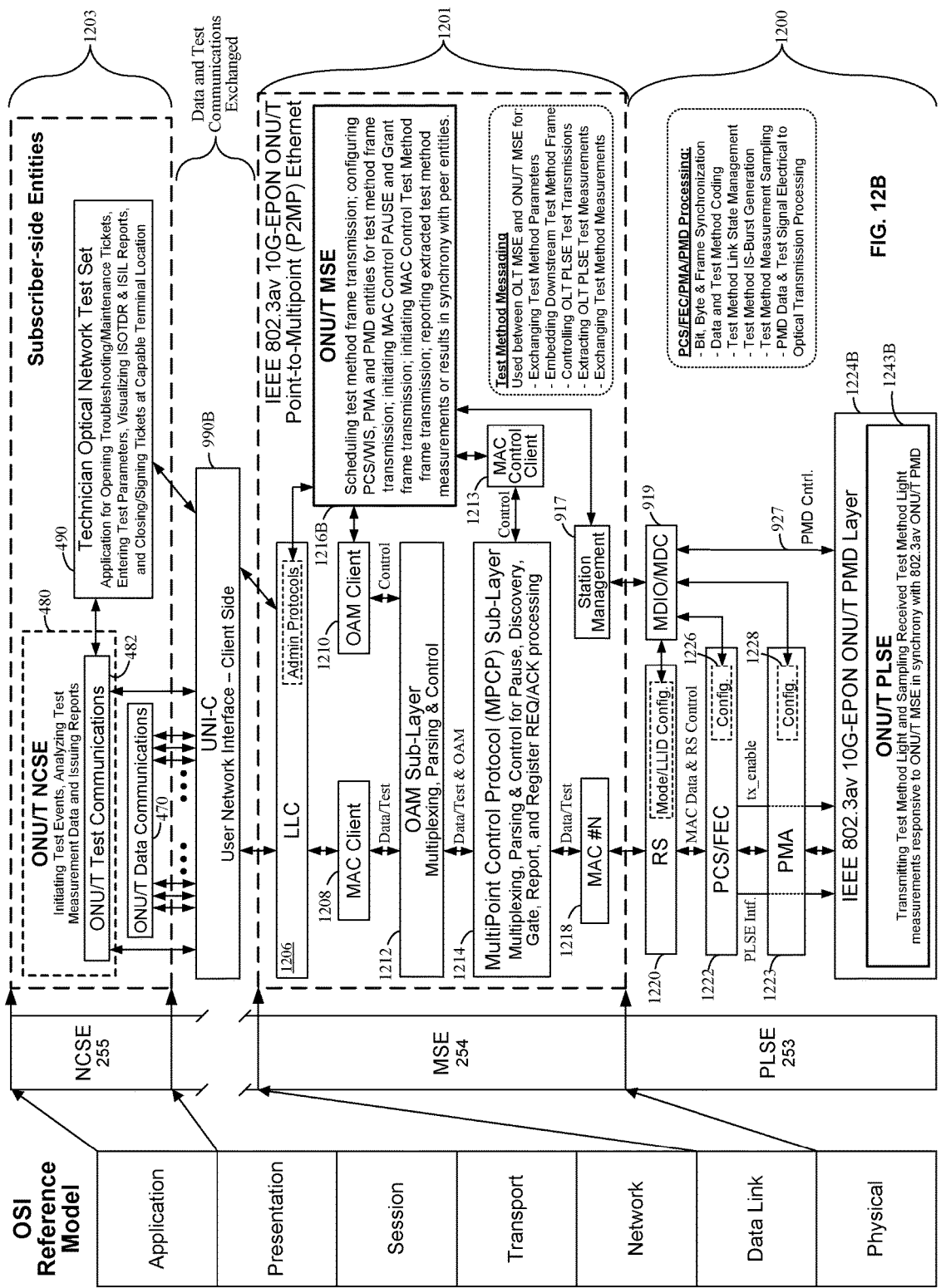
FIG. 12B is a block diagram which illustrates an OSI reference model and related entities of a point-to-multipoint IEEE 10G-EPON Ethernet Client ONU/T system in accordance with an embodiment of the present invention.

Referring now to FIG. 12A and FIG. 12B, in view of FIG. 9A and FIG. 9B, exemplary embodiments of the invention of an OSI reference models and related entities for an OLT 1400 and ONU/T 1401, respectively, for IEEE 802.3av 10G-EPON networks is shown. FIG. 12A and FIG. 12B entities will be discussed in relation to FIG. 9A and FIG. 9B. LLC entity 1206 performs similar functions to LLC entity 906 with the additional functionality of multiplexing communications and assigning LLIDs (used to address specific ONU/Ts) between multiple MAC Clients 1208a-n. The OLT Ethernet MAC 1201 has multiple MAC client entities 1208a-n wherein each MAC client performs similarly to MAC client entity 908a. OAM sub-layer entity 1212 performs similar functions to OAM sub-layer entity 912 with the additional functionally of handling multiplexing and addressing for multiple MAC clients. MPCP sub-layer entity 1214 performs similar to MAC control sub-layer entity 914 with the additional functionality of messages, state diagrams and timers to control access to the point-to-multipoint (P2MP) topology of the PON network among the N number of MACs 1218*a-n*. RS layer entity 1220 has the additional functionality of multiplexing communications to and from multiple MACs 1218*a-n* to the PCS layer entity 1222. PCS layer entity 1222 has additional functionality, for example, of communicating when to turning on and off the transmitter for IS Burst 626, when to begin measurements, and receiving test method measurements in one embodiment of the present invention. In alternative embodiments, a PLSE can be configured to perform a test method through station management 917 using PMD control 927 and receives notification from the PCS layer entity 1222 of when to begin performing the test method, similarly as previously discussed.

Figure 13A:
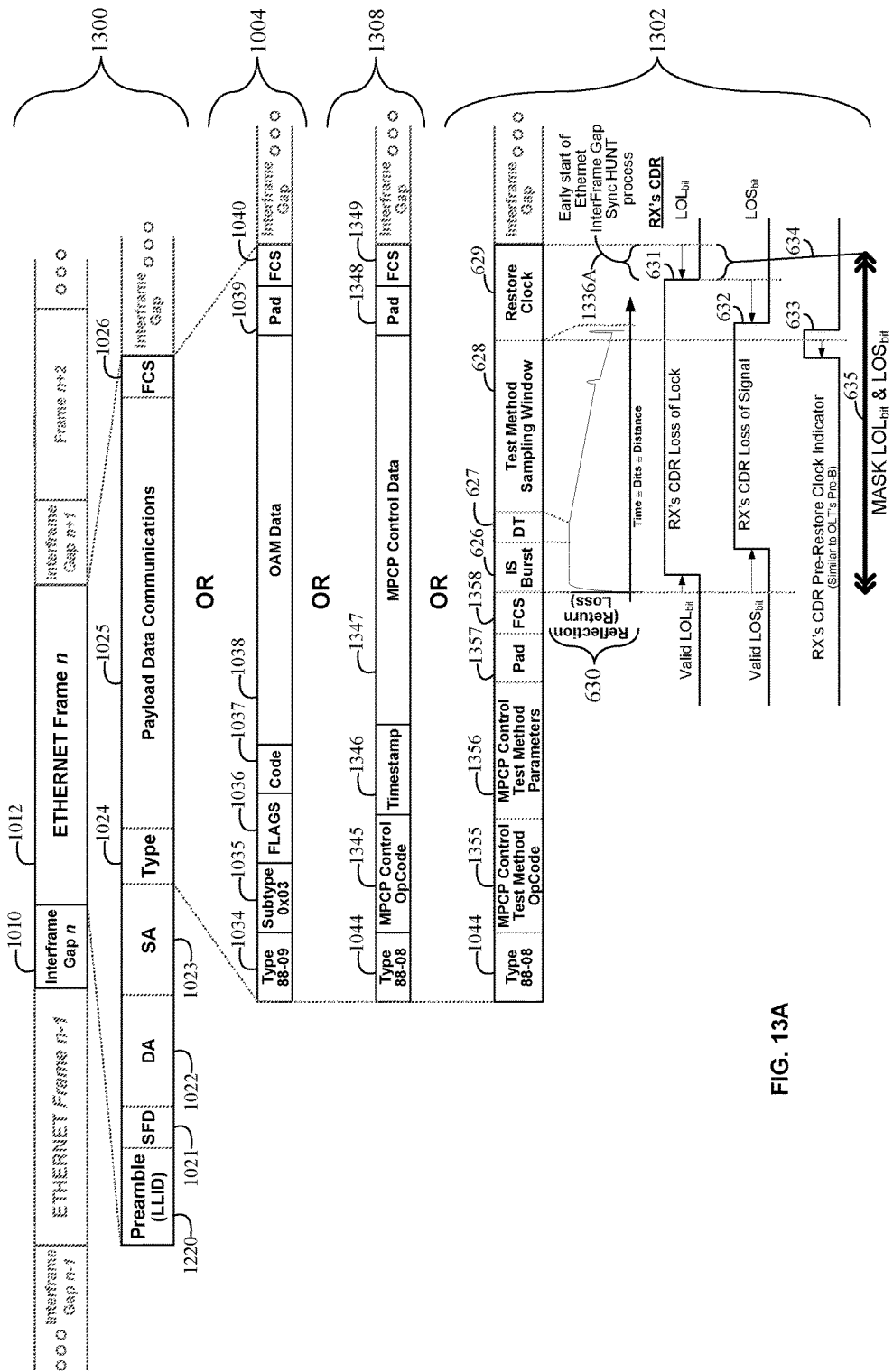
FIG. 13A is a block diagram which illustrates a diagrammatic flow of the downstream communications in a point-to-multipoint IEEE 10G-EPON Ethernet system incorporating test methods in accordance with an embodiment of the present invention.
Figure 13B:
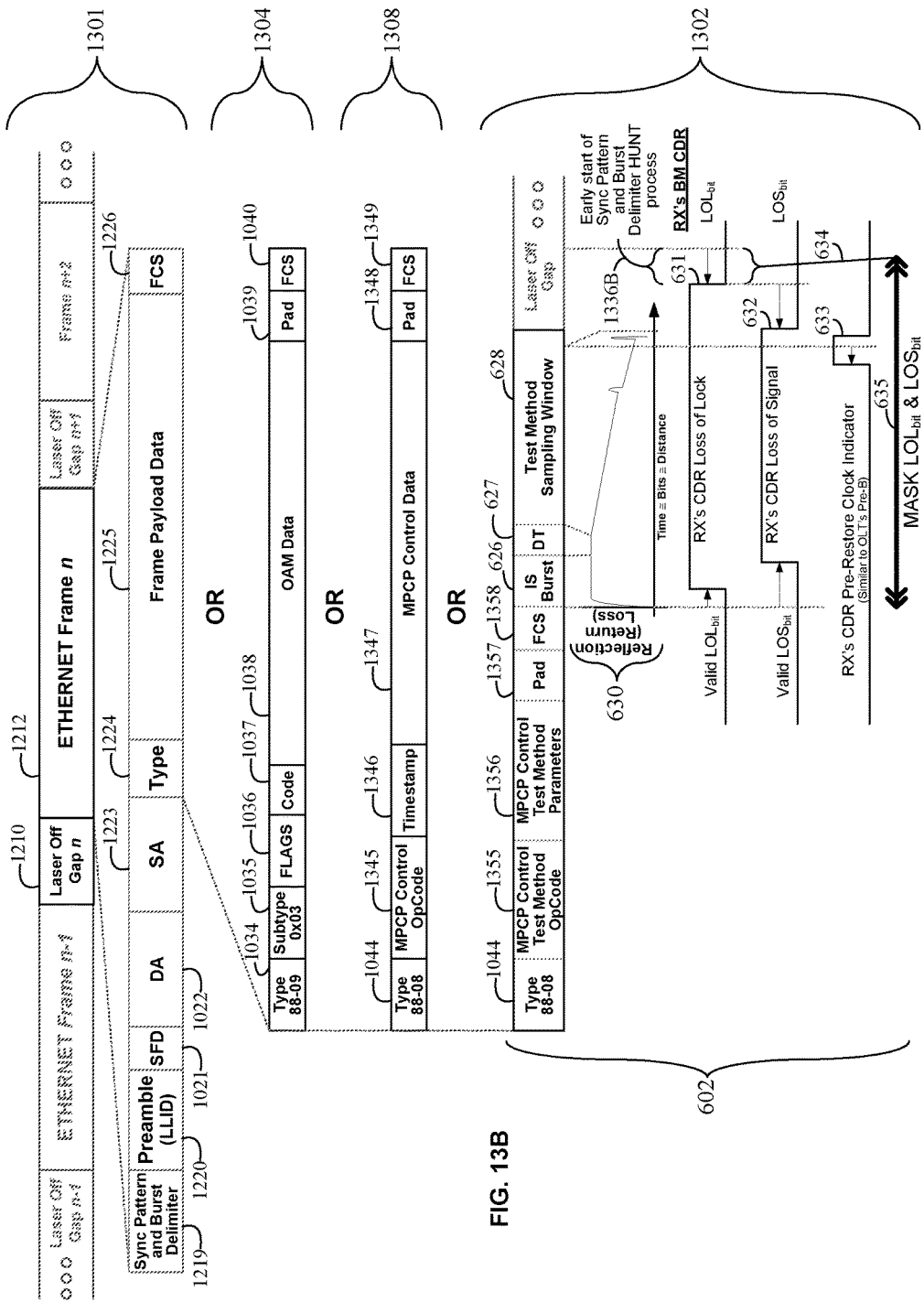
FIG. 13B is a block diagram which illustrates a diagrammatic flow of the upstream communications in a point-to-multipoint IEEE 10G-EPON Ethernet system incorporating test methods in accordance with an embodiment of the present invention.

Referring now to FIG. 13A and FIG. 13B in view of FIG. 10, downstream and upstream test method frames use MPCP control test method frames 1302 to indicate the test method type (e.g., MPCP control test method opcode 1355) and convey test method parameters (e.g., MPCP control test method parameters 1356).

Figure 14B:
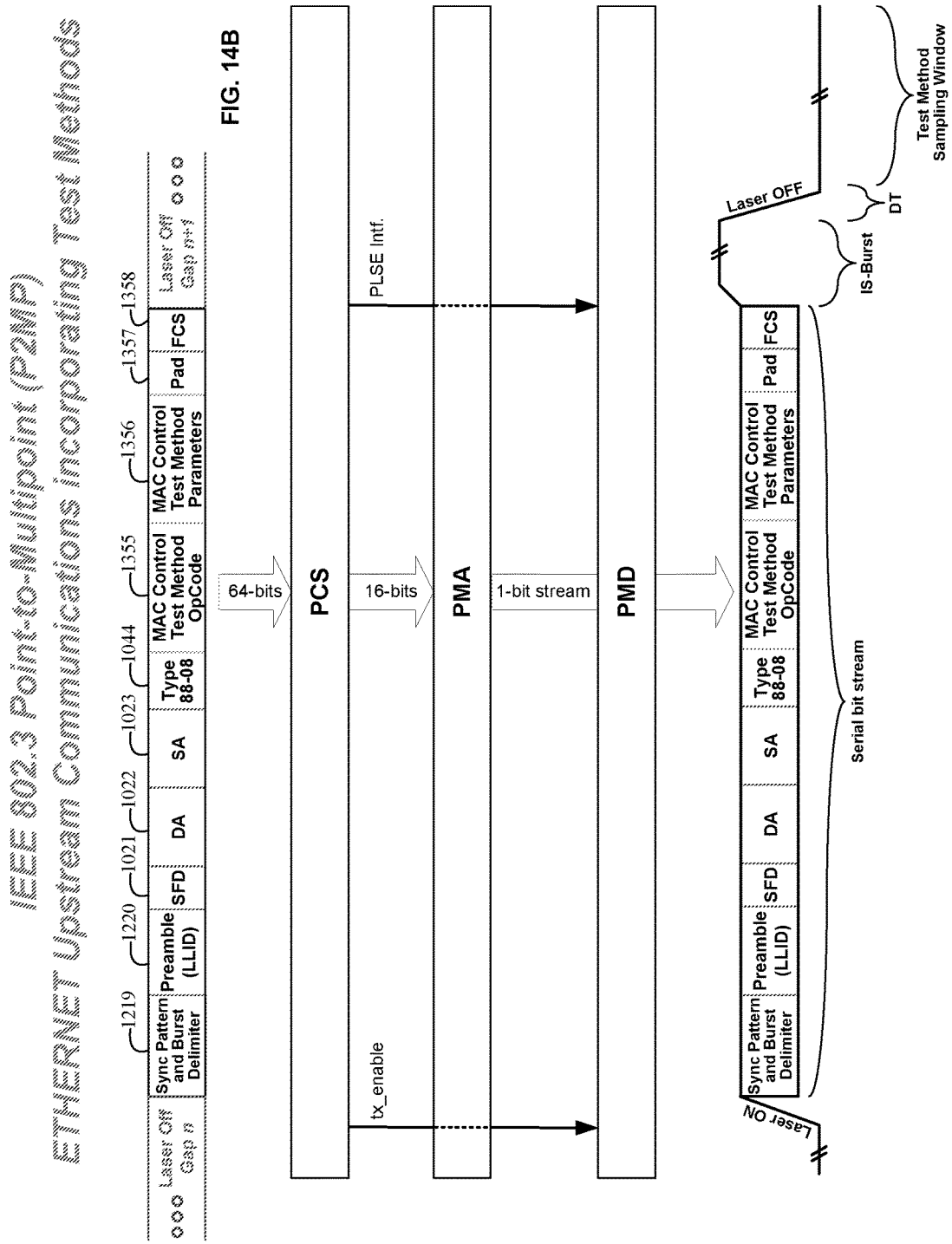
FIG. 14B is a block diagram which illustrates a diagrammatic flow of upstream test methods in the Physical layer in accordance with an Ethernet embodiment of the present invention.

Referring now to FIG. 14A and FIG. 14B in view of FIG. 11B, the PCS layer 1222 responsive to MPCP control test method frames 1302 has the ability to communicate with the PMD layer and PLSE through the PLSE interface to perform the test methods similarly as previously discussed.

Figure 14C:
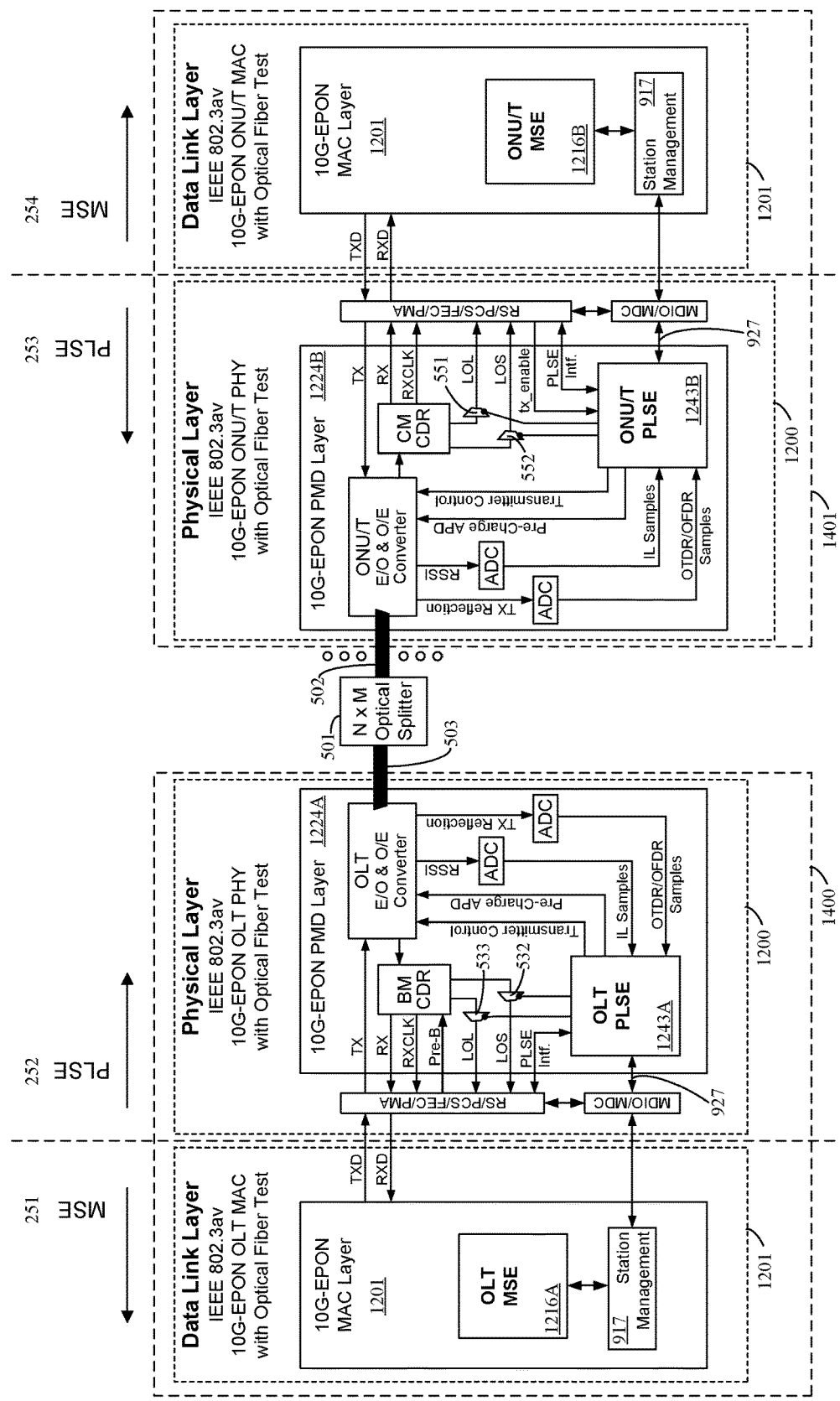
FIG. 14C is a block diagram which illustrates the block level circuitry and physical and data link layers of an OLT and ONU/T of a point-to-multipoint IEEE 10GE-PON Ethernet optical fiber data network in accordance with an embodiment of the present invention.

Referring now to FIG. 14C in view of FIG. 11C, FIG. 14C is a block diagram which illustrates the block level circuitry and physical and data link layers of an OLT and ONU/T of a point-to-multipoint IEEE 10GE-PON Ethernet optical fiber data network in accordance with an embodiment of the present invention. FIG. 14C illustrates 10G-EPON MAC and PHY layers and associated entities for OLT 1400 and ONU/T 1401 as well as illustrates a PON fiber plant 501-503.

Figure 14D:
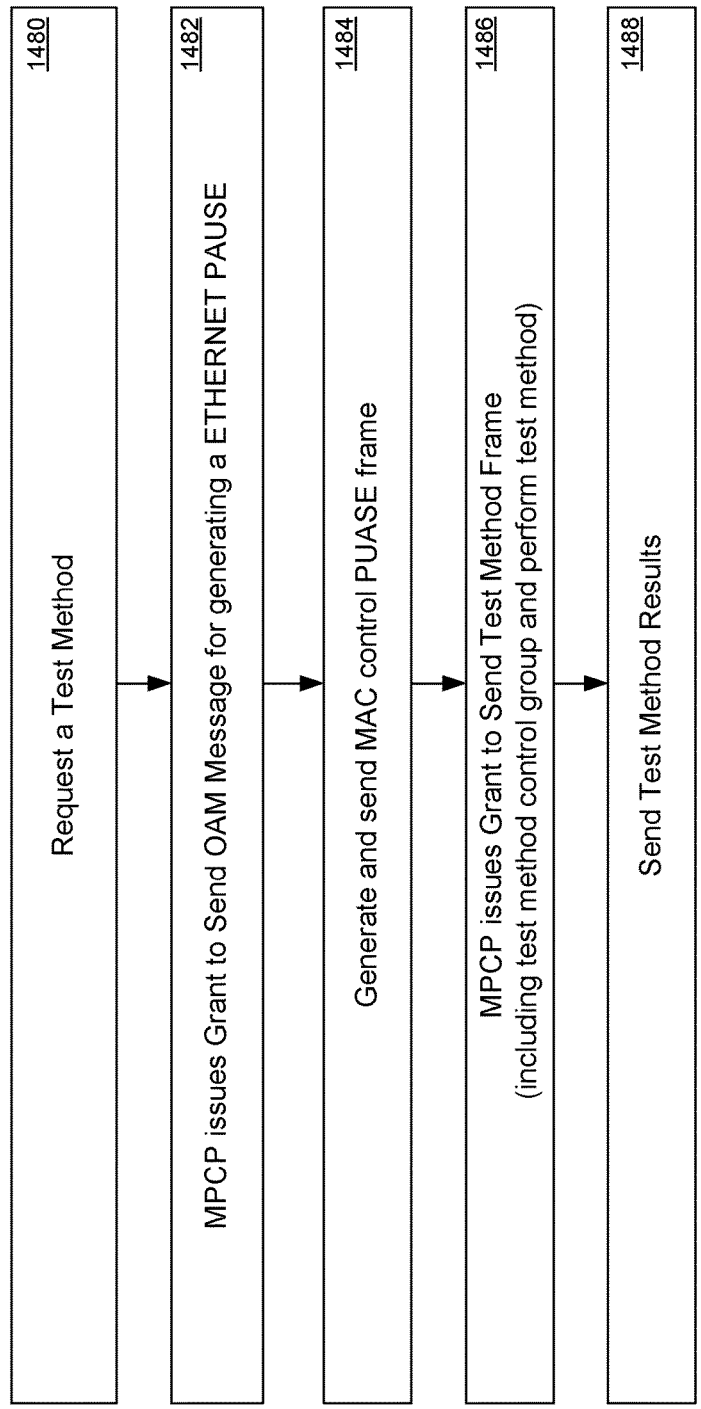
FIG. 14D is a flow chart summarizing a method of incorporating test methods in upstream communications of IEEE 802.3av 10G-EPON networks in an embodiment of the invention.

Referring now to FIG. 14D, it will be appreciated that downstream test methods in 10G-EPON perform similarly to test methods performed in P2P Ethernet. As mentioned previously, PAUSE time periods are still used to schedule test methods however PAUSE time periods are established with MPCP control frames 1308. Test methods in the upstream direction differ with the addition of the use of MPCP control GRANT frame for all upstream communications. Starting with requesting a test method 1480, by a peer application entity (e.g., EMS, NMS), to be performed between an ONU/T and the OLT the OLT NCSE (e.g., OLT NCSE 440) initiates an upstream test method responsive to the request. The OLT NCSE processes the request to establish test method parameters (e.g., ONU/T address, test type, test signal frequency or pattern, sampling rate) and initiates the test method by sending, for example, an OAM message 1004,1304 to ONU/T MSE (e.g., ONU/T MSE 1216B). The ONU/T MSE uses test method parameters from the OAM message to configure the ONU/T PMD to perform the test method (e.g., type of test method, length of test signal burst, length of delay time period, test signal frequency or pattern) by configuring the ONU/T PMD 1224B though station management (e.g., though MDIO, I²C, or equivalent). The ONU/T MSE 916B sends (after receiving an upstream GRANT 1482) an OAM message to schedule or request a PAUSE time period to the OLT MSE 916A which then requests the OLT MPCP control sub-layer entity 1214 through OLT MAC client control entity 1213 to generate and send in the downstream an MPCP control PAUSE frame back to the ONU/T 1484. The test method frame 1302 is then generated by the ONU/T MPCP control sub-layer entity 1214 (with contribution from ONU/T MSE as previously discussed) and sent (after receiving an upstream GRANT) in synchrony with Ethernet communications through the RS layer 1220 to the PCS layer 1222. The ONU/T PCS 1222 responsive to receiving the type 88-08 field 1344, MPCP control test method opcode 1355 and MPCP control test method parameters 1356 communicates with the ONU/T PLSE through PLSE interface to perform the test method 1486. After the test method event, the PAUSE period ends and communications continue having maintained synchrony and continuity of communication flows through the test method event. Test method results are encapsulated and sent 1488 through Ethernet payload to the OLT NCSE as previously discussed. It will be appreciated that upstream communication GRANT allocations are needed in the upstream to perform upstream test methods as well as sending the OAM request for a PAUSE frame and as well as for sending test method results. It will also be appreciated that in an alternative embodiment the OLT NCSE 440 can send an OAM message to the OLT MPCP control sub layer entity 1214 to request a PAUSE time period eliminating the need for an ONU/T MSE 1216B to send an OAM message to the OLT MSE 1216A which then sends a request for a PAUSE time period to the OLT MPCP control sub layer entity 1214.

It will be appreciated that in some P2P Ethernet embodiments, embodiments of the PCS/WIS entity can generate PMD transmission state variables which are passed to a PLSE entity (e.g., via a PLSE interface). The PMD transmission state variables can be Boolean (i.e., true or false) variables that allow the PCS portion of the PCS/WIS entity to notify the PMA entity below of the start of a test method frame as well as to notify the PMA about delineate transitions of the sub-sections of the test method frame. For example, PMD transmission state variables can be generate for one or more of the following transitions: test method frame transition from FCS 1058 to IS-Burst 626 or the first transmitted unique test method control code group (e.g., "/L/"); the transition from the end of IS-Burst period 626 to the start of DT period 627; the transition from the end of Delay Time period 627 to the start of Test Method Sampling Window 628; the transition from the end of the Test Method Sampling Window 628 to the start of the optional Restore Clock period 629; and the transition from the end of the optional Restore Clock period 629 to the start of Interframe Gap transmission 1010 (e.g. PCS transition from unique test method control group "/L/" to the start of end of packet control group "/T/", carrier extend control group "/R/", and idle control group "/I/" transmission). These PMD transition state variables are processed by the PMA in a manner that accounts for the processing time of the WIS portion of the PCS/WIS entity. An MSE entity, responsive to receiving test method parameters from an NCSE entity, can configure how these PMD transmission state variables are used by configuring PCS/WIS, PMA, PMD and PLSE entities via station management.

It will be appreciated that while various P2P Ethernet embodiments (e.g., active Ethernet) and P2MP Ethernet embodiments (e.g., EPON and XG-EPON) have been discussed using the PAUSE flow control mechanism of IEEE 802.3x (e.g., MAC control PAUSE frames for active Ethernet embodiments, MPCP control PAUSE frames for EPON and XG-EPON embodiments), alternative embodiments of the invention can use MAC control Priority PAUSE frames or MPCP control PAUSE frames as well, respective of the embodiment. Priority-based flow control, as defined by the standard IEEE 802.1Qbb (included herein by reference) provides a link level flow control mechanism that can be controlled independently for each Class of Service (CoS), as defined by IEEE 802.1p (included herein by reference).

It will also be appreciated that PAUSE flow control mechanism of IEEE 802.3x and Priority PAUSE flow control mechanisms of IEEE 802.1Qbb can be used in GPON and XG-PON embodiments (e.g., FIG. 4A-7C and related discussions) as well. Referring now to FIG. 4A and FIG. 4B, Ethernet LLC & MAC entity 422 can issue MAC control PAUSE frames (or MAC control Priority Pause frames) to generate PAUSE time periods between Ethernet LLC & MAC entity 422 (e.g., in OLT GTC Adaptation Layer 402A) and peer Ethernet LLC & MAC entity 422 (e.g., in ONU/T Adaptation Layer 402B) and vice versa. The PAUSE flow control mechanisms or Priority Pause flow control mechanisms in these embodiments are effective at or across the UNI interfaces 421,461. The MAC control PAUSE frame (or MAC control Priority PAUSE frame) can be issued at the request of an MSE. The MSE (e.g., OLT MSE 416A, ONU MSE 416B) issues the request by sending an OAM message to Ethernet LLC & MAC entity 422 through Embedded OAM entity 418 and OAM channel adaptation entity 427 responsive to receiving a test method request from an NCSE (e.g., OLT NCSE 440, ONU/T NCSE 480). Once the PAUSE time period has been established between network terminals, test methods can be performed in the PAUSE time period similarly as previously discussed in references to FIG. 4A-7C for GPON and XG-PON embodiments of the invention.

Although the invention has been described in terms of particular embodiments and applications, one of ordinary skill in the art, in light of this teaching, can generate additional embodiments and modifications without departing from the spirit of or exceeding the scope of the claimed invention. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. Accordingly, it is to be understood that the drawings and descriptions herein are proffered by way of example to facilitate comprehension of the invention and should not be construed to limit the scope thereof.

What is claimed is:

1. A method for performing optical measurements on one or more wavelengths of one or more optical fibers by a network terminal for use in an optical fiber network, wherein the network terminal is disposed to using frames of an optical Ethernet based network protocol for data communications on the one or more optical wavelengths, the method for performing optical measurements on the one or more wavelengths of the one or more optical fibers by the network terminal comprising:

using a Media Access Control (MAC) frame message of the optical Ethernet based network protocol to perform one or more test intervals;

performing the one or more test intervals in synchrony with the frames of the optical Ethernet based network protocol, a test interval comprising a first time interval for transmitting an optical test signal followed by a second time interval for turning off an optical transmitter followed by a third time interval for measuring the optical test signal;

during the first time interval of a test interval, using the optical transmitter for transmitting the optical test signal on one of the one or more wavelengths used for data communications onto one of the one or more optical fibers; during the second time interval of a test interval, turning off the optical transmitter resulting in no further light transmissions by the optical transmitter for the duration of the second time interval;

during the third time interval of a test interval, measuring a portion of the optical test signal, and turning on the optical transmitter after the third time interval of a test interval.

2. The method of claim 1, wherein the MAC frame message of the optical Ethernet based network protocol is used to schedule one or more PAUSE time periods for performing the one or more test intervals.

3. The method of claim 1, wherein the MAC frame message is used to send one or more OAM messages for requesting one or more PAUSE time periods for performing the one or more test intervals.

4. The method of claim 1, wherein one or more control code groups are used by an Ethernet PMA entity to indicate timing of the one or more test intervals.

5. The method of claim 1, wherein PAUSE frames of the optical Ethernet based network protocol are used to generate PAUSE time periods for scheduling the one or more test intervals.

6. The method of claim 1, wherein a MAC control frame of the optical Ethernet based network protocol is used to indicate an extension of the optical Ethernet based network protocol frame for performing one or more test intervals.

7. The method of claim 1, wherein a Link Layer Identification (LLID) field of the optical Ethernet based network protocol is used to indicate or be associated with the request to perform one or more test intervals.

8. The method of claim 1, wherein the MAC frame message is used to perform the one or more test intervals in lieu of idle packets, idle frames or silence periods.

9. The method of claim 1, wherein the MAC frame message is used to perform the one or more test intervals responsive to a disruption in communications of the network terminal.

10. The method of claim 1, wherein the MAC frame message is used to perform the one or more test intervals responsive to communications from the network terminal being underutilized.

11. The method of claim 1, further comprising performing an optical time domain reflectometry (OTDR) analysis responsive to measuring a portion of the transmitted optical test signal.

12. The method of claim 1, further comprising analyzing the measured portion of the optical test signal to determine location and characteristics of one or more impairments in one or more optical fiber links.

13. The method of claim 1, further comprising analyzing the measured portion of the optical test signal to determine detection of optical fiber link tampering on one or more optical fiber links.

14. The method of claim 1, wherein the optical test signal includes one or more light transmissions, each comprised of a pattern of intensity, frequency, and duration.

15. A network terminal for use in an optical fiber network, comprising:

at least one optical receiver adapted to receive optical signals on a wavelength used for data communications of an optical Ethernet based network protocol;

at least one optical transmitter adapted to transmit optical signals on a wavelength used for data communications of the optical Ethernet based network protocol;

at least one measurement circuit electrically coupled to the at least one optical receiver for producing a digital measurement of at least one optical signal received by the at least one optical receiver; and a controller electrically coupled to the at least one optical receiver and electrically coupled to the at least one optical transmitter and electrically coupled to the at least one measurement circuit and the controller is configured for communicating across the optical fiber network using the optical Ethernet based network protocol using frames for data communications and the controller is adapted to perform an optical measurement of one or more optical fiber links within a test interval in synchrony with the optical Ethernet based network protocol using an Ethernet Media Access (MAC) Control frame and the test interval includes:

a first time interval wherein the controller signals one of the at least one optical transmitter to produce an optical test signal on a wavelength used for communications;

a second time interval following the first time interval wherein the controller signals one of the at least one optical transmitter to turn off resulting in no further light transmissions, and a third time interval following the second time interval wherein one of the at least one measurement circuit measures a portion of the optical test signal received by one of the at least one optical receiver.

16. The network terminal of claim 15, wherein PAUSE frames of the optical Ethernet based network protocol are used to generate PAUSE time periods for the test interval.

17. The network terminal of claim 15, wherein an MAC control frame of the optical Ethernet based network protocol is used to indicate an extension of the optical Ethernet based network protocol frame for performing one or more test intervals.

18. The network terminal of claim 15, wherein a Link Layer Identification (LLID) field of the optical Ethernet based network protocol is used to indicate or be associated with the request to perform one or more test intervals.

19. The network terminal of claim 15, wherein one or more control code groups are used by an Ethernet PMA entity to indicate timing of the test interval.

20. The network terminal of claim 15, wherein the controller is an Ethernet Media Access Controller (MAC) which further comprises PCS layer and a PMA layer and the optical test signal is used to generate unique Ethernet control code groups by the PCS layer to indicate to the PMA layer aspects of the optical test signal and test interval.

* * * * *